United States Patent
Park et al.

(10) Patent No.: US 9,977,255 B2
(45) Date of Patent: May 22, 2018

(54) LENS MOVING APPARATUS

(71) Applicant: LG INNOTEK CO., LTD., Seoul (KR)

(72) Inventors: Sang Ok Park, Seoul (KR); Sang Jun Min, Seoul (KR); Tae Jin Jung, Seoul (KR); Hyune O Yoo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 71 days.

(21) Appl. No.: 14/971,365

(22) Filed: Dec. 16, 2015

(65) Prior Publication Data

US 2016/0178925 A1 Jun. 23, 2016

(30) Foreign Application Priority Data

Dec. 17, 2014 (KR) .................. 10-2014-0182495
Dec. 17, 2014 (KR) .................. 10-2014-0182496
Dec. 24, 2014 (KR) .................. 10-2014-0188408

(51) Int. Cl.
  *G02B 27/64* (2006.01)
  *G02B 7/09* (2006.01)
  *H04N 5/225* (2006.01)

(52) U.S. Cl.
  CPC ............. *G02B 27/646* (2013.01); *G02B 7/09* (2013.01); *H04N 5/2252* (2013.01); *H04N 5/2254* (2013.01)

(58) Field of Classification Search
  CPC .... G02B 27/646; G02B 15/173; G02B 15/14; G02B 5/00; H04N 5/23287

(Continued)

(56) References Cited

U.S. PATENT DOCUMENTS 8,488,957 B2 7/2013 Chiu et al.
2011/0141564 A1* 6/2011 Sata ................. G02B 7/102
　　　　　　　　　　　　　　　　　　　　359/557

(Continued)

FOREIGN PATENT DOCUMENTS

CN 　　204009314 U 　12/2014
EP 　　　3021158 A1 　11/2015

(Continued)

OTHER PUBLICATIONS

Extended European Search Report in European Application No. 15197163.7, dated Mar. 21, 2016.

(Continued)

*Primary Examiner* — Bumsuk Won
*Assistant Examiner* — Tamara Y Washington
(74) *Attorney, Agent, or Firm* — Saliwanchik, Lloyd & Eisenschenk

(57) ABSTRACT

An embodiment includes a bobbin provided at an outer circumferential surface thereof with a first coil, a first position sensor disposed on the outer circumferential surface of the bobbin and spaced apart from the first coil, a first magnet disposed so as to be opposite to the first position sensor, a second magnet disposed so as to be opposite to the first coil, the second magnet being configured to move the bobbin in a direction parallel to an optical axis via electromagnetic interaction with the first coil, a housing configured to support the first magnet and the second magnet; and upper and lower elastic members coupled to the bobbin and the housing, wherein the first position sensor is moved along with the bobbin.

20 Claims, 26 Drawing Sheets

(58) Field of Classification Search
USPC .................................................. 359/554–557
See application file for complete search history.

(56) References Cited

U.S. PATENT DOCUMENTS

| | | | |
|---|---|---|---|
| 2012/0070138 A1* | 3/2012 | Onishi | G02B 7/102 |
| | | | 396/55 |
| 2012/0218635 A1* | 8/2012 | Suzuka | G02B 7/14 |
| | | | 359/554 |
| 2013/0136438 A1* | 5/2013 | Lee | G03B 3/10 |
| | | | 396/133 |
| 2015/0331251 A1 | 11/2015 | Hu | |
| 2016/0178923 A1* | 6/2016 | Hayashi | G02B 7/04 |
| | | | 359/557 |

FOREIGN PATENT DOCUMENTS

| | | |
|---|---|---|
| JP | 2012088477 A | 5/2012 |
| JP | 2014085560 A | 5/2014 |
| KR | 20130072721 A | 7/2013 |
| KR | 101440807 B1 | 9/2014 |
| KR | 20140118577 A | 10/2014 |
| KR | 1020160057722 A | 5/2016 |

OTHER PUBLICATIONS

Office Action Report dated Jan. 31, 2017 in European Application No. 15197163.7.

* cited by examiner

LENS MOVING APPARATUS

CROSS REFERENCE TO RELATED APPLICATIONS

This application claims priority under 35 U.S.C. § 119 to Korean Application Nos. 10-2014-0182495, filed on Dec. 17, 2014; 10-2014-0182496, filed on Dec. 17, 2014; and 10-2014-0188408, filed on Dec. 24, 2014 which are hereby incorporated by reference in their entirety.

TECHNICAL FIELD

Embodiments relate to a lens moving apparatus.

BACKGROUND

It has been difficult to apply Voice Coil Motor (VCM) technology, used in conventional camera modules, to sub-miniature camera modules, which aim to realize low power consumption, and thus study related thereto has actively been conducted.

In the case of a camera module mounted in a small electronic product such as a smart phone, the camera module may frequently receive shocks during use, and may be shaken minutely due to, for example, the user's handshake. In consideration of this, development of technology in which a handshake prevention device is additionally provided to the camera module has recently been required.

Various types of handshake prevention devices have been studied. One of them is technology in which an optical module is moved in the X-axis and the Y-axis, which define a plane perpendicular to the optical axis, so as to compensate for handshake. In the case of this technology, the handshake prevention device suffers from a complicated configuration and is not suitable for miniaturization since the optical system is moved and adjusted in the plane perpendicular to the optical axis.

In addition, there is the requirement for accurate and rapid focusing of the optical module.

BRIEF SUMMARY

Embodiments provide a lens moving apparatus, which may prevent malfunction or errors of a position sensor caused by the magnetic field of a first coil, which may realize miniaturization and low cost, and which may ensure ease assembly and improved fixing ability of a bobbin and a sensor board.

In one embodiment, a lens moving apparatus includes a bobbin provided at an outer circumferential surface thereof with a first coil, a first position sensor disposed on the outer circumferential surface of the bobbin and spaced apart from the first coil, a first magnet disposed so as to be opposite to the first position sensor, a second magnet disposed so as to be opposite to the first coil, the second magnet being configured to move the bobbin in a direction parallel to an optical axis via electromagnetic interaction with the first coil, a housing configured to support the first magnet and the second magnet, and upper and lower elastic members coupled to the bobbin and the housing, wherein the first position sensor is moved along with the bobbin.

The first position sensor may overlap at least a portion of the first magnet in a direction perpendicular to the optical axis.

The first position sensor may do not overlap the second magnet in a direction perpendicular to the optical axis.

The first coil may be located at the lower side of the outer circumferential surface of the bobbin, and the first position sensor may be located at the upper side of the outer circumferential surface of the bobbin.

The first magnet may overlap the second magnet in the direction parallel to the optical axis.

The first magnet may do not overlap the second magnet in the direction parallel to the optical axis.

The first magnet may do not overlap the second magnet in a direction in which the first position sensor and the first magnet face each other.

The first position sensor may be electrically connected to at least one of the upper elastic member and the lower elastic member.

The lens moving apparatus may further include a second coil disposed so as to be opposite to the second magnet, a circuit board, on which the second coil is disposed, a base disposed below the circuit board, a plurality of support members configured to support the housing such that the housing is movable relative to the base in a direction perpendicular to the optical axis, the support members also being configured to connect at least one of the upper and lower elastic members to the circuit board, and a second position sensor configured to sense displacement of the housing relative to the base in the direction perpendicular to the optical axis.

The first position sensor may sense displacement of the bobbin based on a result of sensing a strength of a magnetic field of the first magnet.

In another embodiment, a lens moving apparatus includes a bobbin provided at an outer circumferential surface thereof with a first coil, a sensor board disposed on the outer circumferential surface of the bobbin and spaced apart from the first coil, a first position sensor disposed on the sensor board, a first magnet disposed so as to be opposite to the first position sensor, a second magnet disposed so as to be opposite to the first coil, the second magnet being configured to move the bobbin in a direction parallel to an optical axis via electromagnetic interaction with the first coil, a housing configured to support the first magnet and the second magnet, and upper and lower elastic members coupled to the bobbin and the housing, wherein the first position sensor is moved along with the bobbin.

The sensor board may have a mounting recess formed in an outer circumferential surface thereof, and the first position sensor may be located in the mounting recess.

The sensor board may be electrically connected to at least one of the upper elastic member or the lower elastic member.

The sensor board may include a body disposed on the outer circumferential surface of the bobbin, the first position sensor being disposed on the body, elastic member contact portions configured to protrude from the body and electrically connected to at least one of the upper elastic member and the lower elastic member, and a circuit pattern formed in the body and electrically connected to the first position sensor and the elastic member contact portions.

The bobbin may have a support groove provided between an inner circumferential surface and the outer circumferential surface thereof such that the sensor board is inserted into the support groove.

The bobbin may have a receiving recess formed in the outer circumferential surface such that the first position sensor disposed on the sensor board is inserted into the support groove.

The housing may include first side portions on which the second magnet is disposed, and second side portions located between the first side portions, the outer circumferential surface of the bobbin may include first side surfaces corresponding to the first side portions of the housing and second side surfaces located between the first side surfaces, the first magnet may be disposed on any one of the first side portions of the housing, and the first position sensor may be disposed on one of the first side surfaces of the bobbin corresponding to the first side portion of the housing on which the first magnet is disposed.

Alternatively, the first magnet may be disposed on any one of the second side portions of the housing, and the first position sensor may be disposed on one of the second side surfaces of the bobbin corresponding to the second side portion of the housing on which the first magnet is disposed.

In a further embodiment, a lens moving apparatus includes a bobbin configured to mount a lens, and a sensor coupling member located so as to surround at least a portion of an outer circumferential surface of the bobbin, the sensor coupling member being provided with a sensor, wherein the sensor coupling member includes one or more corners formed by bending.

The sensor coupling member may include a main coupling portion configured to surround at least a portion of the outer circumferential surface of the bobbin in a horizontal direction, and a sensor grip portion configured to extend downward from the main coupling portion, the sensor being located at the sensor grip portion, the main coupling portion may have a shape forming at least a portion of a polygon having a plurality of edges when viewed from the top, and the sensor grip portion may extend downward from a center of any one of the edges.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
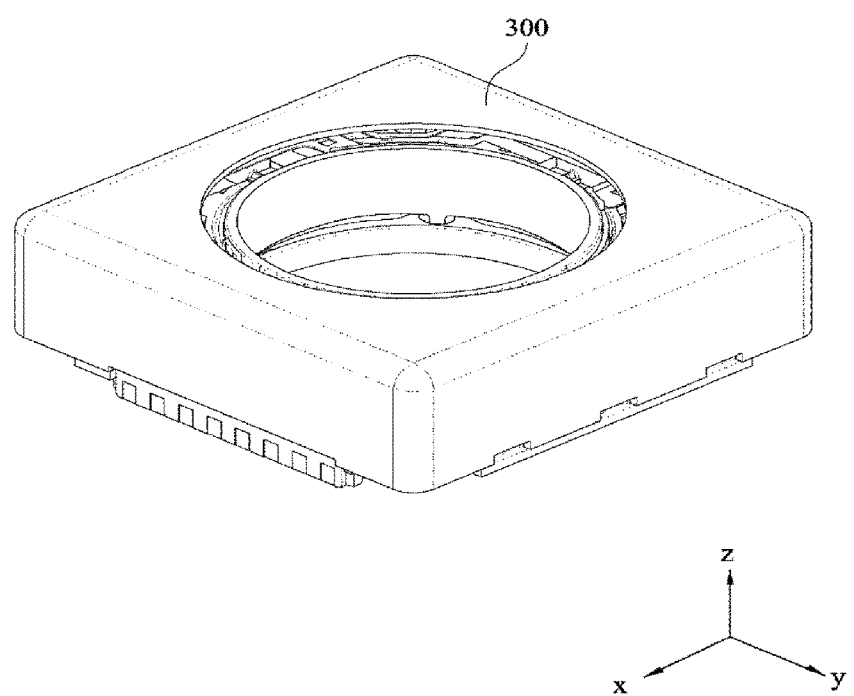
FIG. 1 is a schematic perspective view illustrating a lens moving apparatus according to an embodiment.

Hereinafter, embodiments will be clearly revealed via description thereof with reference to the accompanying drawings. In the following description of the embodiments, it will be understood that, when an element such as a layer (film), region, pattern, or structure is referred to as being "on" or "under" another element, it can be "directly" on or under another element or can be "indirectly" formed such that an intervening element may also be present. In addition, it will also be understood that criteria of on or under is on the basis of the drawing.

In the drawings, dimensions of layers are exaggerated, omitted or schematically illustrated for clarity and description convenience. In addition, dimensions of constituent elements do not entirely reflect actual dimensions. Wherever possible, the same reference numbers will be used throughout the drawings to refer to the same or like parts. Hereinafter, a lighting apparatus according to embodiments will be described with reference to the accompanying drawings.

Hereinafter, a lens moving apparatus according to an embodiment will be described with reference to the accompanying drawings. For the convenience of description, although the lens moving apparatus will be described using a rectangular coordinate system (x, y, z), the lens moving apparatus may be described using other coordinate systems, and the embodiment is not limited thereto. In the respective drawings, the X-axis and the Y-axis mean directions perpendicular to an optical axis, i.e. the Z-axis, and the optical axis (Z-axis) direction may be referred to as a "first direction", the X-axis direction may be referred to as a "second direction", and the Y-axis direction may be referred to as a "third direction".

A "handshake compensation device", for example, Optical Image Stabilization (OIS) device, which is applied to a subminiature camera module of a mobile device such as, for example, a smart phone or a tablet PC, may be a device that is configured to prevent the contour line of a captured image from not being clearly formed due to vibration caused by the user's handshake when capturing a still image.

In addition, an "auto-focusing device" is a device that automatically focuses an image of a subject on an image sensor surface. The handshake compensation device and the auto-focusing device may be configured in various ways, and the lens moving apparatus according to the embodiment may move an optical module, which is constituted of at least one lens, in the first direction parallel to the optical axis, or relative to a plane defined by the second and third directions, which are perpendicular to the first direction, thereby performing handshake compensation motion and/or auto-focusing motion.

Figure 2:
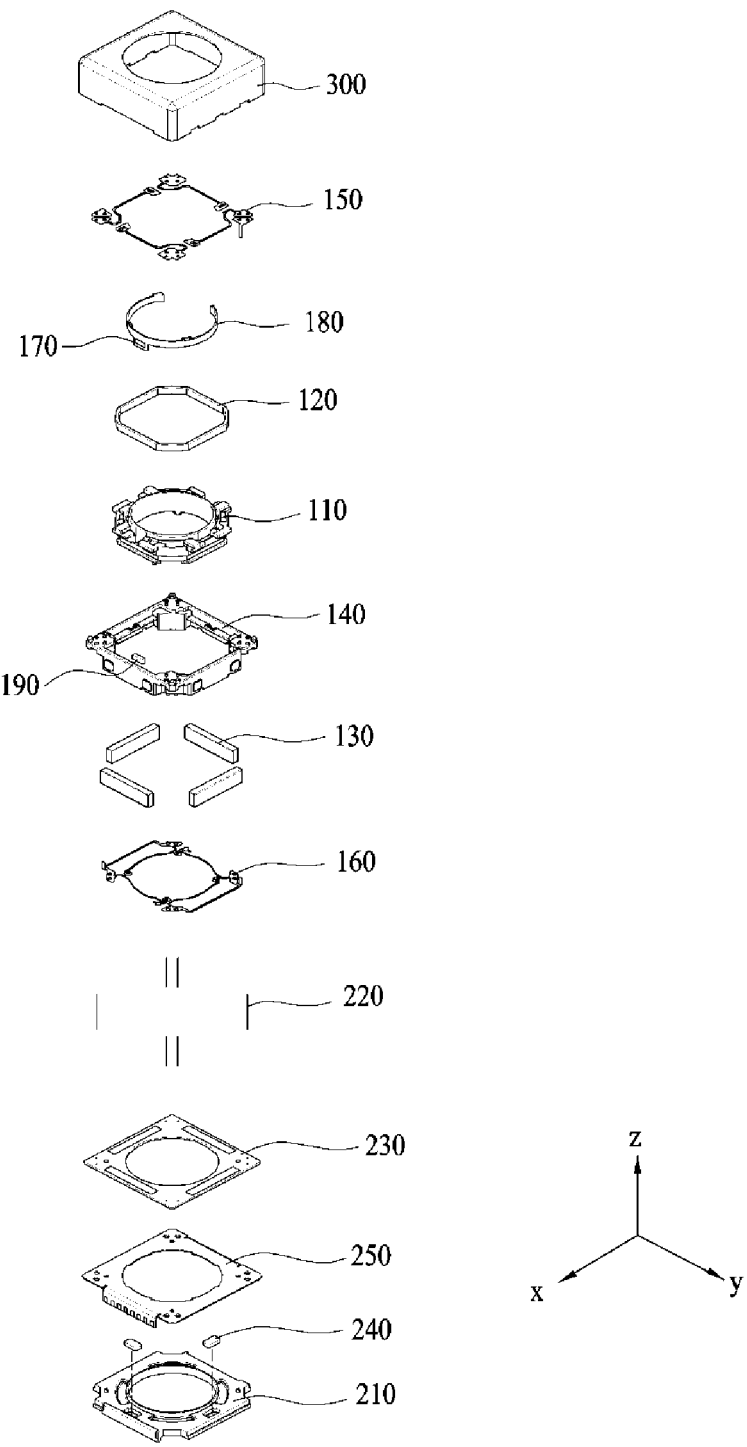
FIG. 2 is an exploded perspective view of the lens moving apparatus illustrated in FIG. 1.

FIG. 1 is a schematic perspective view illustrating the lens moving apparatus 100 according to the embodiment, and FIG. 2 is an exploded perspective view of the lens moving apparatus 100 illustrated in FIG. 1.

Referring to FIGS. 1 and 2, the lens moving apparatus 100 may include a cover member 300, an upper elastic member 150, a sensor board 180, a first position sensor 170, a first coil 120, a bobbin 110, a housing 140, a first magnet 190, at least one second magnet (130, for example, second magnets 130-1 to 130-4), and a lower elastic member 160.

In addition, the lens moving apparatus 100 may further include a plurality of support members 220, at least one second coil (230, for, example, second coils), a circuit board 250, second position sensors 240, and a base 210.

The bobbin 110, the first coil 120, the at least one second magnet 130, the housing 140, the upper elastic member 150, and the lower elastic member 160 may constitute a first lens moving unit. In addition, the first lens moving unit may further include a first position sensor 170. The first lens moving unit may be used in auto-focusing.

In addition, the at least one second coil 230, the circuit board 250, the base 210, and the support members 220 may constitute a second lens moving unit. In addition, the second lens moving unit may further include the second position sensors 240. The second lens moving unit may be used in handshake compensation.

First, the cover member 300 will be described.

The cover member 300 defines a receiving space along with the base 210, such that the upper elastic member 150, the bobbin 110, the first coil 120, the housing 140, the first position sensor 170, the first magnet 190, the at least one second magnet 130, the lower elastic member 160, the support members 220, the at least one second coil 230, and the printed circuit board 250 are received in the receiving space.

The cover member 300 may take the form of a box, which has an open bottom and includes an upper end portion and sidewalls. The bottom of the cover member 300 may be coupled to the top of the base 210. The upper end portion of the cover member 300 may have a polygonal shape such as, for example, a rectangular or octagonal shape.

The cover member 300 may have an opening formed in the upper end portion thereof to allow a lens (not illustrated) coupled to the bobbin 110 to be exposed to outside light. In addition, the opening of the cover member 300 may be provided with a window formed of a light transmitting material, in order to prevent impurities, such as, for example, dust or moisture, from entering the camera module.

Although the material of the cover member 300 may be a non-magnetic material such as, for example, SUS in order to prevent the cover member 300 from being attracted by the at least one second magnet 130, the cover member 300 may be formed of a magnetic material so as to function as a yoke.

Figure 3:
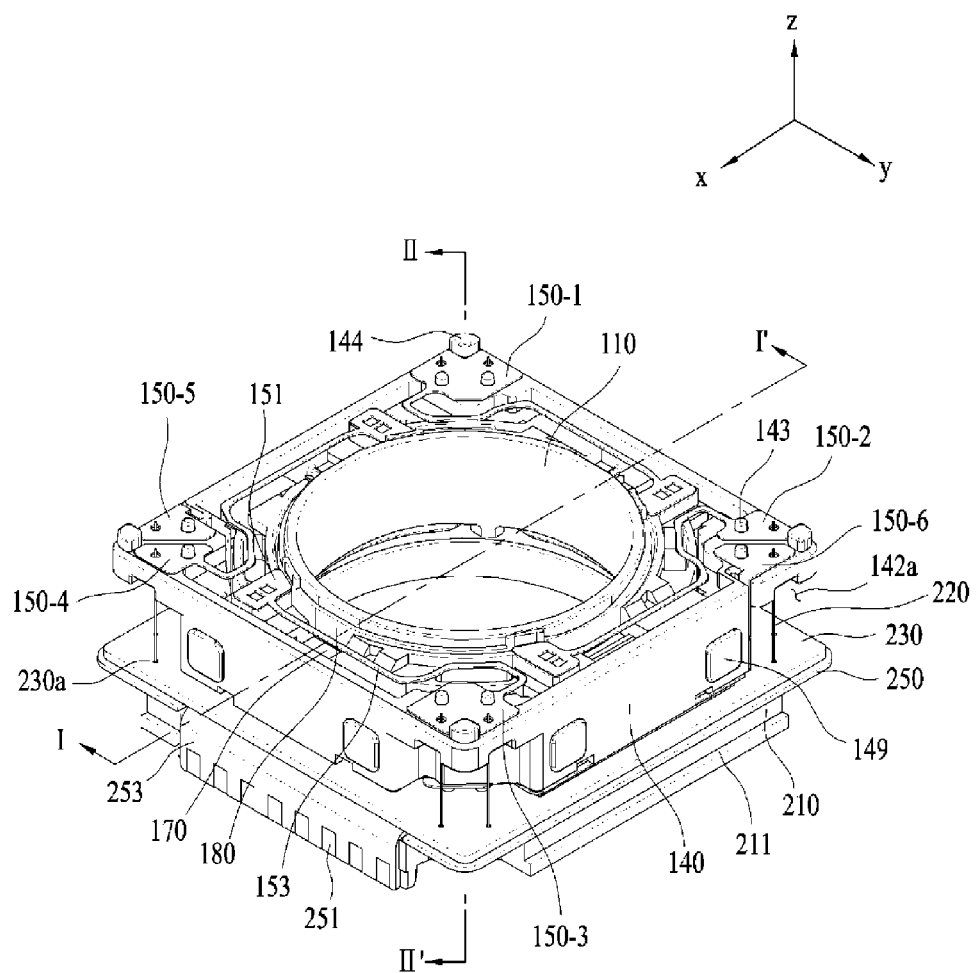
FIG. 3 is an assembled perspective view illustrating the lens moving apparatus after removal of a cover member for comparison with FIG. 1.
Figure 4:
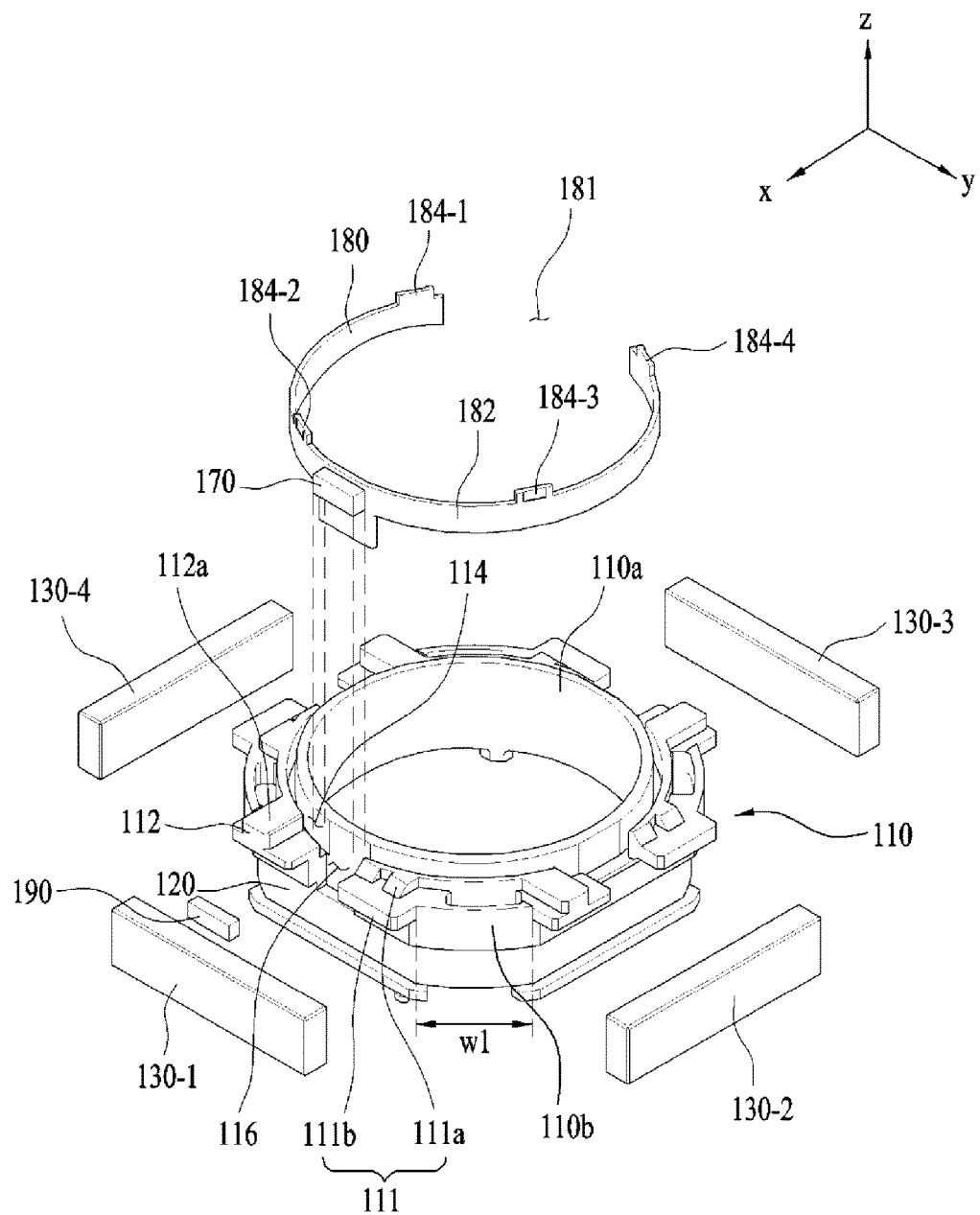
FIG. 4 is an exploded perspective view of a bobbin, a first coil, second magnets, a first position sensor, and a sensor board illustrated in FIG. 2.

FIG. 3 is an assembled perspective view illustrating the lens moving apparatus 100 after removal of the cover member 300 for comparison with FIG. 1, and FIG. 4 is an exploded perspective view of the bobbin 110, the first coil 120, the second magnets 130-1 to 130-4, the first position sensor 170, and the sensor board 180 illustrated in FIG. 2.

Next, the bobbin 110 will be described.

Referring to FIGS. 3 and 4, the bobbin 110 is placed inside the housing 140, which will be described below, and is movable in the optical axis direction, or in the first direction parallel to the optical axis, for example, the Z-axis via electromagnetic interaction between the first coil 120 and the at least one second magnet 130.

Although not illustrated, the bobbin 110 may include a lens barrel (not illustrated) in which at least one lens is installed. The lens barrel may be coupled inside the bobbin 110 in various manners.

The bobbin 110 may be configured to have a bore for the mounting of a lens or the lens barrel. The bore may have a circular, elliptical, or polygonal shape, without being limited thereto.

The bobbin 110 may include first and second protrusions 111 and 112.

Each first protrusion 111 of the bobbin 110 may include a guide portion 111a and a first stopper 111b.

The guide portion 111a of the bobbin 110 may serve to guide an installation position of the upper elastic member 150. For example, as exemplarily illustrated in FIG. 3, the guide portion 111a of the bobbin 110 may guide a path, along which a first frame connection portion 153 of the upper elastic member 150 passes.

For example, a plurality of guide portions 111a may be formed so as to protrude in the second and third directions, which are perpendicular to the first direction. In addition, guide portions 111a may be provided symmetrical to each other relative to the center of the bobbin 110 in a plane defined by the X-axis and the Y-axis as exemplarily illustrated, or may be provided asymmetrical to each other so as not to interfere with other elements unlike the illustration.

The second protrusions 112 of the bobbin 110 may be formed so as to protrude in the second and third directions, which are perpendicular to the first direction. In addition, each second protrusion 112 of the bobbin 110 may have an upper surface 112a shaped to allow a first inner frame 151 of the upper elastic member 150, which will be described below, to be seated thereon.

The first stoppers 111b of the first protrusions 111 and the second protrusions 112 of the bobbin 110 may serve to prevent the bottom surface of the body of the bobbin 110 from directly colliding with the base 210 and an upper surface of the circuit board 250 even if the bobbin 110 is moved beyond a prescribed range by, for example, an external shock when being moved in the optical axis direction or in the first direction parallel to the optical axis for auto-focusing.

To this end, the first stoppers 111b of the bobbin 110 may far protrude in the second or third direction, which is the circumferential direction, from the outer circumferential surface of the bobbin 110 than the guide portions 111a of the bobbin 110, and the second protrusions 112 of the bobbin 110 may far protrude laterally than the upper surface 112a on which the upper elastic member 150 is seated.

The bobbin 110 may have a support groove 114 provided between an inner circumferential surface 110a and an outer circumferential surface 110b of the bobbin 110 so as to enable the sensor board 180 to be inserted in the first direction (the Z-axis). For example, the support groove 114 of the bobbin 110 may be provided between the inner circumferential surface 110a of the bobbin 110 and the first and second protrusions 111 and 112 so as to enable the sensor board 180 to be inserted in the first direction (the Z-axis).

The bobbin 110 may have a receiving recess 116, which is suitable to receive the first position sensor 170 disposed, coupled, or mounted on the sensor board 180.

More specifically, the receiving recess 116 of the bobbin 110 may be provided in a space between the first and second protrusions 111 and 112 of the bobbin 110, so as to allow the first position sensor 170 mounted on the sensor board 180 to be inserted in the first direction.

The bobbin 110 may have support bosses 117 (see FIG. 8) formed at a lower surface thereof so as to be coupled and fixed to the lower elastic member 160.

When a state in which lower surfaces of the first and second protrusions 111 and 112 of the bobbin 110 come into contact with a bottom surface 146a of a first seating groove 146 of the housing 140 is set to an initial position, the auto-focusing function may be controlled as in the unidirectional control of a conventional Voice Coil Motor (VCM). That is, the auto-focusing function may be implemented such that the bobbin 110 is moved up when current is supplied to the first coil 120, and is moved down when the supply of current is interrupted.

However, when a position at which the lower surfaces of the first and second protrusions 111 and 112 of the bobbin 110 are spaced apart from the bottom surface 146a of the first seating groove 146 by a given distance is set to an initial position, the auto-focusing function may be controlled according to the direction of current as in bi-directional control of the conventional voice coil motor. That is, the auto-focusing function may be implemented via an operation in which the bobbin 110 is moved up or down in the direction parallel to the optical axis. For example, the bobbin 110 may be moved up when forward current is applied thereto, and may be moved down when reverse current is applied thereto.

Next, the first coil 120 will be described.

The first coil 120 is disposed on the outer circumferential surface (110b, see FIG. 4) of the bobbin 110. The first coil 120 may be disposed so as not to overlap the first position sensor 170 in the direction perpendicular to the optical axis.

For example, in order to ensure that the first coil 120 and the first position sensor 170 do not interfere or overlap each other in the direction perpendicular to the optical axis, the first position sensor 170 may be disposed at the upper side or an upper region of the outer circumferential surface 110b of the bobbin 110, and the first coil 120 may be disposed at the lower side, or a lower region of the outer circumferential surface 110b of the bobbin 110.

The first coil 120, as exemplarily illustrated in FIG. 4, may be wound so as to surround the outer circumferential surface 110b of the bobbin 110 in the direction in which the first coil 120 rotates about the optical axis.

The first coil 120 may first be wound around the outer circumferential surface of the bobbin 110 by an operator or a machine, and thereafter both distal ends, the beginning and terminating ends of the first coil 120 may be wound around and fixed to a pair of winding bosses (not illustrated) which protrude in the first direction from the lower surface of the bobbin 110.

At this time, a position of the distal end of the first coil 120 wound around the winding boss may be changed according to the operator. For example, although a pair of winding bosses may be located at symmetrical positions relative to the center of the bobbin 110, the embodiment is not limited thereto.

Figure 8:
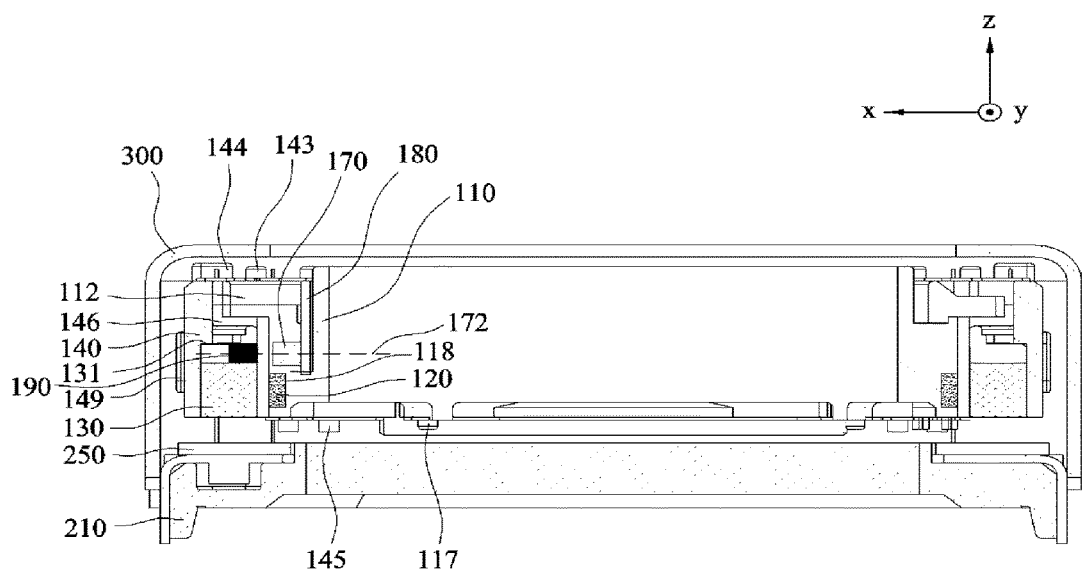
FIG. 8 is a sectional view taken along line I-I' illustrated in FIG. 3.

As exemplarily illustrated in FIG. 8, the first coil 120 may be inserted into a coil groove formed in the exterior or the outer circumferential surface of the bobbin 110 so as to be coupled to the bobbin 110.

The first coil 120 may be directly wound around the outer circumferential surface of the bobbin 110, without being limited thereto. The first coil 120 may be disposed on the outer circumferential surface of the bobbin 110 so as to take the form of an angled ring-shaped coil block or a coil ring (not illustrated).

Here, the coil ring may be coupled to the bobbin 110 as if the sensor board 180 is fitted into and fixed to the support groove 114 of the bobbin 110. The first coil 120 may be wound around a coil ring, rather than being wound around or disposed on the exterior of the bobbin 110.

The first coil 120 may have an approximately octagonal shape. This shape corresponds to the shape of the outer circumferential surface of the bobbin 110 because the bobbin 110 has an octagonal shape as exemplarily illustrated in FIG. 5A.

In addition, although at least four surfaces of the first coil 120 may have linear shapes, and corner portions connecting the four surfaces may also have linear shapes, the embodiment is not limited thereto, and the surfaces and corner portions of the first coil 120 may form a rounded shape.

The first coil 120 may be disposed such that the linear portions of the first coil 120 correspond to the respective second magnets 130-1 to 130-4. In addition, a surface of each second magnet 130-1 to 130-4 corresponding to the first coil 120 may have the same curvature as the curvature of the first coil 120.

That is, when the first coil 120 is linear, the surface of the second magnet 130 corresponding to the first coil 120 may be linear. When the first coil 120 is curvilinear, the surface of the second magnet 130 corresponding to the first coil 120 may be curvilinear. In addition, even if the first coil 120 is curvilinear, the corresponding surface of the second magnet 130 may be linear, or the opposite case is also possible.

The first coil 120 may produce electromagnetic force via interaction with the second magnet 130 when current is supplied thereto. The bobbin 110 may be moved in the optical axis direction, or in the first direction parallel to the optical axis by the produced electromagnetic force.

The first coil 120 may be configured so as to correspond to the second magnet 130. In the case where the second magnet 130 is configured as a single body such that the entire surface thereof facing the first coil 120 has the same polarity, the surface of the first coil 120 corresponding to the second magnet 130 may also be configured to have the same polarity.

In the case where the second magnet 130 is divided into two to four segments in the direction perpendicular to the optical axis, the surface of the first coil 120 facing the second magnet 130 may also be divided into a number corresponding to the number of segments into which the second magnet 130 is divided.

Next, the first position sensor 170 and the sensor board 180 will be described.

The first position sensor 170 may be disposed, coupled, or mounted on the bobbin 110, so as to be moved along with the bobbin 110.

When the bobbin 110 is moved in the optical axis direction or in the direction parallel to the optical axis, the first position sensor 170 may be moved along with the bobbin 110. In addition, the first position sensor 170 may sense the strength of a magnetic field of the first magnet 190 depending on the movement of the bobbin 110, and may provide a feedback signal or an output signal based on the sensed result. Displacement of the bobbin 110, for example, displacement in the optical axis direction or in the first direction parallel to the optical axis may be adjusted using the output signal or the feedback signal of the first position sensor 170.

The first position sensor 170 may be electrically connected to the sensor board 180, and may be implemented as a driver including a Hall sensor, or may be implemented as a position detection sensor alone such as, for example, a Hall sensor.

The first position sensor 170 may be disposed, coupled, or mounted on the bobbin 110 in various forms, and may receive current in various methods depending on the form in which it is disposed, coupled, or mounted.

The first position sensor 170 may be disposed, coupled, or mounted on the outer circumferential surface of the bobbin 110. The first position sensor 170 may be disposed, coupled, or mounted on the sensor board 180, and the sensor board 180 may be coupled to the bobbin 110. That is, the first position sensor 170 may be indirectly disposed, coupled, or mounted on the bobbin 110 through the sensor board 180.

The first position sensor 170 may be electrically connected to at least one of the upper elastic member 150 or the lower elastic member 160 which will be described below. For example, the first position sensor 170 may be electrically connected to the upper elastic member 150.

Figure 5A:
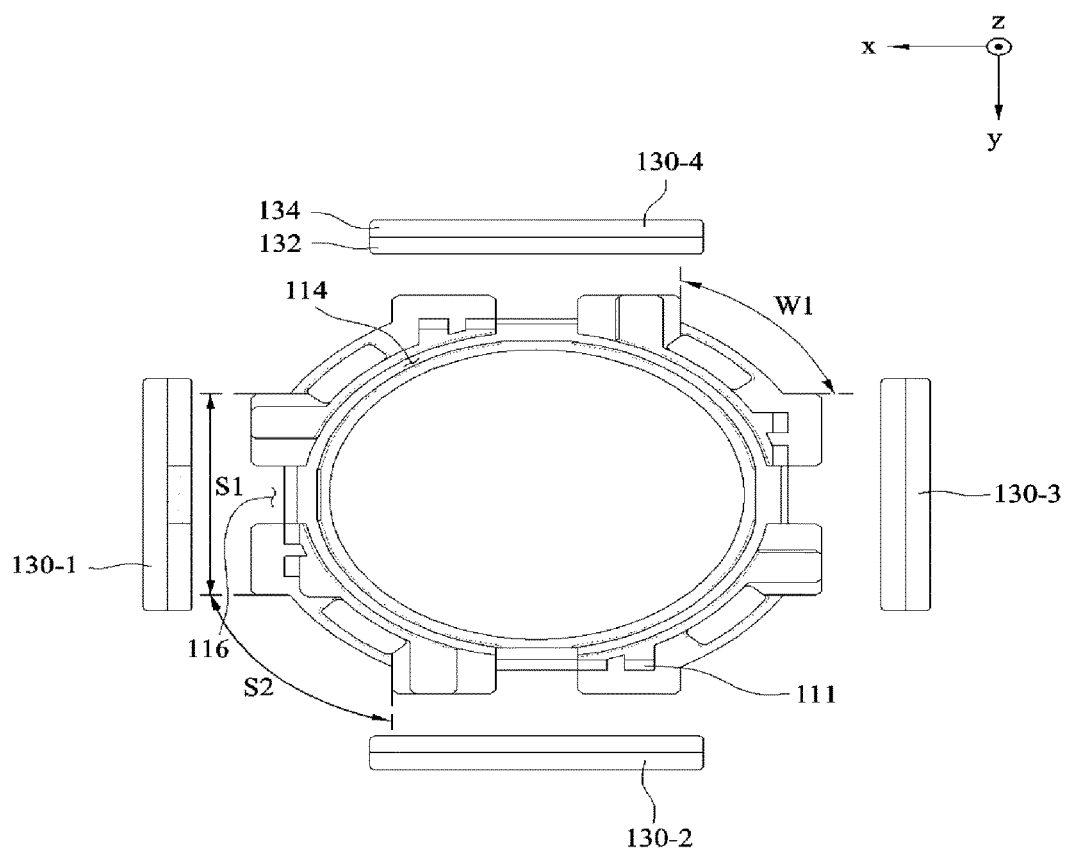
FIG. 5A is a plan view of the bobbin and the magnets illustrated in FIG. 4.
Figure 5B:
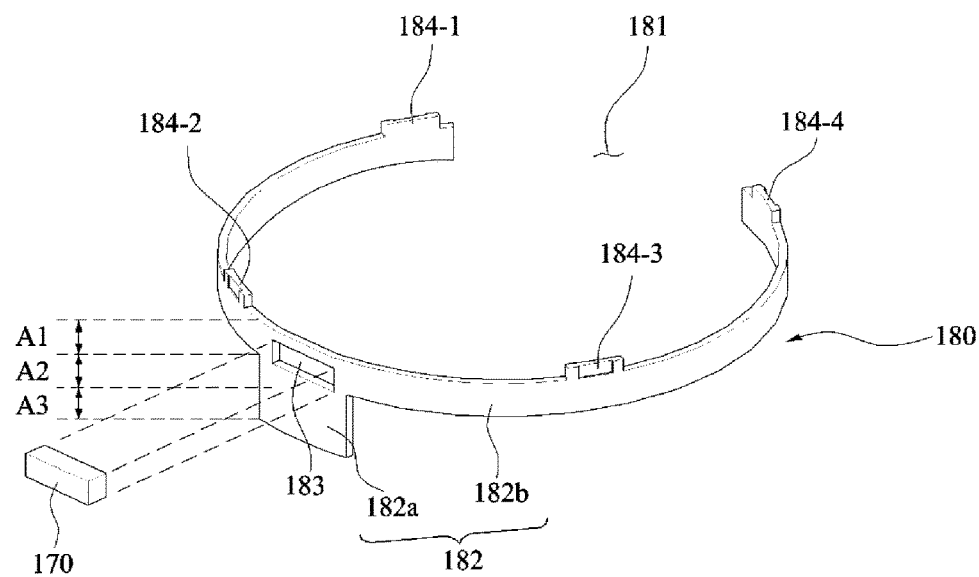
FIG. 5B is a perspective view illustrating another embodiment of the sensor board illustrated in FIG. 4.
Figure 5C:
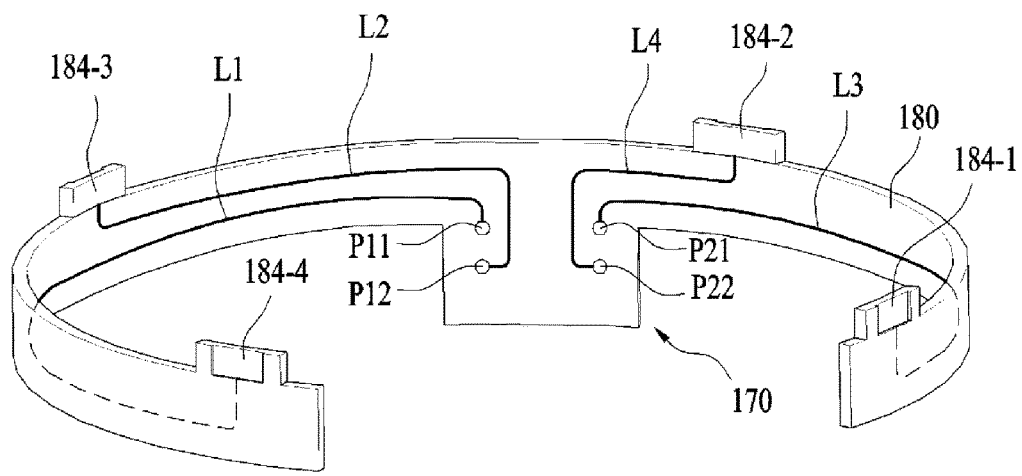
FIG. 5C is a rear perspective view of the first position sensor and the sensor board illustrated in FIG. 4 according to one embodiment.

FIG. 5A is a plan view of the bobbin 110 and the second magnets 130-1 to 130-4 illustrated in FIG. 4, FIG. 5B is a perspective view illustrating another embodiment of the sensor board 180 illustrated in FIG. 4, and FIG. 5C is a rear perspective view of the first position sensor 170 and the sensor board 180 illustrated in FIG. 4 according to one embodiment.

Referring to FIGS. 4 and 5A, the sensor board 180 may be mounted on the bobbin 110, and may be moved along with the bobbin 110 in the optical axis direction or in the direction parallel to the optical axis.

For example, the sensor board 180 may be inserted into the support groove 114 of the bobbin 110 so as to be coupled to the bobbin 110. The sensor board 180 is sufficient so long as it is mounted on the bobbin 110, and FIG. 4 illustrates a ring shape, without being limited thereto.

The first position sensor 170 may be attached to and supported by a front surface of the sensor board 180 using an adhesive member such as, for example, a double-sided tape or epoxy.

The outer circumferential surface 110b of the bobbin 110 may include first side surfaces S1 and second side surfaces S2.

The first side surfaces S1 of the outer circumferential surface 110b of the bobbin 110 may correspond to first side portions 141 of the housing 140 on which the second magnets 130 are disposed respectively. The second side surfaces S2 of the outer circumferential surface 110b of the bobbin 110 may correspond to second side portions 142 of the housing 140, and may be located between the first side surfaces S1 so as to connect the first side surfaces S1 to one another.

The first position sensor 170 may be disposed on any one of the first side surfaces S1 of the bobbin 110. For example, the receiving recess 116 of the bobbin 110 may be provided at any one of the first side surfaces S1 of the bobbin 110, and the first position sensor 170 may be located in the receiving recess 116 of the bobbin 110.

Referring to FIG. 5B, the first position sensor 170 may be disposed, coupled, or mounted on an upper region A1, a middle region A2, or a lower region A3 of an outer circumferential surface of the sensor board 180 in various forms. At this time, the first position sensor 170 may receive current from an external source through a circuit pattern of the sensor board 180.

For example, the first position sensor 170 may be disposed, coupled, or mounted on the upper region A1 of the outer circumferential surface of the sensor board 180. This serves to locate the first position sensor 170 distant from the first coil 120 so as to restrain the first position sensor 170 from being affected by a magnetic field of the first coil 120 within a high frequency range, thereby preventing malfunction and an error of the first position sensor 170.

As exemplarily illustrated in FIG. 5B, the sensor board 180 may have a mounting recess 183 formed in the upper region A1 of the outer circumferential surface thereof, and the first position sensor 170 may be disposed, coupled, or mounted in the mounting recess 183 of the sensor board 180.

In order to ensure efficient introduction of the adhesive member, for example, epoxy into the mounting recess 183 of the sensor board 180 for the assembly of the first position sensor 170, the mounting recess 183 of the sensor board 180 may be provided with a tapered slope (not illustrated) on at least one surface thereof. In addition, although the adhesive member, for example, epoxy may not be introduced into the mounting recess 183 of the sensor board 180, the introduction of epoxy may increase the coupling force or mounting force of the first position sensor 170.

The sensor board 180 may include a body 182, elastic member contact portions 184-1 to 184-4, and a circuit pattern L1 to L4.

In the case where the support groove 114 of the bobbin 110 has the same shape as the outer circumferential surface of the bobbin 110, the body 182 of the sensor board 180, which is inserted into the support groove 114 of the bobbin 110, may be shaped so as to be inserted into and fixed to the support groove 114.

As exemplarily illustrated in FIGS. 3 to 5A, although the support groove 114 of the bobbin 110 and the body 182 of the sensor board 180 may have a circular plan shape, for example, a circular band or strip shape, the embodiment is not limited thereto. In another embodiment, the support groove 114 of the bobbin 110 and the body 182 of the sensor board 180 may have a polygonal plan shape.

Referring to FIG. 5B, the body 182 of the sensor board 180 may include a first segment 182a on which the first position sensor 170 is disposed, coupled, or mounted, and a second segment 182b extending from the first segment 182b so as to be inserted into the support groove 114 of the bobbin 110.

Although the sensor board 180 may be provided with an opening 181 at a position opposite to the first segment 182a so as to be easily inserted into the support groove 114 of the bobbin 110, the embodiment is not limited as to the specific shape of the sensor board 180.

In addition, the elastic member contact portions 184-1 to 184-4 of the sensor board 180 may protrude from the body 182 of the sensor board 180 in the direction in which they may come into contact with a first inner frame 151, for example, in the optical axis direction or in the direction parallel to the optical axis.

The elastic member contact portions 184-1 to 184-4 of the sensor board 180 are portions to be connected to the first inner frame 151 of the upper elastic member 150 which will be described below.

The circuit pattern L1 to L4 of the sensor board 180 may be formed at the body 182 of the sensor board 180, and may electrically connect the first position sensor 170 to the elastic member contact portions 184-1 to 184-4.

For example, the first position sensor 170 may be a Hall sensor, but any other sensor may be used so long as it can sense the strength of a magnetic field. In the case where the first position sensor 170 is implemented as a Hall sensor, the Hall sensor 170 may have a plurality of pins.

For example, the pins may include input pins P11 and P12 and output pins P21 and P22. Although signals output through the output pins P21 and P22 may be voltages, the embodiment is not limited thereto, and the signals may be current.

The input pins P11 and P12 and the output pins P21 and P22 of the first position sensor 170 may be electrically connected to the elastic member contact portions 184-1 to 184-4 through the circuit pattern L1 to L4 respectively.

For example, referring to FIG. 5C, a first line L1 of the circuit pattern may electrically connect the first input pin P11 and the fourth elastic member contact portion 184-4 to each other, a second line L2 of the circuit pattern may electrically connect the second input pin P12 and the third elastic member contact portion 184-3 to each other, a third line L3 of the circuit pattern may electrically connect the first output pin P21 and the first elastic member contact portion 184-1 to each other, and a fourth line L4 of the circuit pattern may electrically connect the second output pin P22 and the second elastic member contact portion 184-2 to each other.

In the embodiment, the first to fourth lines L1 to L4 may be formed so as to be visible. In another embodiment, the lines L1 to L4 may be formed on the body 182 of the sensor board 180 so as to be invisible.

The first position sensor 170 may be opposite to or aligned with the first magnet 190 which is disposed on the housing 140.

For example, at the initial position, at least a portion of the first position sensor 170 may overlap the first magnet 190 in the direction perpendicular to the optical axis, and the first position sensor 170 may not overlap the second magnet 130 in the direction perpendicular to the optical axis.

For example, at the initial position, the first position sensor 170 may be disposed such that a virtual horizontal line 172, which passes through the center of the first position sensor 170 and is parallel to the direction perpendicular to the optical axis, is aligned with the center of the first magnet 190, without being limited thereto. Here, the initial position may be an initial position of a movable unit when power is not applied to the first coil 120, or may be a position at which a movable unit is located as the upper and lower elastic members 150 and 160 are deformed only by the weight of the movable unit.

At this time, although the bobbin 110 may be vertically moved in the optical axis direction or in the direction parallel to the optical axis on the basis of a reference point at which the virtual horizontal line 172 coincides with the center of the first magnet 190, the embodiment is not limited thereto.

In another embodiment, at the initial position, the center of the first position sensor 170 may be aligned with the center of the first magnet 190 in the direction perpendicular to the optical axis, and although at least the center of the first position sensor 170 may not overlap the second magnet 130 in the direction perpendicular to the optical axis, the remaining portion excluding the center of the first position sensor 170 may overlap the second magnet 130.

In addition, in another embodiment, although at the initial position, the center of the first position sensor 170 may not overlap the center of the second magnet 130 in the direction perpendicular to the optical axis, the remaining portion excluding the center of the second magnet 130 may overlap the center of the first position sensor 170.

Next, the housing 140 will be described.

The housing 140 supports the first magnet 190 used for sensing and the second magnets 130 used for driving, and receives the bobbin 110 therein so as to allow the bobbin 110 to be moved in the optical axis direction or in the direction parallel to the optical axis.

The housing 140 may generally have a hollow column shape. For example, the housing 140 may have a polygonal (e.g., a square or octagonal) or circular bore.

Figure 6:
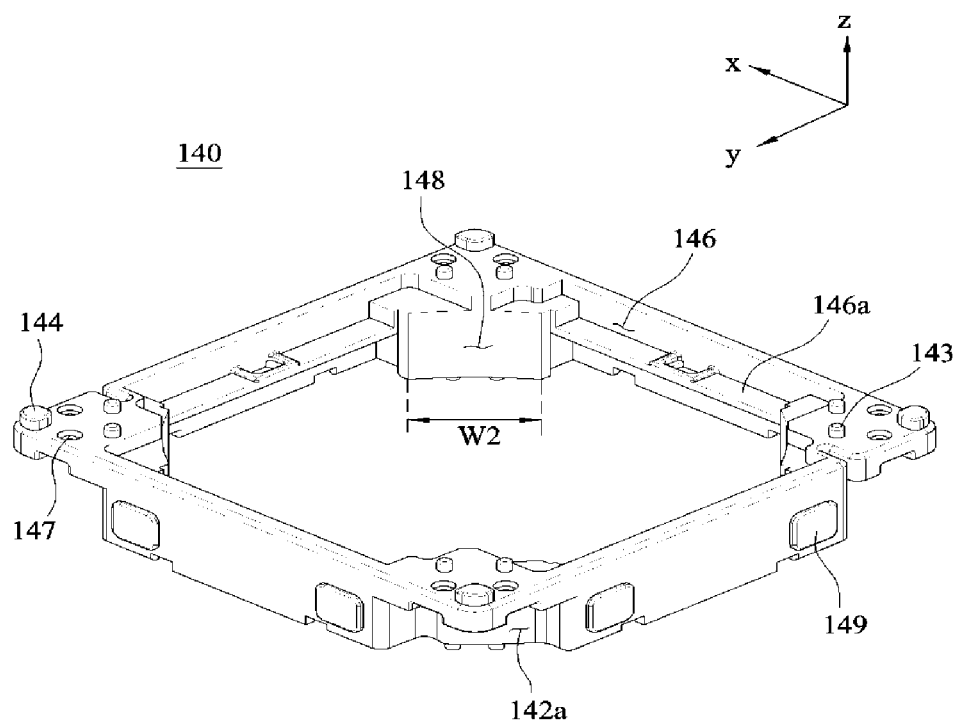
FIG. 6 is a plan perspective view of a housing illustrated in FIG. 2.
Figure 7:
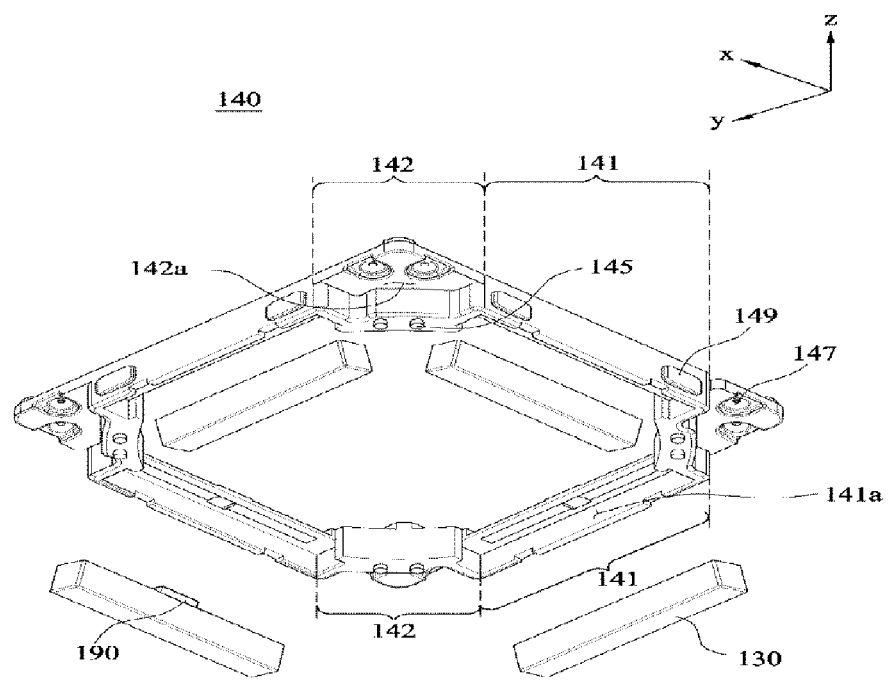
FIG. 7 is a bottom exploded perspective view of the housing, the first magnet, and the second magnets illustrated in FIG. 2.
Figure 9:
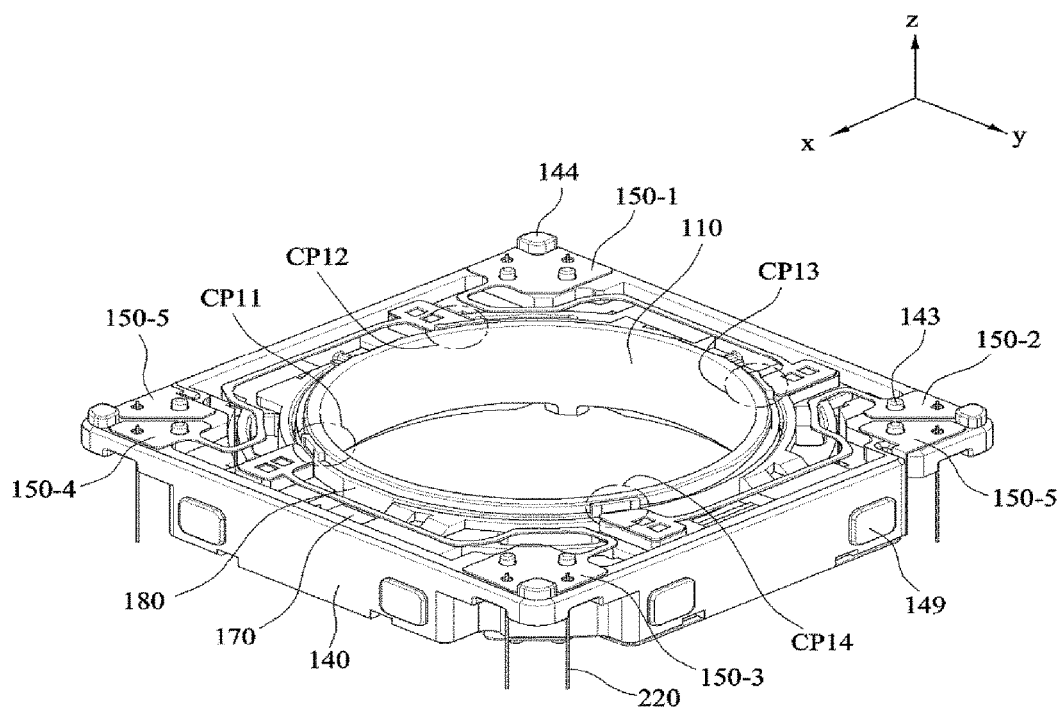
FIG. 9 is a plan perspective view illustrating the coupled state of the bobbin, the housing, an upper elastic member, the first position sensor, the sensor board, and a plurality of support members illustrated in FIG. 2.
Figure 10:
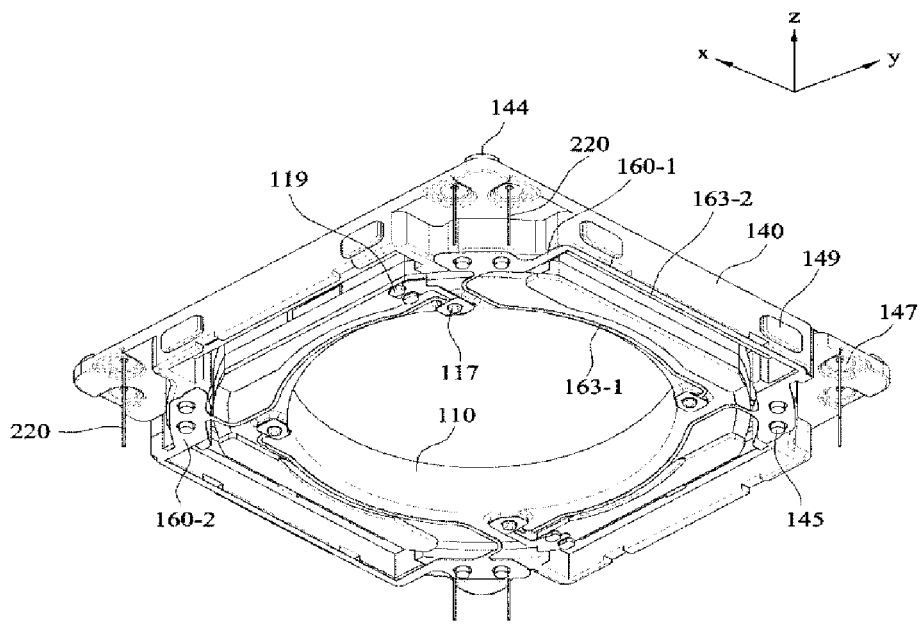
FIG. 10 is a bottom perspective view illustrating the coupled state of the bobbin, the housing, a lower elastic member, and the support members illustrated in FIG. 2.

FIG. 6 is a plan perspective view of the housing 140 illustrated in FIG. 2, FIG. 7 is a bottom exploded perspective view of the housing 140, the first magnet 190, and the second magnets 130 illustrated in FIG. 2, FIG. 8 is a sectional view taken along line I-I' illustrated in FIG. 3, FIG. 9 is a plan perspective view illustrating the coupled state of the bobbin 110, the housing 140, the upper elastic member 150, the first position sensor 170, the sensor board 180, and the support members 220 illustrated in FIG. 2, FIG. 10 is a bottom perspective view illustrating the coupled state of the bobbin 110, the housing 140, the lower elastic member 160, and the support members 220 illustrated in FIG. 2.

The housing 140 may have the first seating groove 146 formed at a position corresponding to the first and second protrusions 111 and 112 of the bobbin 110.

The housing 140 may have a third protrusion 148, which corresponds to a space having a first width W1 between the first and second protrusions 111 and 112.

A surface of the third protrusion 148 of the housing 140, which is opposite to the bobbin 110, may have the same shape as the shape of the second side portion S2 of the bobbin 110. At this time, the first width W1 between the first and second protrusions 111 and 112 of the bobbin 110 illustrated in FIG. 4 and a second width W2 of the third protrusion 148 of the housing 140 illustrated in FIG. 6 may have a given tolerance. As such, rotation of the third protrusion 148 of the housing 140 between the first and second protrusions 111 and 112 of the bobbin 110 may be controlled. In this way, even if the bobbin 110 receives force so as to be rotated about the optical axis, the third protrusion 148 of the housing 140 may prevent the rotation of the bobbin 110.

For example, the outer periphery of an upper portion, or an upper edge of the outer periphery of the housing 140 has a square plan shape, whereas the inner periphery of a lower portion, or an inner edge of the inner periphery may have an octagonal plan shape as exemplarily illustrated in FIGS. 6 and 7. The housing 140 may include a plurality of side portions. For example, the housing 140 may include four first side portions 141 and four second side portions 142.

The first side portions 141 of the housing 140 may correspond to portions to which the second magnets 130 are installed. The second side portions 142 of the housing 140 may be located between the two neighboring first side portions, and may correspond to portions at which the support members 220 are located. The first side portions 141 of the housing 140 may interconnect the second side portions 142 of the housing 140, and may include planes having a constant length.

Each of the first side portions 141 of the housing 140 may have an area equal to or greater than an area of the corresponding second magnet 130.

The housing 140 may have magnet seating portions 141a provided at inner surfaces of the first side portions 141 in order to accommodate the first magnet 190 and the second magnets 130-1 to 130-4.

Each of the second magnets 130-1 to 130-4 may be inserted, located, or fixed to the magnet seating portion 141a which is provided at a corresponding one of the first side portions 141 of the housing 140.

The magnet seating portion 141a of the housing 140 may be configured as a recess corresponding to the size of the second magnet 130, and at least three surfaces, for example, side surfaces and an upper surface of the magnet seating portion 141a may be provided so as to face the second magnet 130.

A bottom surface of the magnet seating portion 141a of the housing 140, i.e. a surface facing the second coils 230 that will be described below, may be provided with an opening. A bottom surface of the second magnet 130 fixed in the magnet seating portion 141a may face the second coils 230.

The second magnet 130 may be secured to the magnet seating portion 141a of the housing 140 using an adhesive, without being limited thereto, and for example, an adhesive member such as a double-sided tape may be used.

Alternatively, the magnet seating portion 141a of the housing 140 may be configured as a mounting hole which allows a portion of the second magnet 130 to be fitted thereinto or to be exposed therefrom, rather than being configured as the recess illustrated in FIG. 7.

The first magnet 190 may be disposed so as to face the first position sensor 170 which is disposed on the bobbin 110 in the direction perpendicular to the optical axis. For example, the first magnet 190 may be disposed on any one of the first side portions 141 of the housing 140. The first position sensor 170 may be disposed on any one first side surface, among the first side surfaces S1 of the bobbin 110, which corresponds to the first side portion of the housing 140 on which the first magnet 190 is disposed.

For example, the first magnet 190 may be secured to the magnet seating portion 141a of the housing 140 so as to be disposed on the second magnet 130.

For example, the first magnet 190 may be disposed on any one second magnet (e.g. 130-1) among the second magnets 130-1 to 130-4.

The first magnet 190 may come into contact with any one second magnet (e.g. 130-1), without being limited thereto. In another embodiment, the first magnet 190 may be spaced apart from the second magnet (e.g. 130-1). To this end, the housing 140 may have a separate magnet seating portion (not illustrated) configured to accommodate the second magnet 130 spaced apart from the first magnet 190. That is, a portion of the housing 140 may be located between the first magnet 190 and the second magnet (e.g. 130-1).

The first side portions 141 of the housing 140 may be disposed parallel to a side surface of the cover member 300. In addition, the first side portions 141 of the housing 140 may be larger than the second side portions 142. The second side portions 142 of the housing 140 may define paths for the passage of the support members 220. Each second side portion 142 of the housing 140 may have a first through-hole 147 formed in the top thereof. The support member 220 may be connected to the upper elastic member 150 through the first through-hole 147.

In addition, in order to prevent the housing 140 from directly colliding with the inner side surface of the cover member 300 illustrated in FIG. 2, the housing 140 may be provided at an upper end thereof with second stoppers 144.

The housing 140 may have at least one upper support boss 143 formed on an upper surface thereof for the coupling of the upper elastic member 150.

For example, the upper support boss 143 of the housing 140 may be formed on the upper surface of the housing 140 corresponding to the second side portions 142 of the housing 140, without being limited thereto. The upper support boss 143 of the housing 140 may have a semispherical shape as illustrated, or may have a cylindrical or prism shape, without being limited thereto.

The housing 140 may have a lower support boss 145 formed on a lower surface thereof for the coupling and fixing of the lower elastic member 160.

In order to define paths for the passage of the support members 220 and to ensure space to be filled with gel-type silicon, which serves as a damper, the housing 140 may have recesses 142a formed in the second side portions 142. That is, the recesses 142a in the housing 140 may be filled with damping silicon.

The housing 140 may have a plurality of third stoppers 149 protruding from the first side portions 141. The third stoppers 149 serve to prevent the housing 140 from colliding with the cover member 300 when the housing 140 is moved in the second and third directions.

In order to prevent the lower surface of the housing 140 from colliding with the base 210 and/or the circuit board 250 which will be described below, the housing 140 may have a fourth stopper (not illustrated) protruding from the lower surface thereof. Through this configuration, the housing 140 may be downwardly spaced apart from the base 210 and upwardly spaced apart from the cover member 300, thereby maintaining a constant height thereof in the optical axis direction without interference. Accordingly, the housing 140 may perform a shifting operation in the second and third directions which are the front-and-rear direction and the left-and-right direction, respectively, in a plane perpendicular to the optical axis.

Next, the first magnet 190 and the second magnets 130 will be described.

The second magnets 130 may be disposed on the housing 140 so as to correspond to the first coil 120. The second magnets 130 may be disposed or received inside the first side portions 141 of the housing 140 so as to be supported by the first side portions 141 as illustrated in FIG. 7.

For example, referring to FIG. 8, each second magnet 130 may be disposed on the magnet seating portion 141a of the housing 140 so as to overlap the first coil 120 in the direction perpendicular to the optical axis.

The first and second magnets 190 and 130 are received inside the first side portions 141 of the housing 140, without being limited thereto.

In another embodiment, the first and second magnets 190 and 130 may be disposed outside the first side portions 141 of the housing 140, or inside or outside the second side portions 142 of the housing 140.

In addition, in another embodiment, the first magnet 190 may be received inside the first side portion 141 of the housing 140, and the second magnets 130 may be received outside the first side portions 141 of the housing 140. Alternatively, the first and second magnets 190 and 130 may be received in the opposite manner.

In addition, in another embodiment, the first magnet 190 may be received inside or outside the first side portion 141 of the housing 140, and the second magnets 130 may be received inside or outside the second side portions 142 of the housing 140. Alternatively, the first and second magnets 190 and 130 may be received in the opposite manner.

The second magnets 130 may have an approximately rectangular shape corresponding to the first side portions 141 of the housing 140, and facing surfaces of the first coil 120 and the second magnet 130 may have the same shape and the same curvature.

The second magnets 130 may be configured as a single body, and the single second magnet 130 may be disposed such that a surface thereof that faces the first coil 120 defines an S-pole 132 and an outer surface thereof defines an N-pole 134. However, the embodiment is not limited thereto, and the opposite configuration is possible.

At least two second magnets 130 may be disposed on the housing 140. In the embodiment, four second magnets 130 may be disposed. At this time, the second magnets 130 may have an approximately square plan shape as exemplarily illustrated in FIG. 5A, or may have a triangular or diamond shape.

Although surfaces of the second magnets 130 facing the first coil 120 may be flat surfaces, the embodiment is not limited thereto. The surfaces of the second magnets 130 facing the first coil 120 may be curved surfaces having a corresponding curvature.

With the configuration described above, a constant distance between the second magnets 130 and the first coil 120 may be maintained. In the embodiment, one of the second magnets 130-1 to 130-4 may be disposed on each of the four first side portions 141 of the housing 140, without being limited thereto. Based on design, only one of the facing surfaces of the second magnet 130 and the first coil 120 may be a flat surface and the other surface may be a curved surface. Alternatively, both the facing surfaces of the first coil 120 and the second magnet 130 may be curved surfaces. At this time, the facing surfaces of the first coil 120 and the second magnet 130 may have the same curvature.

In the case where the second magnets 130 may have a square plan shape as exemplarily illustrated in FIG. 5A, a pair of second magnets among the second magnets 130-1 to 130-4 may be disposed parallel to each other in the second direction, and the other pair of second magnets may be disposed parallel to each other in the third direction. This arrangement may enable the movement control of the housing 140 for handshake compensation that will be described below.

The first magnet 190 may be disposed on the housing 140 so as to overlap at least a portion of the first position sensor 170 in the second direction perpendicular to the optical axis at the initial position. For example, the first magnet 190, as exemplarily illustrated in FIG. 7, may be received, along with the second magnet (e.g. 130-1) inside the first side portion 141 of the housing 140 so as to be supported by the first side portion 141.

Figure 13A:
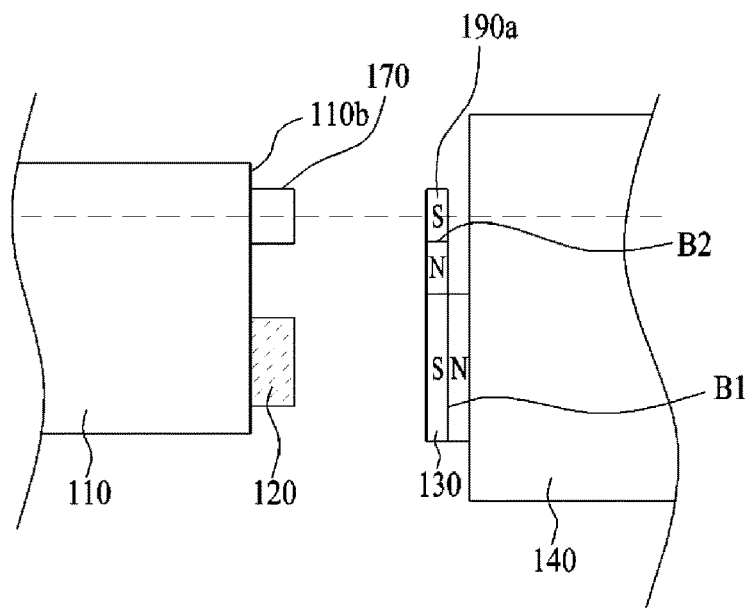
FIG. 13A is a view illustrating one embodiment of the arrangement relationship between the first coil, the first position sensor, the first magnet, and the second magnet of FIG. 2.

FIG. 13A is a view illustrating one embodiment of an arrangement relationship between the first coil 120, the first position sensor 170, a first magnet 190a, and the second magnet 130 of FIG. 2.

Referring to FIG. 13A, the first coil 120 may be disposed at the lower side or a lower region of the outer circumferential surface 110b of the bobbin 110, and the first position sensor 170 may be disposed at the upper side or an upper region of the outer circumferential surface 110b of the bobbin 110 so as to be spaced apart from the first coil 120.

The second magnet 130 is mounted to the housing 140 so as to face the first coil 120 at the initial position. That is, the second magnet 130 may be disposed so as to overlap the first coil 120 in the direction perpendicular to the optical axis at the initial position.

The second magnet 130 may be a unipolar magnet, the inner side and the outer side of which have different polarities.

Referring to FIG. 13A, the second magnet 130 may be disposed such that the boundary B1 between an S-pole and an N-pole is parallel to the direction perpendicular to the direction in which the second magnet 130 and the first coil 120 face each other. For example, the boundary B1 between the S-pole and the N-pole of the second magnet 130 disposed on the housing 140 may be parallel to the optical axis.

Although the second electrode 130 may be disposed such that the surface thereof facing the second coils 120 is the S-pole 132 and the opposite surface is the N-pole 134, the embodiment is not limited thereto, and the opposite configuration is also possible.

The first magnet 190a may be mounted to the housing 140 so as to be located above the second magnet 130. The first magnet 190a may be a unipolar magnet, the upper side and the lower side of which have different polarities. For example, a boundary B2 between an S-pole and an N-pole of the first magnet 190a may be perpendicular to the boundary B1 between the S-pole and the N-pole of the second magnet 130, without being limited thereto. The size of the first magnet 190a may be smaller than the size of the second magnet 130, without being limited thereto. Here, the size may be the volume of the magnet, or the area of the N-pole and the S-pole.

The first magnet 190a may be disposed to come into contact with the second magnet 130. For example, the polarity (e.g., the N-pole) of the lower side of the first magnet 190may be opposite to the polarity (e.g., the S-pole) of a portion of the second magnet 130 coming into contact with the first magnet 190a.

In another embodiment, the first magnet 190a may be mounted to the housing 140 so as to be spaced apart from the second magnet 130. The housing 140 may have a mounting recess so that the first magnet 190a is fixed in the mounting recess so as to be spaced apart from the second magnet 130. The first magnet 190a may overlap at least a portion of the second magnet 130 in the direction parallel to the optical axis.

At the initial position, the first position sensor 170 may overlap at least a portion of the first magnet 190a in the direction perpendicular to the optical axis. On the other hand, at the initial position, the first position sensor 170 may not overlap the second magnet 130 in the direction in which the first position sensor 170 and the first magnet 190a face each other. For example, at the initial position, the first position sensor 170 may not overlap the second magnet 130 in the direction perpendicular to the optical axis.

The first position sensor 170 may sense the strength of a magnetic field of the first magnet 190a, and may output a voltage having a level in proportion to the sensed strength of the magnetic field.

For example, at the initial position, the center of the first position sensor 170 may overlap the S-pole of the first magnet 190a in the direction perpendicular to the optical axis.

Figure 13B:
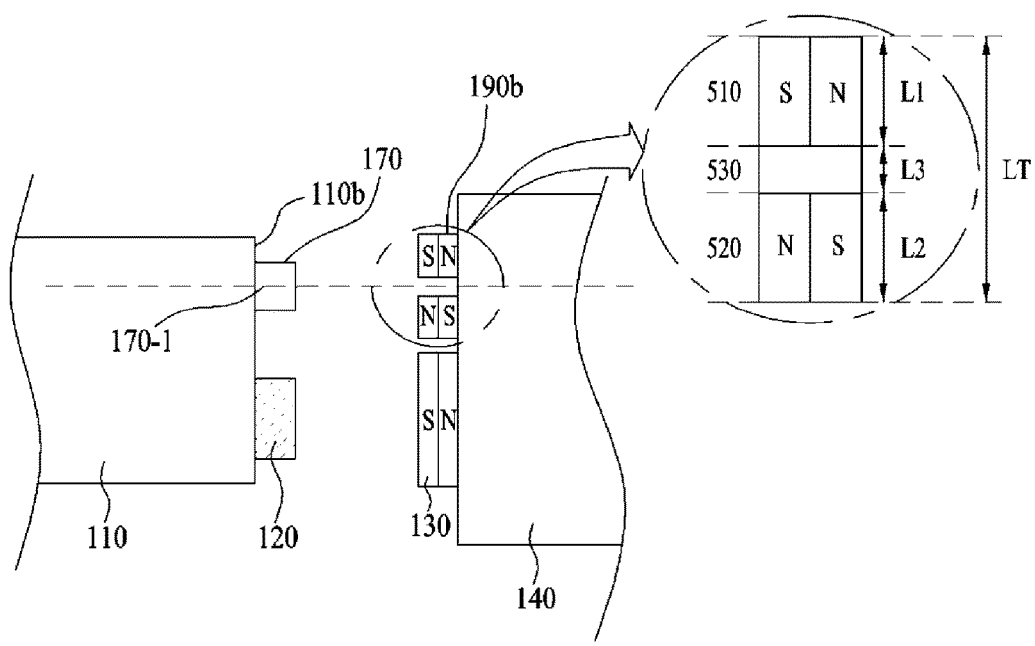
FIG. 13B is a view illustrating another embodiment of the arrangement relationship between the first coil, the first position sensor, the first magnet, and the second magnet of FIG. 2.

FIG. 13B is a view illustrating another embodiment of an arrangement relationship between the first coil 120, the first position sensor 170, a first magnet 190b, and the second magnet 130 of FIG. 2. The same reference numerals as those of FIG. 13A indicate the same configuration, and the same configuration will be described brief, or a description thereof will be omitted.

Referring to FIG. 13B, the first magnet 190b may be a bipolar magnet, the upper side and the lower side of which have different polarities. The kinds of the first magnet 190b may be broadly divided into ferrite, alnico, and rare-earth magnets, for example, and may be sorted into a P-type and an F-type according to the form of a magnetic circuit. The embodiment is not limited as to the kind of bipolar magnet.

The first magnet 190b may include a first sensing magnet 510, a second sensing magnet 520, and a non-magnetic partition 530.

The first sensing magnet 510 and the second sensing magnet 520 may be spaced apart from each other so as to face each other in the optical axis direction or in the direction parallel to the optical axis. The non-magnetic partition 530 may be located between the first sensing magnet 510 and the second sensing magnet 520.

In another embodiment, the first sensing magnet and the second sensing magnet may be spaced apart from each other so as to face each other in the direction perpendicular to the optical axis, and the non-magnetic partition may be located therebetween.

The non-magnetic partition 530 may include a section, which is a portion exhibiting substantially no magnetism and almost no polarity, and may be filled with air, or may include a non-magnetic substance.

A length L3 of the non-magnetic partition 530 may be half or less of the overall length LT of the first magnet 190b in the optical axis direction or in the direction parallel to the optical axis. For example, the length L3 of the non-magnetic partition 530 may be 5% or more, or 50% or less of the overall length LT of the first magnet 190b.

A length L1 of the first sensing magnet 510 and a length of the second sensing magnet 520, which face the first position sensor 170, may be the same, without being limited thereto. In another embodiment, a first length L1 of the first sensing magnet 510 and a second length L2 of the second sensing magnet 520, which face the first position sensor 170, may be different from each other.

A movable unit (e.g. the bobbin 110) of the lens moving apparatus 100 may move from the initial position in the +Z-axis direction or the –Z-axis direction via AF driving. At the initial position, the movable unit (e.g. the bobbin 110) may be spaced apart from a fixed unit (e.g. the housing 140) by the upper and lower elastic members 150 and 160.

At the initial position, a center 170-1 of the first position sensor 170 may be aligned to face the non-magnetic partition 530 of the first magnet 190b in the direction perpendicular to the optical axis, without being limited thereto. This serves to allow the strength of a magnetic field of the first magnet 190b, as sensed by the first position sensor 170, to exhibit a linear period when displacement of the movable unit varies in the optical axis direction or in the direction parallel to the optical axis.

According to the kind of the first magnet 190b, the center 170-1 of the first position sensor 170 may be aligned to face any one of the first sensing magnet 510, the second sensing magnet 520, and the non-magnetic partition 530 in the direction perpendicular to the optical axis at the initial position.

In order to increase the interactive electromagnetic force between an Auto-Focusing (AF) coil and a driving magnet, the AF coil is disposed so as to face the driving magnet, i.e. so as to be opposite thereto. In order to sense the generation of interactive electromagnetic force and the strength of a magnetic field, the driving magnet may be shared by an AF position sensor and the AF coil. To this end, the AF position sensor may be located in the vicinity of the AF coil. When the AF position sensor is located in the vicinity of the AF coil, the AF position sensor is affected by a magnetic field of the AF coil in a high frequency range, which may cause malfunction of the AF position sensor.

Figure 14:
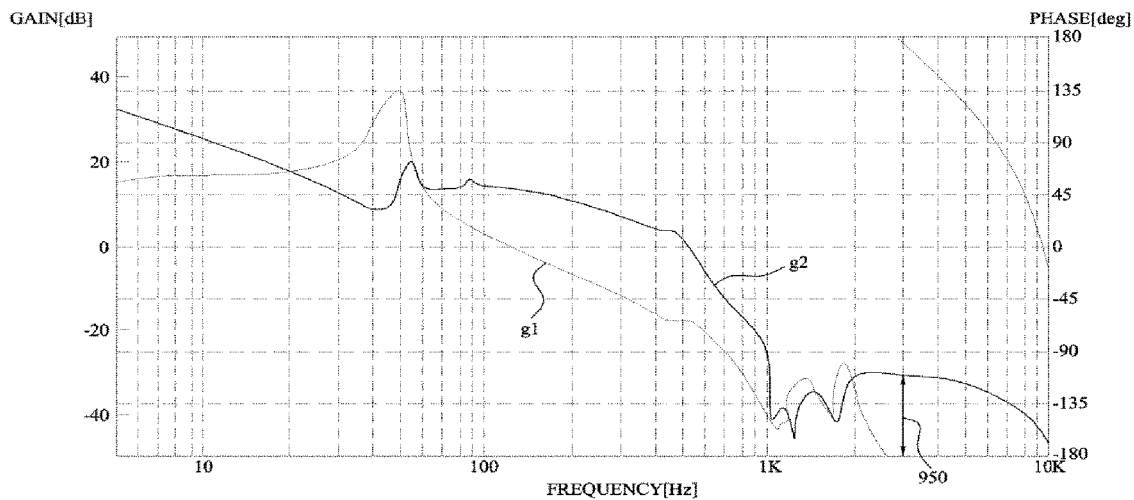
FIG. 14 is a graph illustrating an error of an AF position sensor in the vicinity of an AF coil.

FIG. 14 is a graph illustrating an error of an AF position sensor in the vicinity of an AF coil. "g1" indicates a gain of a normal AF position sensor, and "g2" indicates a gain of an AF position sensor affected by a magnetic field of an AF coil. At this time, the AF position sensor may be a Hall sensor.

Referring to FIG. 14, it can be appreciated that a difference between g2 and g1 is large (indicated by reference numeral 950) in a high frequency range, for example, in a range of 2 kHz or more, and thus a gain error of the AF position sensor occurs in the AF position sensor.

Since the lens moving apparatus 100 according to the embodiment includes the first magnet 190 for the first position sensor 170, in addition to the second magnet 130 for the first coil 120, it is unnecessary to locate the first position sensor 170 in the vicinity of the first coil 120, which may prevent an error and malfunction of the first position sensor 170 due to the effect of a magnetic field of the first coil 120 within a high frequency range.

Next, the upper elastic member 150, the lower elastic member 160, and the support members 220 will be described.

The upper elastic member 150 and the lower elastic member 160 support the bobbin 110 by elasticity thereof. The support members 220 may support the housing 140 so as to be movable relative to the base 210 in the direction perpendicular to the optical axis, and may electrically connect at least one of the upper and lower elastic members 150 and 160 to the circuit board 250.

Figure 11:
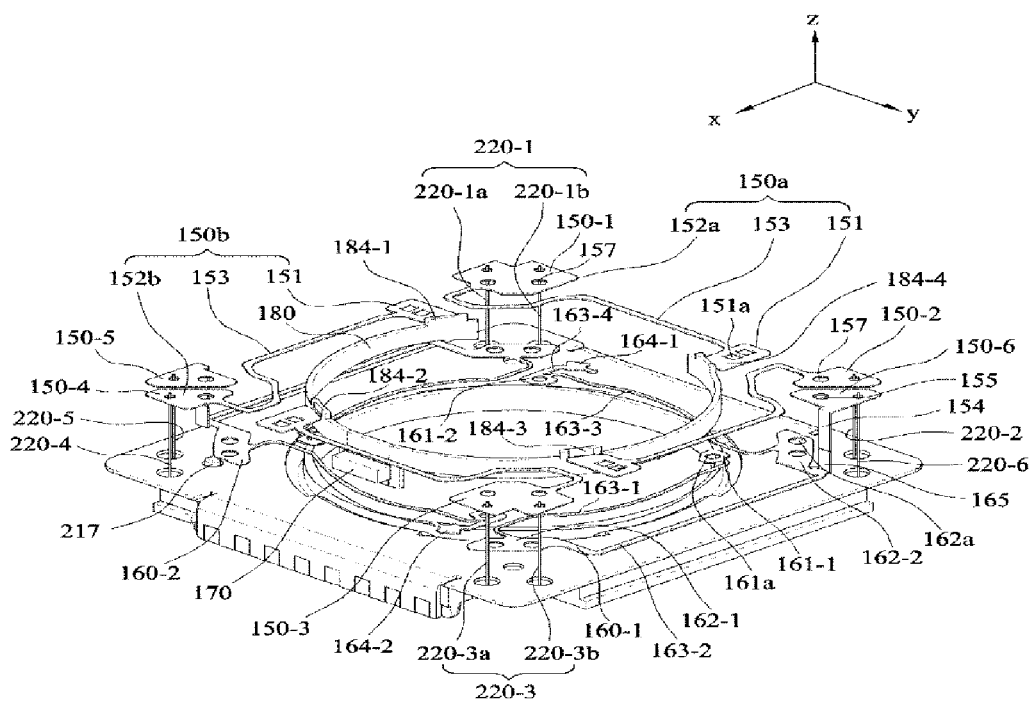
FIG. 11 is an assembled perspective view illustrating the upper elastic member, the lower elastic member, the first position sensor, the sensor board, a base, the support members, and a circuit board illustrated in FIG. 2.

FIG. 11 is an assembled perspective view illustrating the upper elastic member 150, the lower elastic member 160, the first position sensor 170, the sensor board 180, the base 210, the support members 220, and a circuit board 250 illustrated in FIG. 2.

The upper elastic member 150 may include a plurality of upper elastic members 150; 150-1 to 150-4, which is electrically separated from one another.

The elastic member contact portions 184-1 to 184-4 may be electrically connected to at least one of the upper elastic member 150 and the lower elastic member 160. FIG. 11 illustrates that the elastic member contact portions 184-1 to 184-4 come into electrical contact with the upper elastic members 150-1 to 150-4, without being limited thereto. In another embodiment, the elastic member contact portions 184-1 to 184-4 may come into electrical contact with the lower elastic member 160, or may come into electrical contact with both the upper elastic member 150 and the lower elastic member 160.

The respective elastic member contact portions 184-1 to 184-4, electrically connected to the first position sensor 170, may be electrically connected to a corresponding one of the upper elastic members 150-1 to 150-4. In addition, the respective upper elastic members 150-1 to 150-4 may be electrically connected to a corresponding one of the support members 220.

Each one 150a of the first and third upper elastic members 150-1 and 150-3 may include a first inner frame 151, a first-first outer frame 152a, and a first frame connection portion 153, and each one 150b of the second and fourth upper elastic members 150-2 and 150-4 may include the first inner frame 151, a first-first outer frame 152b, and the first frame connection portion 153.

The first inner frame 151 of each of the first to fourth upper elastic members 150-1 to 150-4 may be coupled to the bobbin 110 and a corresponding one of the elastic member contact portions 184-1 to 184-4.

In the case where the upper surface 112a of the second protrusion 112 is flat as exemplarily illustrated in FIG. 4, the first inner frame 151 may be disposed on the upper surface 112a, and then may be fixed by an adhesive member. In another embodiment, unlike the illustration of FIG. 4, in the case where the upper surface 112a is formed with a support boss (not illustrated), the support boss may be inserted into a second-first through-hole 151a formed in the first inner frame 151, and then may be fixed via thermal bonding, or may be fixed by an adhesive member such as, for example, epoxy.

The first-first outer frames 152a and 152b may be coupled to the housing 140 and connected to the support members 220, and the first frame connection portion 153 may connect the first inner frame 151 to the first-first outer frame 152a or 152b. Although the first-first outer frame 152b may be formed by bisecting the first-first outer frame 152a, the embodiment is not limited thereto. That is, in another embodiment, the first-first outer frame 152a may be bisected in the same manner as the first-first outer frame 152b.

The first frame connection portion 153 may be bent at least one time to form a given pattern. Upward and/or downward movement of the bobbin 110 in the first direction parallel to the optical axis may be elastically supported via position variation and fine deformation of the first frame connection portion 153.

The upper support bosses 143 of the housing 140 may couple and fix the housing 140 to the first-first outer frames 152a and 152b of the upper elastic member 150. In the embodiment, the first-first outer frames 152a and 152b may be formed with second-second through-holes 157, which have a shape and position corresponding to those of the upper support bosses 143. At this time, the upper support boss 143 and the second-second through-hole 157 may be fixed via thermal bonding, or may be fixed by an adhesive member such as, for example, epoxy. In order to fix the first to fourth upper elastic members 150-1 to 150-4, a sufficient number of upper support bosses 143 may be provided at the housing 140. Accordingly, it is possible to prevent the incomplete coupling of the first to fourth elastic members 150-1 to 150-4 and the housing 140.

In addition, a distance between the upper support bosses 143 may be appropriately determined within a range suitable to avoid interference with surrounding elements. That is, the upper support bosses 143 may be located at corners of the housing 140, with a constant distance therebetween, so as to be symmetrical to one another about the center of the bobbin 110. In another embodiment, a distance between the upper support bosses 143 may not be constant, and the upper support bosses 143 may be symmetrical to one another about a specific virtual line passing through the center of the bobbin 110.

After the first inner frames 151 are coupled to the bobbin 110 and the first-first outer frames 152a and 152b are coupled to the housing 140, conductive connections CP11 to CP14 such as, for example, soldering are performed on the elastic member contact portions 184-1 to 184-4 of the sensor board 180 and the first inner frames 151 as illustrated in FIG. 9. Thereby, driving signals may be applied to the two pins P11 and P12 among the four pins P11 to P22 of the first position sensor 170, and output signals or feedback signals may be output to the other two pins P21 and P22 among the four pins P11 to P22 of the first position sensor 170. To this end, the upper elastic member 150 may be divided into four parts, thereby including the first to fourth upper elastic members 150-1 to 150-4.

The first to fourth upper elastic members 150-1 to 150-4 are connected to the circuit board 250 via the support members 220. That is, the first upper elastic member 150-1 may be connected to the circuit board 250 via at least one of first-first and first-second support members 220-1a and 220-1b, the second upper elastic member 150-2 may be connected to the circuit board 250 via a second support member 220-2, the third upper elastic member 150-3 may be connected to the circuit board 250 via at least one of third-first and third-second support members 220-3a and 220-3b, and the fourth upper elastic member 150-4 may be connected to the circuit board 250 via a fourth support member 220-4. Accordingly, the first position sensor 170 may receive power supplied from the circuit board 250 through the upper elastic member 150, or may provide the circuit board 250 with output signals or feedback signals.

Meanwhile, the lower elastic member 160 may include first and second lower elastic members 160-1 and 160-2, which are electrically separated from each other. The first coil 120 may be connected to the support members 220 via the first and second lower elastic members 160-1 and 160-2.

Each of the first and second lower elastic members 160-1 and 160-2 may include one or more second inner frames 161-1 and 161-1, one or more second outer frames 162-1 and 162-2, and one or more frame connection portions 163-1 to 163-3.

The second inner frames 161-1 and 161-1 may be coupled to the bobbin 110, and the second outer frames 162-1 and 162-2 may be coupled to the housing 140. The second-first frame connection portion 163-1 may connect the second inner frame 161-1 and the second outer frame 162-1 to each other, the second-second frame connection portion 163-2 may connect the two second outer frames 162-1 and 162-2 to each other, the second-third frame connection portion 163-3 may connect the second inner frame 161-1 and the second outer frame 162-2 to each other.

In addition, the first lower elastic member 160-1 may further include a first coil frame 164-1, and the second lower elastic member 160-2 may further include a second coil frame 164-2.

Referring to FIG. 11, the first and second coil frames 164-1 and 164-2 may be conductively connected to both distal ends of the first coil 120 via conductive connection members such as, for example, solders. The first and second lower elastic members 160-1 and 160-2 may receive drive signals from the circuit board 250 to thereby transmit the drive signals to the first coil 120. For example, the drive signals may include power of different polarities. In order to transmit the drive signals to the first coil 120, the lower elastic member 160 may be bisected into the first and second lower elastic members 160-1 and 160-2.

In addition, each of the first and second lower elastic members 160-1 and 160-2 may further include a second-fourth frame connection portion 163-4. The second-fourth frame connection portion 163-4 may connect the coil frame 164 and the second inner frame 161-1 to each other.

At least one of the second-first to second-fourth frame connection portions 163-1, 163-2, 163-3 and 163-4 described above may be bent at least one time to form a pattern. For example, upward and/or downward movement of the bobbin 110 in the optical axis direction or in the direction parallel to the optical axis may be elastically supported via position variation and fine deformation of the second-first and second-third frame connection portions 163-1 and 163-3.

In one embodiment, as illustrated, each of the first and second lower elastic members 160-1 and 160-2 may further include a bent portion 165. The bent portion 165 may be bent from the second-second frame connection portion 163-2 toward the upper elastic member 150 so as to extend in the first direction. The upper elastic member 160 may further include fifth and sixth upper elastic members 150-5 and 150-6, which are electrically separated from each other.

Each of the fifth and sixth upper elastic members 150-5 and 150-6 may further include a connection frame 154 and a first-second outer frame 155. The connection frames 154 may be connected to the bent portions 165 of the first and second lower elastic members 160-1 and 160-2, and may extend in the first direction.

The first-second outer frame 155 may be bent from the connection frame 154 to extend in the direction perpendicular to the first direction so as to be coupled to the housing 140, and may be connected to the support member 220. For example, the fifth upper elastic member 150-5 may be connected to the fifth support member 220-5, and the sixth upper elastic member 150-6 may be connected to the sixth support member 220-6. For example, the bent portions 165 of the respective first and second lower elastic members 160-1 and 160-2 may be integrally formed with the connection frames 154 and the first-second outer frames 155 of the fifth and sixth upper elastic members 150-5 and 150-6. As such, the respective first and second lower elastic members 160-1 and 160-2 and the respective fifth and sixth upper elastic members 150-5 and 150-6 may have the bent portions 165 or 154, which are bent to extend in the first direction.

In another embodiment, the connection frame 154 of each of the fifth and sixth upper elastic members 150-5 and 150-6 may be bent from the first-second outer frame 155 to extend in the first direction. In addition, the bent connection frame 154 may come into contact with the second-second frame connection portion 163-2. In this case, the bent portion 165 of each of the first and second lower elastic members 160-1 and 160-2 illustrated in FIG. 11 may be omitted. As such, the respective first and second lower elastic members 160-1 and 160-2 may have no bent portion extending in the first direction, and the respective fifth and sixth upper elastic members 150-5 and 150-6 may have the bent portion 154 extending in the first direction.

In another embodiment, the bent portion 165 of each of the first and second lower elastic members 160-1 and 160-2 may be bent from the second-second frame connection portion 163-2 to extend in the first direction. In addition, the bent portion 165 may be formed so as to come into contact with the first-second outer frame 155. In this case, the connection frame 154 of each of the fifth and sixth upper elastic members 150-5 and 150-6 illustrated in FIG. 11 may be omitted. As such, the respective first and second lower elastic members 160-1 and 160-2 have the bent portion 165 extending in the first direction, whereas the respective fifth and sixth upper elastic members 150-5 and 150-6 may have no bent portion extending in the first direction.

In another embodiment, a metal piece (not illustrated) may be inserted into or attached to the housing 140. In this case, the first-second outer frame 155 and the second-second frame connection portion 163-2 illustrated in FIG. 11 may be connected to each other via the metal piece (not illustrated), and the bent portion 165 and the connection frame 154 may be omitted. As such, the respective first and second lower elastic members 160-1 and 160-2 and the respective fifth and sixth upper elastic members 150-5 and 150-6 may have no bent portion extending in the first direction.

As described above, at least one of the upper elastic member and the lower elastic member may have a bent portion extending in the first direction, or may have a bent shape, or neither upper nor lower elastic member may have a bent portion extending in the first direction, or a bent shape.

Meanwhile, the first-second outer frame 155 may further have the second-second through-hole 157, in the same manner as the first-first outer frame 152b.

In one embodiment, the first-first outer frames 152a and 152b of the first to sixth upper elastic members 150-1 to 150-6 may be disposed to diagonally face each other, and the first-second outer frames 155 may be disposed to diagonally face each other.

For example, the first-first outer frame 152a of the first upper elastic member 150-1 and the first-first outer frame 152a of the third upper elastic member 150-3 may be disposed to diagonally face each other. In addition, the first-first outer frame 152b of the second upper elastic member 150-2 and the first-first outer frame 152b of the fourth upper elastic member 150-4 may be disposed to diagonally face each other. In addition, the first-second outer frame 155 of the fifth upper elastic member 150-5 and the first-second outer frame 155 of the sixth upper elastic member 150-6 may be disposed to diagonally face each other.

Alternatively, in another embodiment, although not illustrated, the first-first outer frames 152a and 152b of the first to sixth upper elastic members 150-1 to 150-6 may be disposed at two corners among four corners illustrated in FIG. 11, rather than being disposed to diagonally face each other, and the first-second outer frames 155 may be disposed at the other two corners among the four corners, rather than being disposed to diagonally face each other.

Meanwhile, the first and second lower elastic members 160-1 and 160-2 may receive drive signals or power from the circuit board 250 through the fifth and sixth upper elastic members 150-5 and 150-6 connected to the support members 220 to thereby provide the drive signals or power to the first coil 120. For example, the first lower elastic member 160-1 may be connected to the circuit board 250 through the sixth upper elastic member 150-6 and the sixth support member 220-6, and the second lower elastic member 160-2 may be connected to the circuit board 250 through the fifth upper elastic member 150-5 and the fifth support member 220-5.

Although the embodiment illustrates that each of the upper and lower elastic members 150 and 160 is divided into two or more parts, in another embodiment, the upper and lower elastic members 150 and 160 may not be divided.

The lower support bosses 117 of the bobbin 110 may serve to couple and fix the second inner frames 161-1 and 161-1 of the lower elastic member 160 to the bobbin 110. The lower support bosses 145 of the housing 140 may couple and fix the second outer frames 162-1 and 162-2 of the lower elastic member 160 to the housing 140.

At this time, the number of lower support bosses 145 of the housing 140 may be greater than the number of lower support bosses 117 of the bobbin 110. This is because the length of the second frame connection portion 163-2 of the lower elastic member 160 is longer than the length of the first frame connection portion 163-1.

Since the lower elastic member 160 is divided into two parts as described above, in the same manner as the upper support bosses 143 of the housing 140, the lower support bosses 117 and 145 of the bobbin 110 may be provided in the sufficient number, which may prevent unwanted separation of the lower elastic member 160.

In the embodiment, each of the first and second lower elastic members 160-1 and 160-2 may have third through-holes 161a, which are formed in the second inner frames 161-1 and 161-1 so as to have a shape corresponding to that of the lower support bosses 117 of the bobbin 110. At this time, the lower support bosses 117 of the bobbin 110 and the third through-holes 161a of the second inner frames 161-1 and 161-1 may be fixed to each other via thermal bonding, or may be fixed to each other by an adhesive member such as, for example, epoxy.

In addition, each of the first and second lower elastic members 160-1 and 160-2 may have fourth through-holes 162a, which are formed in the second outer frames 162-1 and 162-2 so as to have a shape corresponding to that of the lower support bosses 145 of the housing 140. At this time, the lower support bosses 145 and the fourth through-holes 162a may be fixed to each other via thermal bonding, or may be fixed to each other by an adhesive member such as, for example, epoxy.

Although each of the upper elastic member 150 and the lower elastic member 160 described above may take the form of a leaf spring, the embodiment is not limited as to the material of the upper and lower elastic members 150 and 160.

Drive signals or power may be supplied to the first position sensor 170 through the two electrically separated upper elastic members (e.g. 150-1 and 150-2), output signals or feedback signals output from the first position sensor 170 may be transmitted to the circuit board 250 through the other two electrically separated upper elastic members (e.g. 150-3 and 150-4), and drive signals (e.g. drive power) may be supplied to the first coil 120 through the two electrically separated lower elastic members 160-1 and 160-2. However, the embodiment is not limited thereto.

In another embodiment, the role of the upper elastic members and the role of the lower elastic members may be changed. For example, power may be supplied to the first coil 120 through the two electrically separated upper elastic members, power may be supplied to the first position sensor 170 through the two electrically separated lower elastic members, and output signals from the first position sensor 170 may be transmitted to the circuit board 250 through the other two electrically separated upper elastic members. This is not illustrated, but will be clearly understood via the drawings described above.

Hereinafter, the upper and lower elastic members 150 and 160 will be described in brief assuming the case where the above described roles of the upper elastic member 150 and the lower elastic member 160 are changed. In this case, the lower elastic member may be divided in the same manner as in the upper elastic member 150 illustrated in FIG. 11, and the upper elastic member may be divided in the same manner as in the lower elastic member 160 illustrated in FIG. 11. In addition, the elastic member contact portions of the sensor board 180 may protrude so as to face the lower elastic member 160, rather than facing the upper elastic member 150 of FIG. 11, and may be electrically connected to a corresponding one of the divided lower elastic members.

The lower elastic member may include first to fourth lower elastic members, which are separated from one another, and the first position sensor 170 may be connected to the support members 220 via the first to fourth lower elastic members.

Each of the first to fourth lower elastic members may include a first inner frame coupled to the bobbin 110, a first-first outer frame coupled to the housing 140 and connected to the support member 220, and a first frame connection portion configured to connect the first inner frame and the first-first outer frame to each other.

The upper elastic member may include first and second upper elastic members, which are separated from each other. The first coil 120 may be connected to the support members 220 via the first and second upper elastic members.

Each of the first and second upper elastic members may include at least one second inner frame coupled to the bobbin 110, at least one second outer frame coupled to the housing 140, and a second-first frame connection portion configured to connect the second inner frame and the second outer frame to each other.

The second outer frame may be provided in the plural number, and each of the first and second upper elastic members may further include a second-second frame connection portion configured to connect the second outer frames to each other.

The lower elastic member may further include fifth and sixth lower elastic members, which are separated from each other. Each of the fifth and sixth lower elastic members may further include a first-second outer frame, which is formed in the direction perpendicular to the first direction so as to be coupled to the housing 140 and may be connected to the support member 220.

Each of the first and second upper elastic members may further include a bent portion, which is bent from the second-second frame connection portion toward the lower elastic member so as to extend in the first direction. Each of the fifth and sixth lower elastic members may further include a connection frame configured to connect the bent portion and the first-second outer frame to each other.

Alternatively, each of the fifth and sixth lower elastic members may further include a connection frame, which is bent from the first-second outer frame to extend in the first direction and comes into contact with the second-second frame connection portion. At this time, the bent portion, the connection frame, and the first-second outer frame may be integrally formed with one another.

Alternatively, each of the first and second upper elastic members may further include a bent portion, which is bent from the second-second frame connection portion to extend in the first direction and comes into contact with the first-second outer frame.

Alternatively, the lens moving apparatus may further include a metal piece inserted into or attached to the housing 140, and the first-second outer frame and the second-third frame connection portion may be connected to each other via the metal piece.

Each of the first and second upper elastic members may further include a coil frame connected to a corresponding one of both distal ends of the first coil 120, and a second-third frame connection portion configured to connect the coil frame and the second inner frame to each other.

Next, the base 210, the circuit board 250, and the second coils 230 will be described.

The base 210 may have a bore or center hole corresponding to the bore of the bobbin 110 and/or the bore of the housing 140 described above, and may have a shape that coincides with or corresponds to that of the cover member 300, for example, a square shape.

Figure 12:
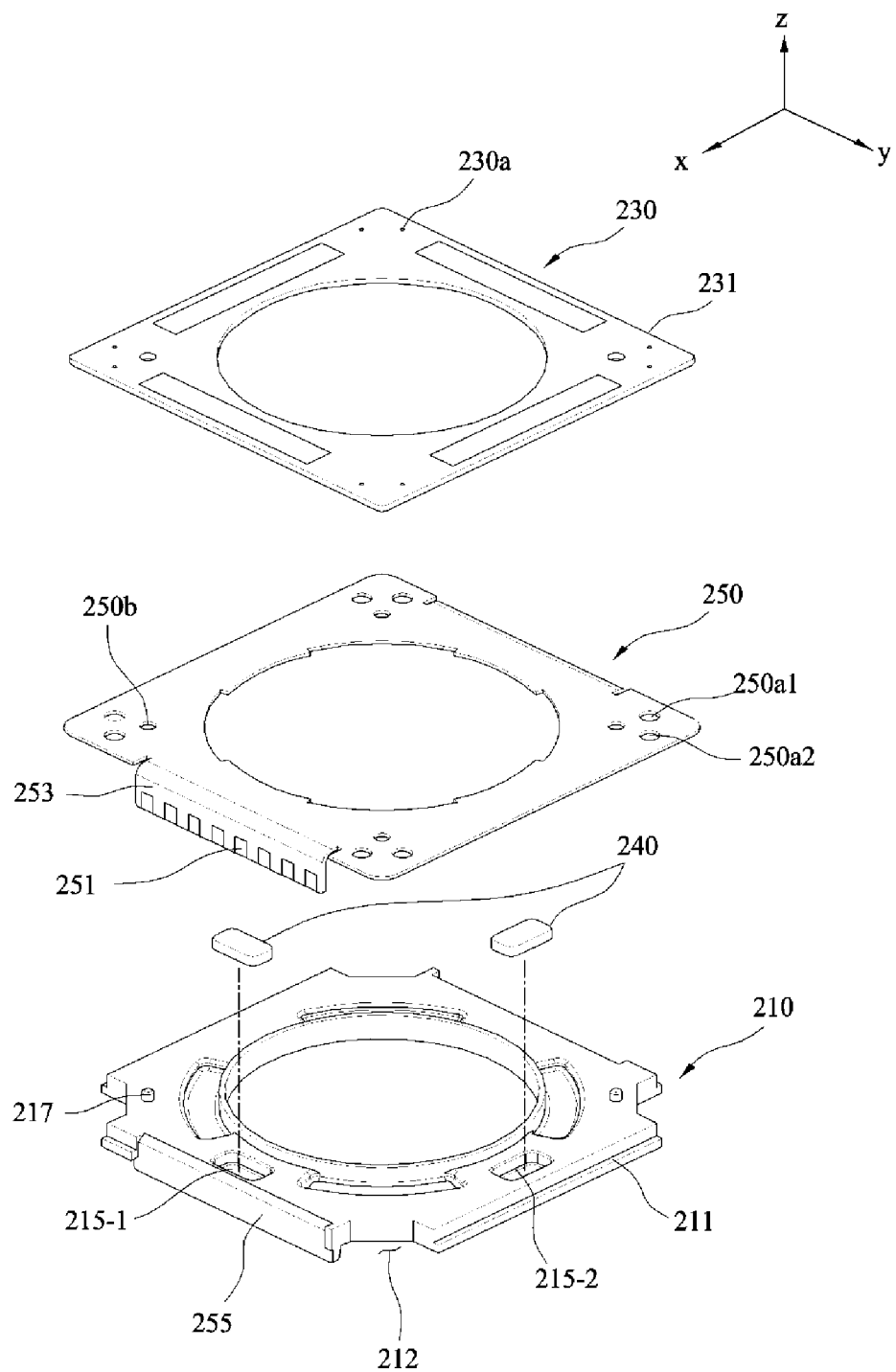
FIG. 12 is an exploded perspective view of the base, second coils, and the circuit board illustrated in FIG. 2.

FIG. 12 is an exploded perspective view of the base 210, the second coils 230, and the circuit board 250 illustrated in FIG. 2.

The base 210 may have a stepped portion 211, to which an adhesive may be applied when the cover member 300 is fixed using the adhesive. At this time, the stepped portion 211 may guide the cover member 300 to be coupled to the upper side thereof, and may come into surface contact with an end of the cover member 300.

The stepped portion 211 of the base 210 and the end of the cover member 300 may be fixed or sealed to each other using, for example, an adhesive.

The base 210 may be spaced apart from the first lens moving unit by a given distance. The base 210 may be formed with a support portion 255, which has a size and shape corresponding to those of a terminal surface 253 of the circuit board 250 which is formed with terminals 251. The support portion 255 may be formed at an outer side surface of the base 210 so as to have a constant cross-sectional area without the stepped portion 211, and may support the terminal surface 253 of the circuit board 250 which is formed with the terminals 251.

A second recess 212 may be formed in each corner of the base 210. When the cover member 300 has a protrusion formed at each corner thereof, the protrusion of the cover member 300 may be fitted into the second recess 212 of the base 210.

In addition, second seating recesses 215-1 and 215-2 may be formed in an upper surface of the base 210 so that the second position sensors 240 may be disposed in the second seating recesses 215-1 and 215-2. In the embodiment, the second seating recesses 215-1 and 215-2 may be equal in number to the second position sensors 240 (e.g. two second seating recesses may be provided).

The second position sensors 240, disposed in the second seating recesses 215-1 and 215-2 of the base 210, may sense a movement degree of the housing 140 in the second direction and the third direction. To this end, virtual lines, which connect the second seating recesses 215-1 and 215-2 to the center of the base 210 respectively, may cross with each other. For example, the two second seating recesses 215-1 and 215-2 may be disposed such that an angle between the crossing virtual lines is 90 degrees.

In addition, although epoxy or the like may not be introduced into the second seating recesses 215-1 and 215-2, epoxy or the like may be introduced to fix the second position sensors 240. Because at least one surface of each of the second seating recesses 215-1 and 215-2 is formed as a tapered slope (not illustrated), the introduction of epoxy or the like for the assembly of the second position sensor 240 may not be efficiently performed.

In the embodiment, the second seating recesses 215-1 and 215-2 may be disposed at edge portions of the base 210, without being limited thereto.

In another embodiment, the second seating recesses 215-1 and 215-2 may be disposed at or near the center of the second coils 230. Alternatively, the second seating recesses 215-1 and 215-2 may be disposed such that the center of the second coils 230 is aligned with the center of the second position sensors 240.

The base 210 may further have a recessed portion formed at a position corresponding to the stepped portion of the cover member 300, and for example, an adhesive may be introduced through the recessed portion.

In addition, a seating portion (not illustrated) for a filter may be formed in a lower surface of the base 210. The filter may be an infrared light blocking filter. However, the embodiment is not limited thereto, and the filter may be disposed at a sensor holder which is separately provided below the base 210. In addition, although will be described below, a circuit board provided with an image sensor may be disposed on the lower surface of the base 210, and the camera module may include the lens moving apparatus 100 according to the embodiment and the circuit board provided with the image sensor.

Meanwhile, the support members 220 may be located respectively at the second side portions 142 of the housing 140. For example, two support members 220 may be located at each of the four second side portions 142.

Alternatively, only one support member may be disposed at each of the two second side portions among the four second side portions 142 of the housing 140, and two support members may be disposed at each of the other two second side portions.

In addition, in another embodiment, the support members 220 may be leaf springs disposed at the first side portions 141 of the housing 140.

As described above, the support members 220 may define a path, along which required power is transmitted to the first position sensor 170 and the first coil 120, and may also define a path, along which output signals from the first position sensor 170 are provided to the circuit board 250.

The support members 220 may be implemented into elastic support members such as, for example, leaf springs, coil springs, or suspension wires. In addition, in another embodiment, the support members 220 may be integrally formed with the upper elastic member 150.

The second coils 230 may be disposed above the circuit board 250, and the second position sensors 240 may be disposed below the circuit board 250. The second position sensors 240 may sense displacement of the housing 140 relative to the base 210 in the direction perpendicular to the optical axis based on the result of sensing the strength of a magnetic field of the second magnets 130. The second position sensors 240 may include two sensors 240a and 240b, which are disposed perpendicular to each other in order to sense the displacement of the housing 140 in the direction (i.e. the X-axis and the Y-axis) perpendicular to the optical axis.

The second position sensors 240, the second coils 230, and the second magnets 130 may be disposed on the same axis, without being limited thereto.

The circuit board 250 may be disposed on the upper surface of the base 210, and may have a bore corresponding to the bore of the bobbin 110, the bore of the housing 140, and/or the bore of the base 210. An outer circumferential surface of the circuit board 250 may have a shape which coincides with or corresponds to the upper surface of the base 210, for example, a square shape, without being limited thereto.

The circuit board 250 may include at least one second terminal surface 253, which is bent from the upper surface of the circuit board 250 and is formed with a plurality of terminals or pins to receive electrical signals from an external source.

Fifth through-holes 230a are perforated in corner portions of a circuit member 231. The support members 220 may penetrate the fifth through-holes 230a so as to be connected to the circuit board 250.

The second coils 230a to 230d are disposed on the circuit board 250 so as to be opposite to the second magnets 130 fixed to the housing 140.

In FIG. 12, the circuit member 231 including the second coils 230 may be disposed on the upper surface of the circuit board 250. However, the disclosure is not limited to the embodiment, and in another embodiment, a circuit pattern in the form of the second coils 230 may be formed on the circuit board 250.

Although four second coils 230 may be installed at four sides of the circuit board 250, the embodiment is not limited thereto, and only two second coils may be installed respectively in the second direction and the third direction, and four or more second coils may be installed.

Alternatively, the second coil 230 may be configured by winding a wire in a donut shape, or may be formed into an FP coil form so as to be electrically connected to the circuit board 250.

The housing 140 may be moved in the second direction and/or the third direction via interaction of the second magnets 130 and the second coils 130 disposed to face each other as described above, thereby performing handshake compensation.

The second position sensors 240 may sense displacement of the first lens moving unit relative to the base 210 in the second direction (e.g. the X-axis) and the third direction (e.g. the Y-axis), which are perpendicular to the optical axis (e.g. the Z-axis). To this end, the second position sensors 240 may be disposed on the base 210 so as to be aligned with the center of the second coils 230, thereby sensing displacement or movement of the housing 140.

The second position sensors 240 may be Hall sensors, and any other sensors may be used so long as they can sense the strength of a magnetic field. The second position sensors 240, as exemplarily illustrated in FIG. 12, may be installed in the second seating recesses 215-1 and 215-2 formed in the upper surface of the base 210 which is disposed below the circuit board 250. For example, two second position sensors 240 may be provided at side portions of the upper surface of the base 210.

The circuit board 250 may have sixth through-holes 250a1 and 250a2 for the penetration of the support members 220. The support members 220 may be electrically connected to a circuit pattern, which is disposed on a bottom surface of the circuit board 250, through the sixth through-holes 250a1 and 250a2 of the circuit board 250 via, for example, soldering.

The circuit board 250 may further include seventh through-holes 250b. Referring to FIGS. 11 and 12, the support bosses 217 of the base 210 and the seventh through-holes 250b may be coupled and fixed to each other via thermal bonding, or may be fixed to each other using an adhesive member such as, for example, epoxy.

The circuit board 250 may further include the terminals 251. The circuit board 250 may be formed with the bent terminal surface 253. In the embodiment, at least one terminal 251 may be installed to the bent terminal surface 253 of the circuit board 250.

In the embodiment, the terminals 251 installed on the terminal surface 253 may receive power from an external source and supply the power to the first and second coils 120 and 230 and the first and second position sensors 170 and 240, and may externally output signals from the first and second position sensors 170 and 240. The number of terminals formed at the terminal surface 253 of the circuit board 250 may be increased or reduced according to the kinds of constituent elements that need to be controlled.

In the embodiment, the circuit board 250 may be a Flexible Printed Circuit Board (FPCB), without being limited thereto. In another embodiment, for example, terminals of the circuit board 250 are directly formed on the surface of the base 210 via, for example, a surface electrode method, so as to substitute for the terminals of the circuit board 250.

As described above, the circuit board 250 may supply required power, for example, current to the first coil 120 and the first position sensor 170, and may receive output signals or feedback signals from the first position sensor 170. Displacement of the bobbin 110 may be adjusted by the output signals or feedback signals.

Meanwhile, the lens moving apparatus according to the above-described embodiment may be used in various fields, for example, a camera module. For example, the camera module may be applied to, for example, a mobile appliance such as a cellular phone or the like.

The camera module according to the embodiment may include a lens barrel which is coupled to the bobbin 110, an image sensor (not illustrated), an image sensor substrate which is connected to the circuit board 250 and is provided with the image sensor, and an optical system.

In addition, the optical system may include at least one lens which transmits an image to the image sensor. At this time, an actuator module may be installed to the optical system so as to perform the auto-focusing function and the handshake compensation function. The actuator module to perform the auto-focusing function may be configured in various ways, and a voice coil unit motor is frequently used. The lens moving apparatus according to the above-described embodiment may serve as the actuator module which performs both the auto-focusing function and the handshake compensation function.

In addition, the camera module may further include an infrared light blocking filter (not illustrated). The infrared light blocking filter serves to block infrared light to be introduced to the image sensor. In this case, the infrared light blocking filter may be installed to the base 210 illustrated in FIG. 2 at a position corresponding to the image sensor, and may be coupled to a holder member (not illustrated). In addition, the base 210 may support the lower side of the holder member.

Figure 15:
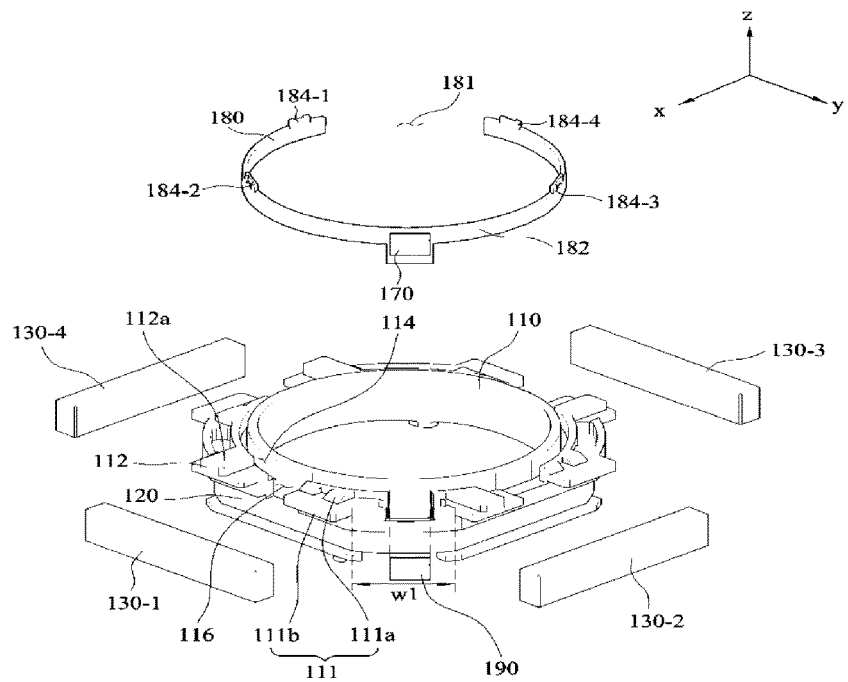
FIG. 15 is a view illustrating the arrangement of the first position sensor and the first magnet illustrated in FIG. 2 according to another embodiment.
Figure 16:
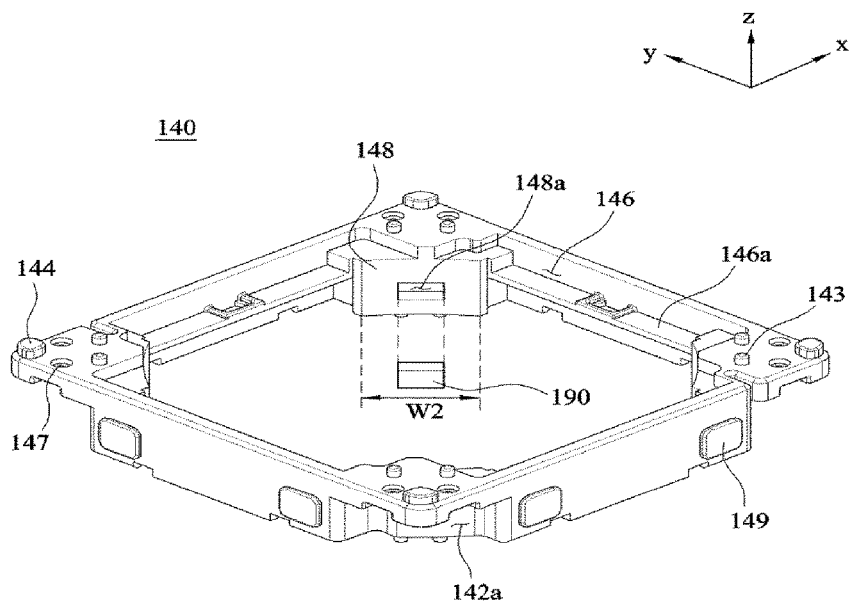
FIG. 16 is a view illustrating a seating recess of the housing for mounting the first magnet illustrated in FIG. 15.
Figure 17:
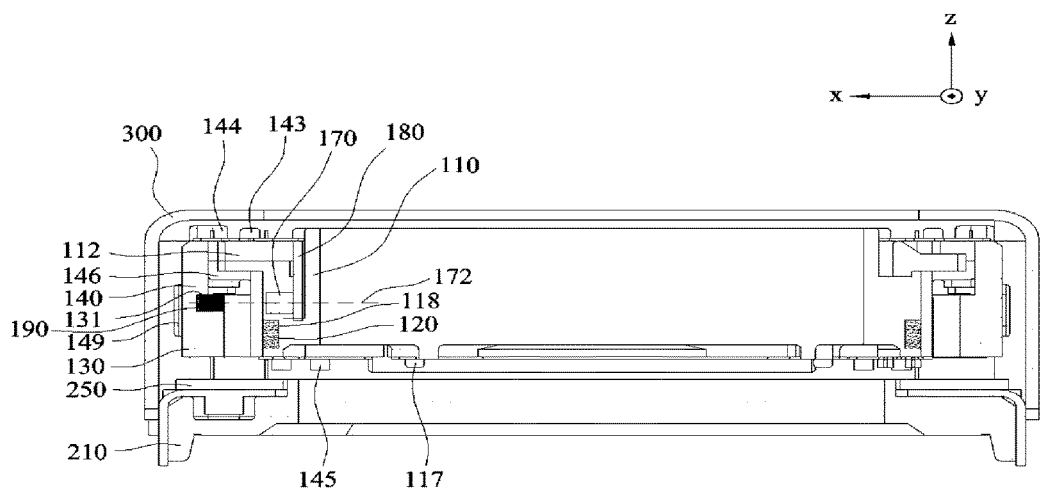
FIG. 17 is a sectional view taken along line I-I' of FIG. 3 illustrating the embodiment of FIGS. 15 and 16.

FIG. 15 is a view illustrating the arrangement of the first position sensor 170 and the first magnet 190 illustrated in FIG. 1 according to another embodiment, FIG. 16 is a view illustrating a seating recess 148a of the housing 140 for the mounting of the first magnet 190 illustrated in FIG. 15, and FIG. 17 is a sectional view taken along line I-I' of FIG. 3 illustrating the embodiment of FIGS. 15 and 16.

The embodiment illustrated in FIGS. 15 and 16 may be the same as the configuration described in FIGS. 1 to 12 except for the arrangement of the first position sensor 170 and the first magnet 190 and the provision of the seating recess 148a of the housing 140.

Referring to FIGS. 15 to 17, the first position sensor 170 may be disposed on any one of the second side surfaces S2 of the bobbin 110. For example, the receiving recess 116 of the bobbin 110 may be formed in any one of the second side surfaces S2 of the bobbin 110, and the first position sensor 170 may be disposed in the receiving recess 116 of the bobbin 110.

The first magnet 190 may be located in a region between the two second magnets (e.g. 130-1 and 130-2) which are disposed in the vicinity of the first position sensor 170 so as to face the first position sensor 170.

For example, the first magnet 190 may be disposed, fixed, or mounted on any one of the second side portions 142 of the housing 140. In addition, the first position sensor 170 may be located at any one of the second side surfaces of the bobbin 110 corresponding to the second side portion of the housing 140 on which the first magnet 190 is disposed.

For example, the first magnet seating recess 148a may be provided in any one of the second side portions 142 of the housing 140, and the first magnet 190 may be disposed, fixed, or mounted in the first magnet seating recess 148a.

For example, the first magnet seating recess 148a may be provided in an inner side surface of the third protrusion 148 of the housing 140 opposite to the bobbin 110.

At the initial position, the first position sensor 170 may not overlap the second magnets 130 in the direction in which the first position sensor 170 and the first magnet 190a face each other. For example, at the initial position, the first position sensor 170 may not overlap or align the second magnet 130 in the direction perpendicular to the optical axis where the first position sensor 170 and the first magnet 190a face each other.

Although the first magnet 190 of the lens moving apparatus 100 illustrated in FIGS. 1 to 12 may be aligned with or overlap the second magnets 130 in the optical axis direction or the direction parallel to the optical axis, the first magnet 190 and the second magnets 130 of the embodiment illustrated in FIGS. 15 and 16 may not be aligned with or not overlap each other in the optical axis direction or the direction parallel to the optical axis.

In the embodiment illustrated in FIGS. 15 and 16, since the first magnet 190 and the second magnets 130 are not aligned with each other or do not overlap each other in the optical axis direction or in the direction parallel to the optical axis, output signals of the first position sensor 170 may be less affected by variation in the magnetic field of the second magnet 130 compared to the embodiment illustrated in FIG. 1, which may enable more accurate auto-focus sensing.

Figure 18:
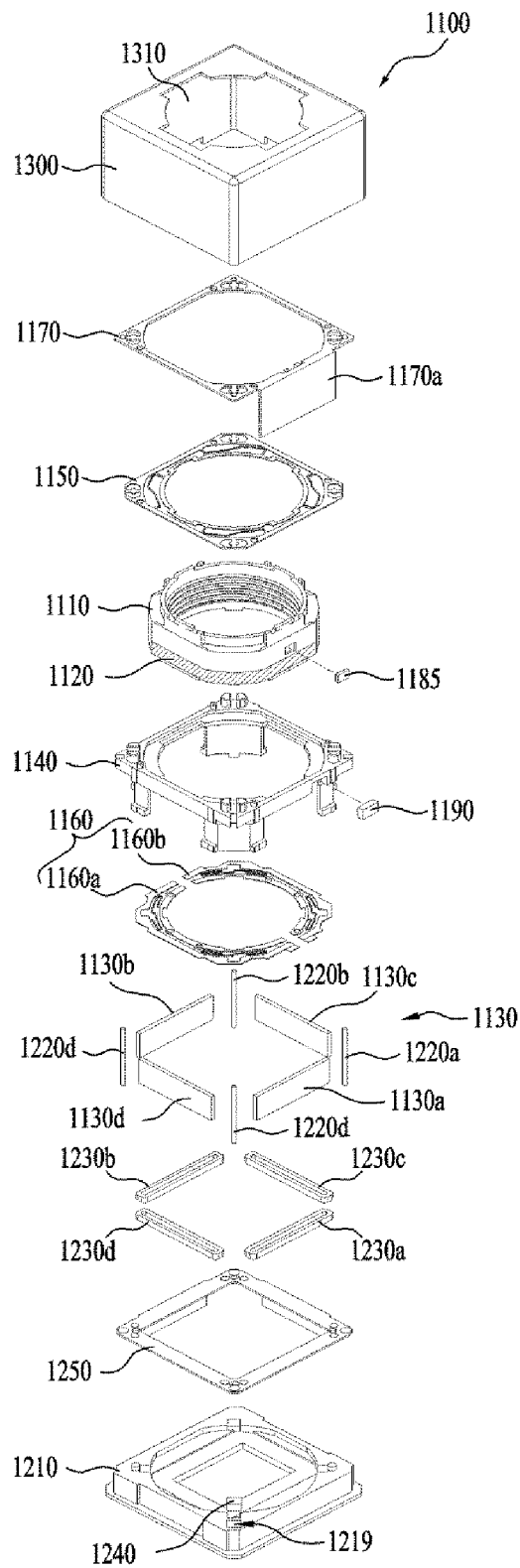
FIG. 18 is an exploded perspective view illustrating a lens moving apparatus according to another embodiment.
Figure 19:
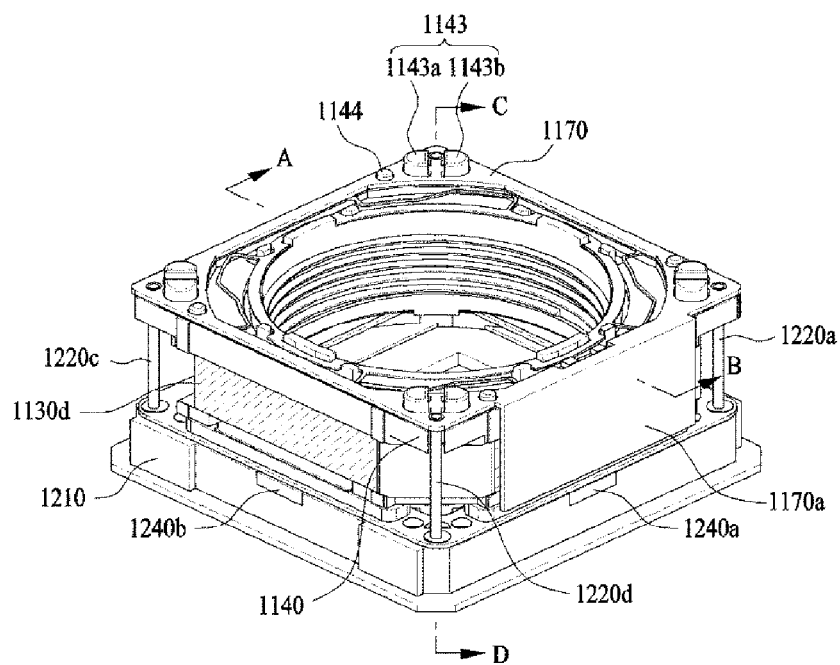
FIG. 19 is an assembled perspective view illustrating the lens moving apparatus after removal of a cover member for comparison with FIG. 18.
Figure 20:
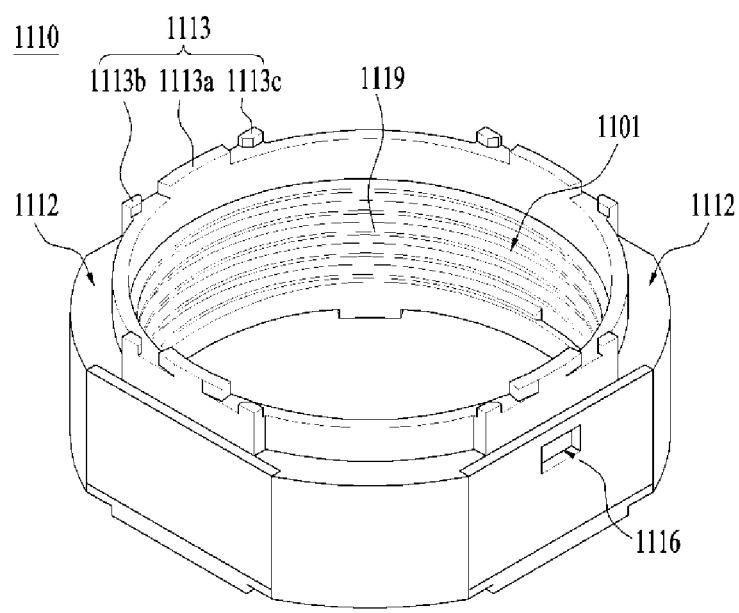
FIGS. 20 and 21 are perspective views illustrating a bobbin of FIG. 18.
Figure 21:
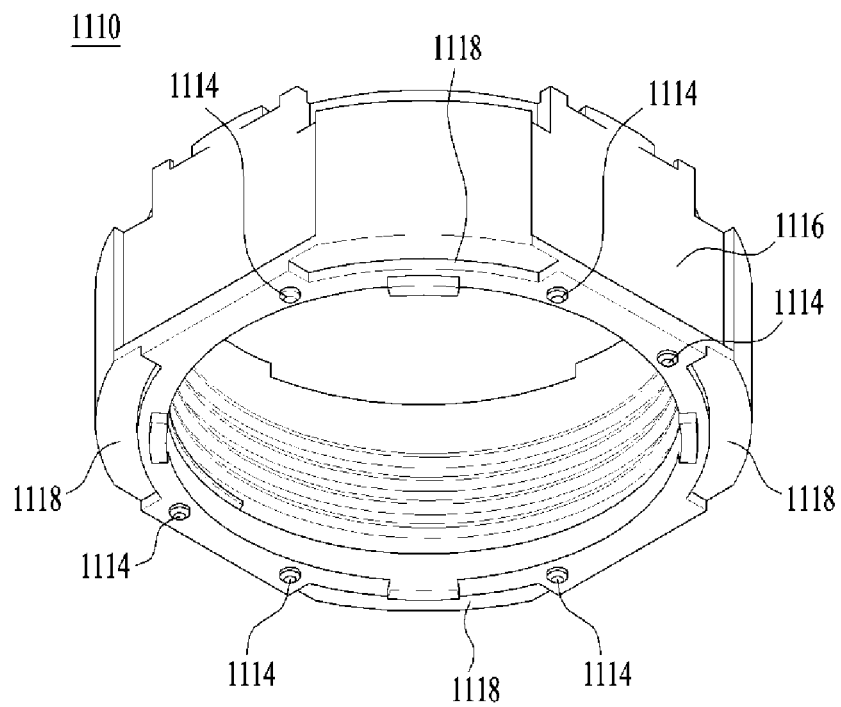
Figure 22:
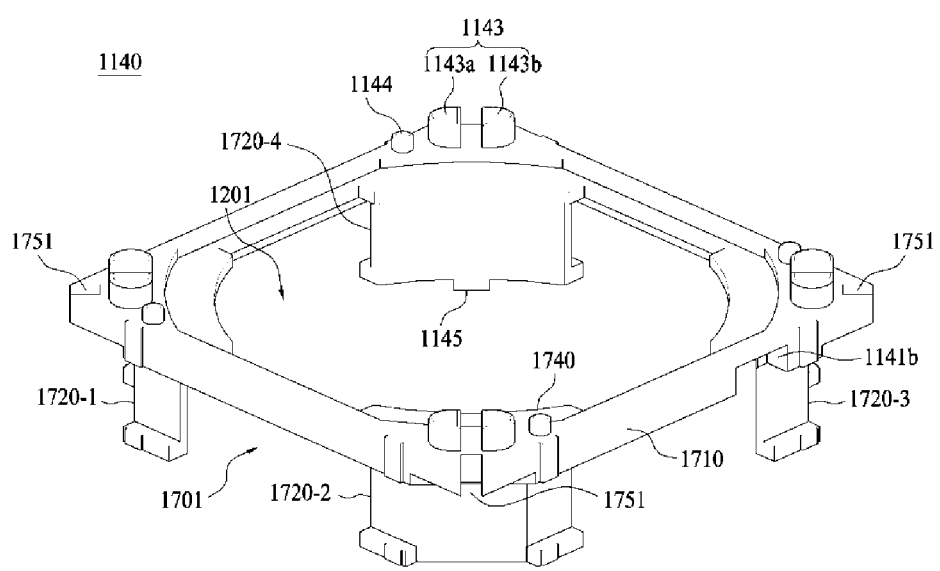
FIG. 22 is a perspective view illustrating a housing of FIG. 18.
Figure 23:
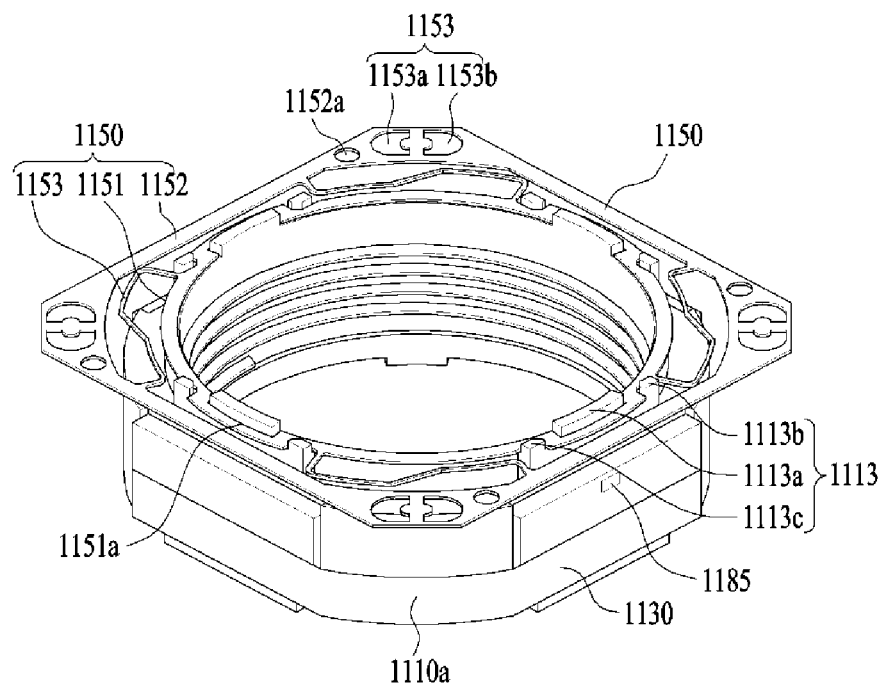
FIG. 23 is an assembled perspective view illustrating an upper elastic member, second magnets, and the bobbin of FIG. 18.
Figure 24:
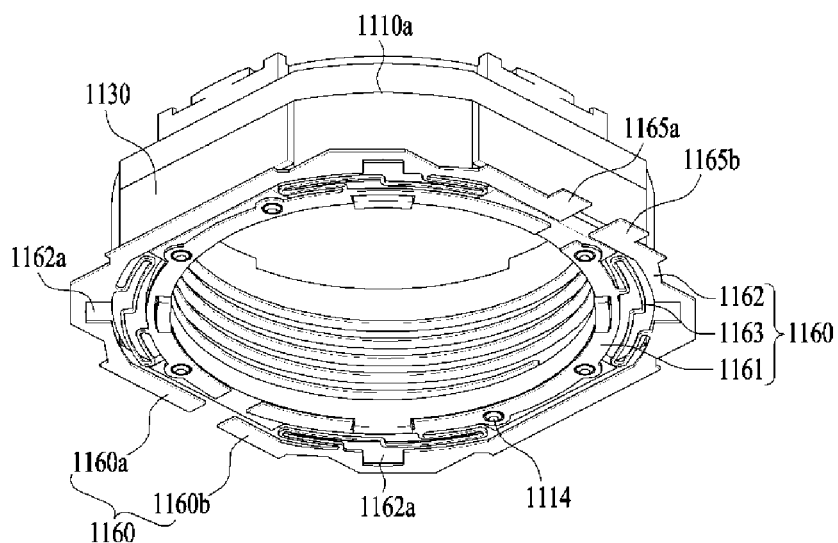
FIG. 24 is an assembled perspective view illustrating a lower elastic member and the bobbin of FIG. 18.
Figure 26:
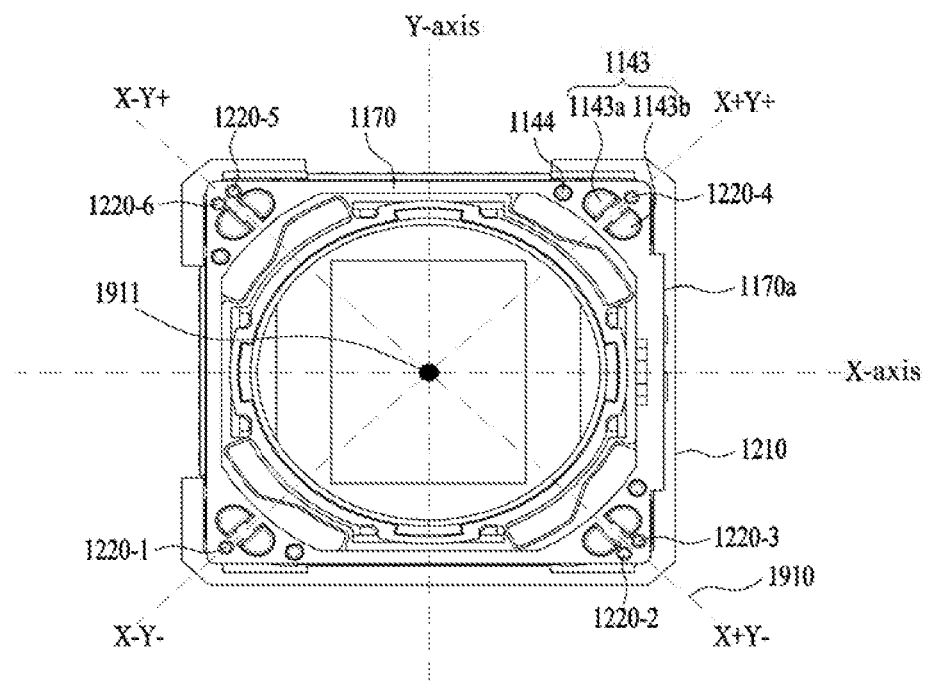
FIG. 26 is a plan view of the lens moving apparatus illustrated in FIG. 18.

FIG. 18 is an exploded perspective view illustrating a lens moving apparatus 1100 according to another embodiment, FIG. 19 is an assembled perspective view illustrating the lens moving apparatus 1100 after removal of a cover member 1300 as compared to FIG. 18, FIGS. 20 and 21 are perspective views illustrating a bobbin 1110 of FIG. 18, FIG. 22 is a perspective view illustrating a housing 1140 of FIG. 18, FIG. 23 is an assembled perspective view illustrating an upper elastic member 1150, second magnets 1130a to 1130d, and the bobbin 1110 of FIG. 18, and FIG. 24 is an assembled perspective view illustrating a lower elastic member 1160 and the bobbin 1110 of FIG. 18, and FIG. 26 is a plan view of the lens moving apparatus 1100 illustrated in FIG. 2.

Referring to FIGS. 18 to 24, the lens moving apparatus 1100 of the embodiment includes an upper elastic member 1150, a bobbin 1110, a housing 1140, second magnets 1130a to 1130d, a lower elastic member 1160, second coils 1230a to 1230d, and a second position sensor 1240.

The lens moving apparatus 1100 may further include a first coil 1120, a first magnet 1185, a first position sensor 1190, a cover member 1300, a first circuit board 1170, elastic support members 1220a to 1220d, a second circuit board 1250, and a base 1210.

The description related to the cover member 300 illustrated in FIG. 2 may be equally applied to the cover member 1300 illustrated in FIG. 18.

The bobbin 1110 is movable in the optical axis direction or in the direction parallel to the optical axis (e.g. the Z-axis) via electromagnetic interaction between the first coil 1120 and the second magnets 1130a to 1130d.

The bobbin 1110 may have one or more upper support bosses 1113; 1113a, 1113b and 1113c, which are formed on an upper surface so as to be secured to an inner frame 1151 of the upper elastic member 1150, and one or more lower support bosses 1114, which are formed on a lower surface so as to be secured to an inner frame 1161 of the lower elastic member 1160. These support bosses may be secured via thermal bonding, or using an adhesive member such as, for example, epoxy.

A first magnet seating recess 1116 may be formed in an outer circumferential surface of the bobbin 1110 and may have a size corresponding to the first magnet 1185.

The bobbin 1110 may have upper escape recesses 1112 formed in an upper portion of the outer circumference surface thereof so as to correspond to connection portions 1153 of the upper elastic member 1150, in order to prevent spatial interference between the connection portions 1153 of the upper elastic member 1150 and the bobbin 1110 and to facilitate elastic deformation of the connection portions 1153 when the bobbin 1110 is moved in the first direction. In addition, the bobbin 1110 may have lower escape recesses 1118 formed in a lower portion of the outer circumference surface thereof so as to correspond to connection portions 1163 of the lower elastic member 1160, in order to prevent spatial interference between the connection portions 1163 of the lower elastic member 1160 and the bobbin 1110 and to facilitate elastic deformation of the connection portions 1163 when the bobbin 1110 is moved in the first direction.

The description related to the bobbin 110 of FIG. 2 may be equally applied to the bobbin 110 of the present embodiment.

The first magnet 1185 provides magnetic flux to allow the first position sensor 1190 for auto-focusing, which will be described below, to sense or determine a displacement value (or position) of the bobbin 1110 in the first direction.

The first magnet 1185 may be divided into two parts in order to increase the strength of a magnetic field, without being limited thereto.

The first magnet 1185 may be disposed on the outer circumferential surface of the bobbin 1110 so as not to overlap the first coil 1120 in the direction perpendicular to the optical axis. For example, the first magnet 1185 may be disposed in the first magnet seating recess 1116 formed in the outer circumferential surface of the bobbin 1110.

Although the present embodiment illustrates the first magnet 1185 as being provided on the outer circumferential surface of the bobbin 1110 and the first position sensor 1190 as being provided on an outer circumferential surface of the housing 1140, in another embodiment, the opposite arrangement configuration may be adopted.

The description related to the first magnet 190 of FIG. 2 may be equally applied to the first magnet 1185 of the present embodiment.

The first coil 1120 is disposed on the outer circumferential surface of the bobbin 1110. The first coil 1120 may be wound so as to surround the outer circumferential surface of the bobbin 1110 in the direction in which the first coil 1120 is rotated about the optical axis as exemplarily illustrated in FIG. 23. In another embodiment, the first coil 1120 may include a plurality of coil blocks, and each coil block may have a ring shape.

The description related to the first coil 120 of FIG. 2 may be equally applied to the first coil 1120 of the present embodiment.

The housing 1140 supports the second magnets 130; 130a to 130d, and accommodates the bobbin 1110 therein so as to allow the bobbin 1110 to be moved in the direction parallel to the optical axis.

The housing 1140 may include an upper end portion 1710 having a bore, and a plurality of support portions 1720-1 to 1720-4 connected to a lower surface of the upper end portion 1710.

The support portions 1720-1 to 1720-4 may be spaced apart from one another, and the two respective neighboring support portions may define an opening 1701, through which the first coil 1120 mounted to the outer circumferential surface of the bobbin 1110 is exposed.

For example, the support portions 1720-1 to 1720-4 of the housing 1140 may be disposed to correspond to the escape recesses 1112 and 1118 of the bobbin 1110.

In addition, for example, the support portions 1720-1 to 1720-4 of the housing 1140 may be disposed to correspond to or to be aligned with four corners of the upper end portion 1710 respectively.

The housing 1140 may have one or more stoppers 1143 and 1146, which protrude from an upper surface thereof in order to prevent collision with the cover member 1300.

The housing 1140 may further have one or more upper frame support bosses 1144, which protrude from an upper surface of the upper end portion 1710 for the coupling of an outer frame 1152 of the upper elastic member 1150.

The housing 140 may further have one or more lower frame support bosses 1145, which protrude from a lower surface of the respective support portions 1720-1 to 1720-4 for the coupling of an outer frame 1162 of the lower elastic member 1160.

The housing 1140 may have through-grooves 1751 formed in corners of a side surface of the upper end portion 1710 for the passage of the elastic support members 1220a to 1220d.

The through-grooves 1751 may be grooves indented from a side surface of the upper end portion 1710 of the housing 1140, without being limited thereto. In another embodiment, the through-grooves 1751 may take the form of holes perforated in an upper surface and a lower surface of the upper end portion 1710 of the housing 1140.

The through-grooves 1751 may have a depth to prevent a portion of the elastic support members 1220a to 1220d inserted in the through-grooves 1751 from being exposed out of a side surface of the housing 1140. The through-grooves 1751 may serve to guide or support the elastic support members 1220a to 1220d.

The housing 1140 may have a recess 1141b for the first position sensor, which is formed in the side surface of the upper end portion 1710. At least a portion of the first position sensor recess 1141b formed in the housing 1140 may overlap the second magnet seating recess 1116, which formed in the bobbin 1110 in a direction perpendicular to an outer circumferential surface of the housing 1140, or no portion thereof may overlap the second magnet seating recess 1116.

For example, the first position sensor recess 1141b may be formed in the side surface of the upper end portion 1710 which is located between the support portions 1720-1 to 1720-4 of the housing 1140.

The first position sensor 1190 may detect variation in magnetic force discharged from the first magnet 1185, and consequently, may sense displacement (value) (or position) of the bobbin 1110 in the first direction. The first position sensor 1190 may be disposed on the outer circumferential surface of the housing 1140 so as to be opposite to the first magnet 1185. The first position sensor 1190 may be located in the first position sensor recess 1141b of the housing 1140.

The first position sensor 1190 may be electrically connected to a first terminal surface 1170a of the first circuit board 1170. For example, the first position sensor 1190 may be implemented into a driver including a Hall sensor, or may be implemented into a Hall sensor. The second magnets 1130a to 1130d are disposed on the outer circumferential surface of the housing 1140 so as to correspond to the first coil 1120. For example, the second magnets 1130a to 1130d may be disposed on the support portions 1720-1 to 1720-4 of the housing 1140. For example, the second magnets 1130a to 1130d may be disposed on side surfaces of the support portions 1720-1 to 1720-4.

The description related to the second magnets 130 of FIG. 2 may be equally applied to the second magnets 1130 of the present embodiment.

The upper elastic member 1150 may include the inner frame 1151 coupled to the bobbin 1110, the outer frame 1152 coupled to the housing 1140, the connection portions 1153 configured to connect the inner frame 1151 and the outer frame 1152 to each other, and the elastic support members 1220a to 1220d connected to the outer frame 1152.

The lower elastic member 1160 may include the inner frame 1161 coupled to the bobbin 1110, the outer frame 1162 coupled to the housing 1140, and the connection portions 1163 configured to connect the inner frame 1161 and the outer frame 1162 to each other.

The inner frame 1151 of the upper elastic member 1150 may have a bore corresponding to a bore 1101 of the bobbin 1110 and/or a bore 1201 of the housing 1140. The outer frame 1152 of the upper elastic member 1150 may have a polygonal ring shape located at the periphery of the inner frame 1151.

The inner frame 1151 of the upper elastic member 1150 may have bent portions 1151a, which are coupled to the upper support bosses 1113 of the bobbin 1110.

The outer frame 1152 of the upper elastic member 1150 may be provided with through-holes 1152a, into which the upper frame support bosses 1144 of the housing 1140 are inserted. The outer frame 1152 of the upper elastic member 1150 may have guide recesses 1155, into which the stoppers 1143 of the housing 1140 are inserted. For example, first guide recesses 1155a and 1155b, which correspond to respective stoppers 1143a and 1143b, may be formed in the outer frame 1152 of the upper elastic member 1150, and the guide recesses 1155a and 1155b may be spaced apart from each other.

The inner frame 1161 of the lower elastic member 1160 may have a bore corresponding to the bore 1101 of the bobbin 1110 and/or the bore 1201 of the housing 1140.

The outer frame 1162 of the lower elastic member 1160 may have a polygonal ring shape located at the periphery of the inner frame 1161.

The lower elastic member 1160 may be divided into two parts in order to receive power having different polarities. The lower elastic member 1160 may include a first lower elastic member 1160a and a second lower elastic member 1160b, which are electrically separated from each other.

The inner frame 1161 of the lower elastic member 1160 may be provided with through-holes 1161a, into which the lower support bosses 1114 of the bobbin 1110 are inserted. The outer frame 1162 of the lower elastic member 1160 may have insertion recesses 1162a, into which the lower frame support bosses 1145 of the support portions 1720-1 to 1720-4 of the housing 1140 are inserted.

The lower elastic member 1160 may be electrically connected to the first coil 1120.

A beginning end of the first coil 1120 may be electrically connected to the first lower elastic member 1160a, and a terminating end of the first coil 1120 may be electrically connected to the second lower elastic member 1160b.

The lower elastic member 1160 is electrically connected to the first circuit board 1170 which will be described below. For example, the outer frames 1162 of the first and second lower elastic members 1160a and 1160b may have pad portions 1165a and 1165b, which are electrically connected to the first circuit board 1170 via, for example, soldering.

The pad portions 1165a and 1165b of the lower elastic member 1160 may be electrically connected to corresponding ones of the first terminals 1175-1 to 1175-n (where n is a natural number greater than 1) formed at the first terminal surface 1170a of the first circuit board 1170.

In another embodiment, instead of bisecting the lower elastic member 1160, the upper elastic member 1150 and the lower elastic member 1160 may be electrically connected to the first circuit board 1170.

Although the lower elastic member 1160 is divided into two parts and the upper elastic member 1150 is not divided, the embodiment is not limited thereto. In another embodiment, the lower elastic member 1160 may not be divided, and the upper elastic member 1150 may be divided into two parts such that the divided upper elastic members are electrically connected to the first circuit board 1170 so as to connect both ends of the first coil 1120, for example, the beginning and terminals ends of the first coil 1120 to different polarities of power sources upon the supply of power.

In another embodiment, the upper and lower elastic members 1150 and 1160 may not be divided, the beginning end of the first coil 1120 may be connected to the upper elastic member 1150, the terminating end of the first coil 1120 may be connected to the lower elastic member 1160, and the upper and lower elastic members 1150 and 1160 may be electrically connected to the first circuit board 1170. As such, upon the supply of power, different polarities of power may be supplied to both ends of the first coil 1120, for example, the beginning and terminating ends of the first coil 1120.

In another embodiment, the upper and lower elastic members 1150 and 1160 may not be divided and may not be electrically connected to the first circuit board 1170, the first circuit board 1170 and the first coil 1120 may be directly electrically connected to each other, and the first circuit board 1170 and the second circuit board 1250 may be electrically connected to each other by the elastic support members 1220a to 1220d. As such, upon the supply of power, different polarities of power may be supplied to both ends of the first coil 1120, for example, the beginning and terminating ends of the first coil 1120.

The first circuit board 1170 may be disposed on the upper elastic member 1150, and may include a first upper surface portion 1170b disposed on the outer frame 1152 of the upper elastic member 150, and the first terminal surface 1170a bent downward from the first upper surface portion 1170b.

The first circuit board 1170 may have through-holes 1171 formed in the first upper surface portion 1170b for the coupling of the upper support bosses 1144 of the housing 1140. The first circuit board 1170 may have guide grooves 1172 for the coupling of the stoppers 1143 of the housing 1140. Here, the guide grooves 1172 may take the form of through-grooves penetrating the first circuit board 1170.

The first circuit board 1170 may be electrically connected to one end of the respective elastic support members 1220a to 1220d.

The first terminal surface 1170a of the first circuit board 1170 may be bent downward at a right angle from the first upper surface portion 1170b, and may include the first terminals or first pins 1175-1 to 1175-n (where n is a natural number greater than 1) to which external electrical signals are input.

The terminals 1175-1 to 1175-n (where n is a natural number greater than 1) may include a terminal, which receives power from an external source and supplies the power to the first position sensor 1190, a terminal which serves as an output terminal of the first position sensor 1190, and/or a terminal which is used to test the first position sensor 1190. The number of terminals 1175-1 to 1175-n (where n is a natural number greater than 1) formed on the first circuit board 1170 may be increased or reduced according to the constituent elements that need to be controlled.

The first position sensor 1190 may be electrically connected to at least one of the terminals 1175-1 to 1175-n (where n is a natural number greater than 1) formed at the first terminal surface 1170a of the first circuit board 1170 via soldering, and the number of terminals to be electrically connected may be determined based on the realized form of the first position sensor 1190.

In another embodiment, the first circuit board 1170 and the upper elastic member 1150 may be integrated with each other. For example, the first circuit board 1170 may be omitted, and the upper elastic member 1150 may include a stack of a thin film having heat resistance, chemical resistance, and bending resistance, and a copper foil pattern for circuit wiring.

In addition, in another embodiment, the first circuit board 1170 and the lower elastic member 1160 may be integrated with each other. For example, the first circuit board 1170 may be omitted, and the lower elastic member 1160 may include a stack of a soft film and a copper foil pattern.

The base 1210 may be connected to the cover member 1300, and the support portions 1720-1 to 1720-4 of the housing 1140 may be fixed to the base 1210.

Figure 25:
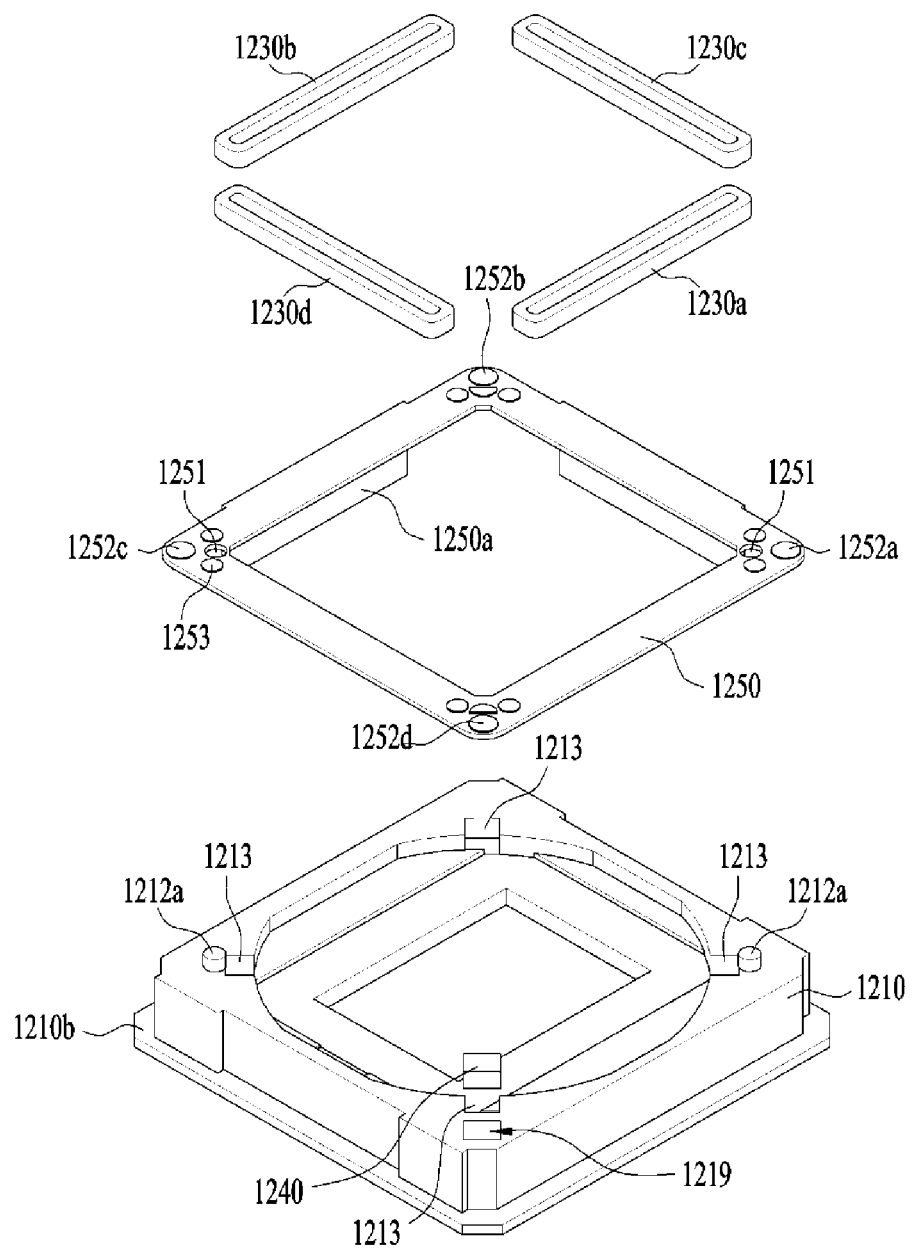
FIG. 25 is an exploded perspective view of a base, a second circuit board, and a second coil illustrated in FIG. 18.

FIG. 25 is an exploded perspective view of the base 1210, the second circuit board 1250, and the second coils 1230a to 1230d illustrated in FIG. 18.

Referring to FIG. 25, the base 1210 may have a bore corresponding to the bore 1101 of the bobbin 1110 and/or the bore 1201 of the housing 1140 described above, and may have a shape that coincides with or corresponds to that of the cover member 1300, for example, a square shape.

In addition, the base 1210 may have seating recesses 1213, which are recessed in the upper surface thereof such that the lower frame support bosses 1145 of the support portions 1720-1 to 1720-4 of the housing 1140 are inserted into or fixed to the seating recesses 1213.

In order to ensure easy insertion of the lower frame support bosses 1145 of the housing 1140, one side surface of each seating recess 1213 may be opened to the bore of the base 1210. That is, one of side surfaces of the seating recess 1213 of the base 1210, i.e. one side surface facing the bore of the base 1210 may be opened.

The base 1210 may have a second position sensor seating recess 1219 recessed in the upper surface thereof such that the second position sensor 1240 is located in the seating recess 1219.

The second position sensor seating recess 1219 may be recessed in the upper surface of the base 1210, without being limited thereto. In another embodiment, the second position sensor seating recess may be opened to the outside of the side surface of the base 1210, and may be in communication with the bore of the base 1210.

The second position sensor seating recess 1219 may be located at or aligned with one region of the upper surface of the base 1210 located between the neighboring two second magnets 1130a and 1130b, 1130b and 1130c, 1130c and 1130d, or 1130d and 1130a.

Figure 28:
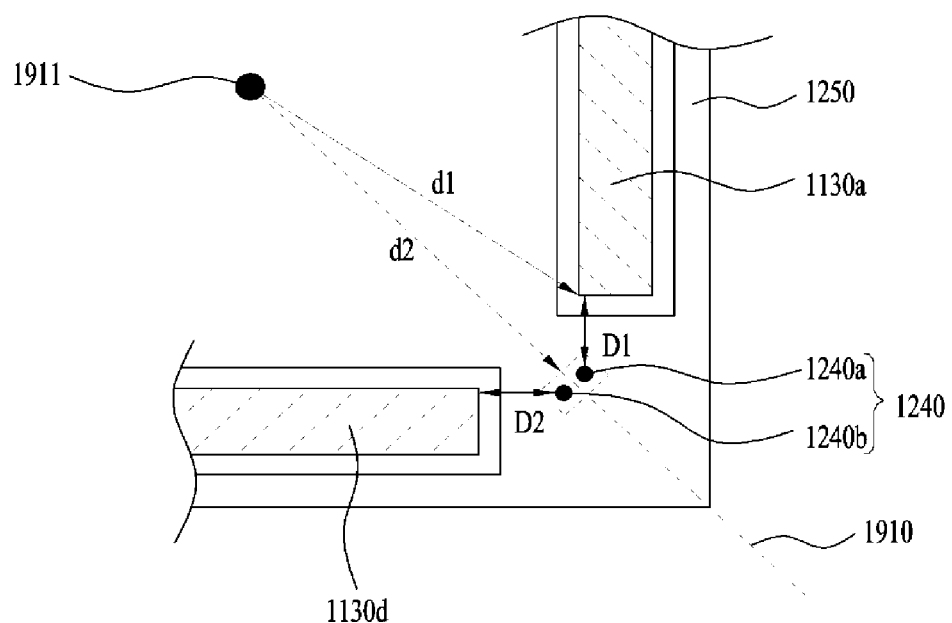

For example, the center of the second position sensor seating recess 1219 may be aligned with a virtual reference line (1910, see FIG. 28). At this time, the virtual reference line 1910 may be a line that passes through the center axis of the housing 1140 or the center axis of the base 1210, and around which two neighboring second magnets are symmetrical with each other.

An upper surface of the second position sensor 1240, placed in the second position sensor seating recess 1219, and the upper surface of the base 1210 may be the same plane, without being limited thereto.

In addition, the base 1210 may further include a stepped portion 1210b protruding from a lower portion of an outer circumferential surface thereof. When the base 1210 and the cover member 1300 are coupled to each other, the top of the stepped portion 1210b of the base 1210 may guide the cover member 1300, and may come into contact with the bottom of the cover member 1300. The stepped portion 1210b and the end of the cover member 1300 may be fixed and sealed to each other using, for example, an adhesive.

The second position sensor 1240 is disposed below the second circuit board 1250. For example, the second position sensor 1240 may be placed in the position sensor seating recess 1219 of the base 1210.

The second position sensor 1240 may sense variation in magnetic force discharged from the second magnets 1130a to 1130d. The second position sensor 1240 may include a first sensor 1240a and a second sensor 1240b. The first sensor 1240a and the second sensor 1240b may take the form of a single chip, without being limited thereto. Alternatively, the first sensor 1240a and the second sensor 1240b may be implemented into individual chips.

The first sensor 1240a and the second sensor 1240b may be Hall sensors, without being limited thereto. Any other sensors may be used so long as they can sense variation in magnetic force.

For example, when the housing 1140 moves in the direction inclined relative to the optical axis (e.g. in the vertical direction), the first sensor 1240a and the second sensor 1240b may output sensing signals (e.g. sensing voltages or sensing current) based on the result of sensing variation in the magnetic flux of the second magnets 1130a to 1130d.

For example, the second position sensor 1240 may take the form of a single chip including two Hall sensors. One Hall sensor may include two input terminals (a positive (+) input terminal and a negative (−) input terminal) and two output terminals (a positive (+) output terminal and a negative (−) output terminal).

Because two Hall sensors are provided at one chip and the negative (−) input terminals of the two respective Hall sensors are connected in common, in the embodiment, the size of the Hall sensors and the number of Hall sensor terminals may be reduced, which may realize reduced size and low cost.

The first and second sensors 1240a and 1240b may be electrically connected to the second circuit board 1250 via, for example, soldering.

The second circuit board 1250 may be electrically connected to the second coils 1230a to 1230d, the second position sensor 1240, and the elastic support members 1220a to 1220d.

The second circuit board 1250 may have through-holes 1251 for the coupling of coupling bosses 1212a of the base 1210. The second circuit board 1250 may have pads 1252a to 1252d connected to the other ends of the elastic support members 1220a to 1220d.

The second coils 1230a to 1230d are disposed on the upper surface of the second circuit board 1250 so as to correspond to or be opposite to the second magnets 1130a to 1130d.

The description related to the second circuit board 250 and the second coil 230 of FIG. 2 may be equally applied to the second circuit board 1250 and the second coils 1230a to 1230d of the present exemplary embodiment.

The elastic support members 1220a to 1220d electrically connect the first circuit board 1170 and the second circuit board 1250 to each other.

The elastic support members 1220a to 1220d may be point symmetrical to one another in the second and third directions, which are perpendicular to the first direction, on the basis of the center axis of the housing 1140.

The number of elastic support members 1220a to 1220d may be equal to or greater than the number of terminals for the first circuit board.

For example, in the case where the first position sensor 1190 is formed by integrating a Hall sensor and a driver with each other, the number of elastic support members 1220a to 1220d may be four. In addition, in the case where the first position sensor 1190 is a Hall sensor alone, the number of elastic support members 1220a to 1220d may be six or more. The elastic support members 1220a to 1220d may serve as a passage for movement of electrical signals between the second circuit board 1250 and the first circuit board 1170, and may elastically support the housing 1140 relative to the base 1210.

Figure 27:
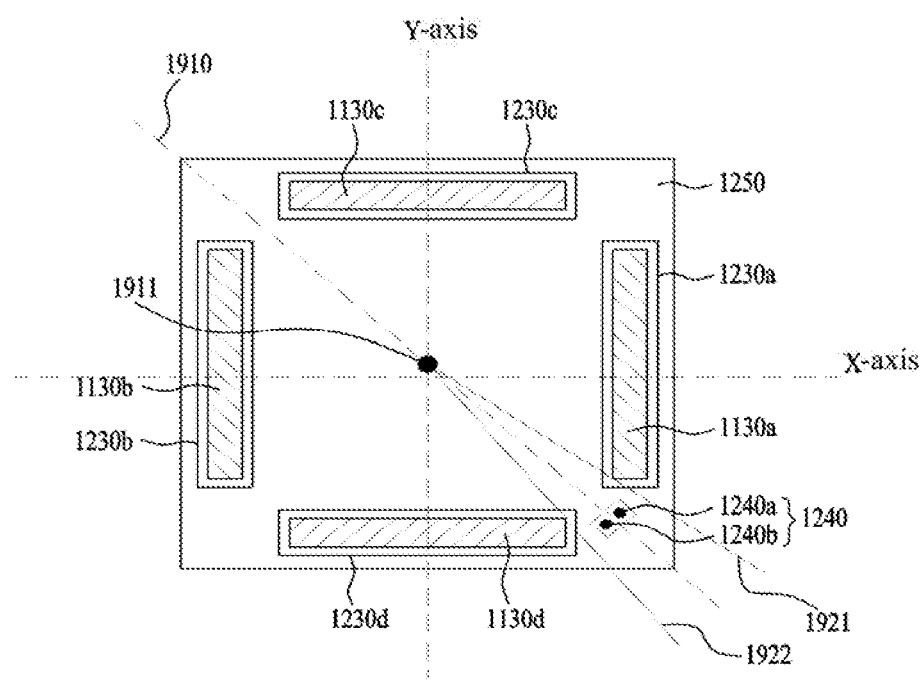
FIGS. 27 and 28 are views illustrating the arrangement of the second position sensor of FIG. 18 according to a first embodiment.

FIGS. 27 and 28 are views illustrating the arrangement of the second position sensor 1240 of FIG. 18 according to a first embodiment.

Referring to FIGS. 27 and 28, the second position sensor 1240 may be located between the neighboring two second magnets (e.g. 1130a and 1130d), and may include the first and second sensors 1240a and 1240b spaced apart from each other.

The first and second sensors 1240a and 1240b may be located between the neighboring ends of neighboring two second magnets (e.g. 1130a and 1130d).

The first and second sensors 1240a and 1240b may be disposed to be located or positioned between a first reference line 1921 and a second reference line 1922.

The first reference line 1921 may be a straight line at which a center axis 1911 of the housing 1140 meets one end (e.g., the corner of an upper surface) of any one 1130a among the neighboring two second magnets 1130a and 1130d. The second reference line 1922 may be a straight line at which the center axis 1911 of the housing 1140 meets one end (e.g., the corner of an upper surface) of the other one 1130d among the neighboring two second magnets 1130a and 1130d.

A first distance D1 between the second magnet 1130a and the first sensor 1240a may be equal to a second distance D2 between the second magnet 1130d and the second sensor 1240b.

The first sensor 1240a may be located closer to the second magnet 1130a than the second magnet 1130d, and the second sensor 1240b may be located closer to the second magnet 1130d than the second magnet 1130a.

The first and second sensors 1240a and 1240b may be left-and-right symmetrical on the basis of the virtual reference line 1910. For example, the virtual reference line 1910 may be a line that passes through the center axis (1911, see FIG. 26) of the housing 1140 or the center axis of the base 1210, and around which the two neighboring second magnets 1130a and 1130d or 1130c and 1130b are left-and-right symmetrical with each other.

For example, a distance between the virtual reference line 1910 and the first sensor 1240a may be equal to a distance between the virtual reference line 1910 and the second sensor 1240b.

The first distance d1 may be less than or equal to the second distance d2 (d1≤d2).

The first distance d1 may be a distance from the center axis 1911 of the housing 1140 or the center axis of the base 1210 to one end of the second magnet 1130a or 1130d. For example, the first distance dl may be a distance from the center axis (1911, see FIG. 26) of the housing 1140 or the center axis of the base 1210 to one end of the second magnet 1130a or 1130d (e.g. the corner of the upper surface).

The second distance d2 may be a distance from the center axis 1911 of the housing 1140 or the center axis of the base 1210 to the second position sensor 1240. For example, the second distance d2 may be a distance from the center axis 1911 of the housing 1140 or the center axis of the base 1210 to the first sensor 1240a or the second sensor 1240b.

When the housing 1140 moves in the inclined direction (e.g. a vertical plane (the XY plane) relative to the optical axis (e.g. the Z-axis), variation in the position of the housing 1140 may be sensed by the output of the first sensor 1240a and the output of the second sensor 1240b.

Since the first distance D1 and the second distance D2 are the same and the first and second sensors 1240a and 1240b are disposed so as to be left-and-right symmetrical on the basis of the virtual reference line 1910, in the embodiment, variation in the position of the housing 1140 may be accurately sensed without displacement compensation by an algorithm based on the outputs of the first and second sensors 1240a and 1240b.

In the case where the first distance D1 and the second distance D2 are not the same and have a great difference, additional data processing for displacement compensation is required, which may deteriorate the data processing speed of the camera module.

In addition, since the second position sensor 1240 is located between the neighboring two second coils 1230a and 1230d and do not overlap the second coils 1230a and 1230d in the optical axis direction or in the direction parallel to the optical axis, there is no magnetic interference in a high frequency range, which may prevent an error caused by magnetic interference.

That is, the second position sensor 1240 may be located so as not to overlap the second coils 1230a to 1230d in the direction parallel to a line which connects the second position sensor 1240 to the center axis 1911 of the housing 1140 or the center axis of the base 1210.

Referring to FIG. 26, when the housing 1140 is not moved and the center axis 1911 of the housing 1140 is located at the original point of the XY plane, output values of the first and second sensors 1240a and 1240b may have a reference value (e.g. zero).

When the housing 1140 is moved in the X−Y+ direction by the same movement amount, the output values of the first and second sensors 1240a and 1240b may be the same, or may have a given difference therebetween. Here, when the movement amount is the same, this may mean that the movement amount in the X-axis and the movement amount in the Y-axis are the same.

For example, when the housing 1140 is moved in the diagonal direction (e.g. in the X−Y+ direction), the output values of the first and second sensors 1240a and 1240b may be smaller than the reference value (e.g. zero).

When the housing 1140 is moved in the X+Y− direction by the same movement amount, the output values of the first and second sensors 1240a and 1240b may be the same, or may have a given difference therebetween. For example, when the housing 1140 is moved in the diagonal direction (e.g. in the X+Y− direction), the output values of the first and second sensors 1240a and 1240b may be larger than the reference value (e.g. zero).

When the housing 1140 is moved in the X−Y− direction, the output value of the second sensor 1240b may be smaller than the output value of the first sensor 1240a.

In addition, when the housing 1140 is moved in the X+Y+ direction, the output value of the first sensor 1240a may be smaller than the output value of the second sensor 1240b.

The first and second sensors 1240a and 1240b are disposed so as to be aligned with the X+Y− axis in FIG. 26, without being limited thereto. In another embodiment, the first and second sensors 1240a and 1240b may be disposed so as to be aligned with the X−Y+ axis, the X−Y− axis, or the X+Y+ axis.

Figure 29:
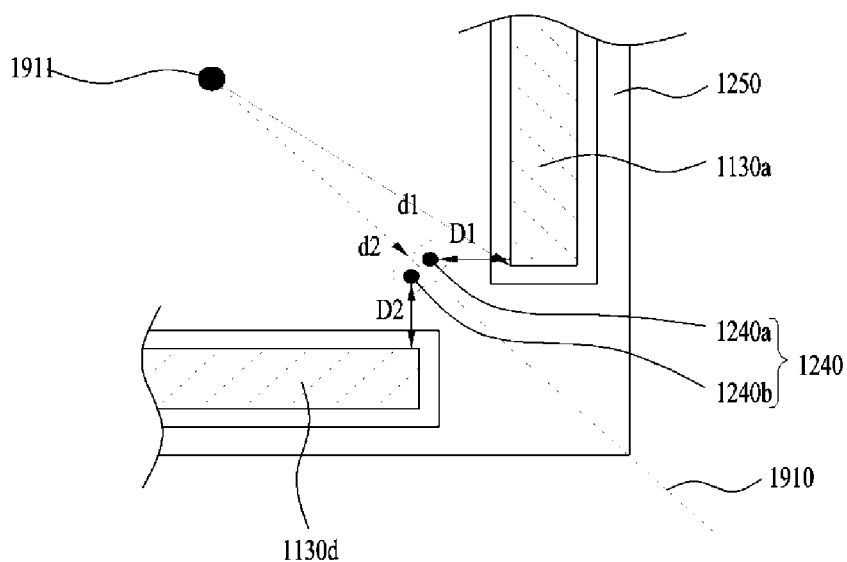
FIG. 29 is a view illustrating the arrangement of the second position sensor of FIG. 18 according to a second embodiment.

FIG. 29 is a view illustrating the arrangement of the second position sensor 1240 of FIG. 18 according to a second embodiment.

Referring to FIG. 29, the first distance dl may be greater than the second distance d2 (d1>d2). The first and second sensors 1240a and 1240b may be left-and-right symmetrical on the basis of the virtual reference line 1910, without being limited thereto. The description related to FIG. 26 may be equally applied to the embodiment in FIG. 29.

Figure 30:
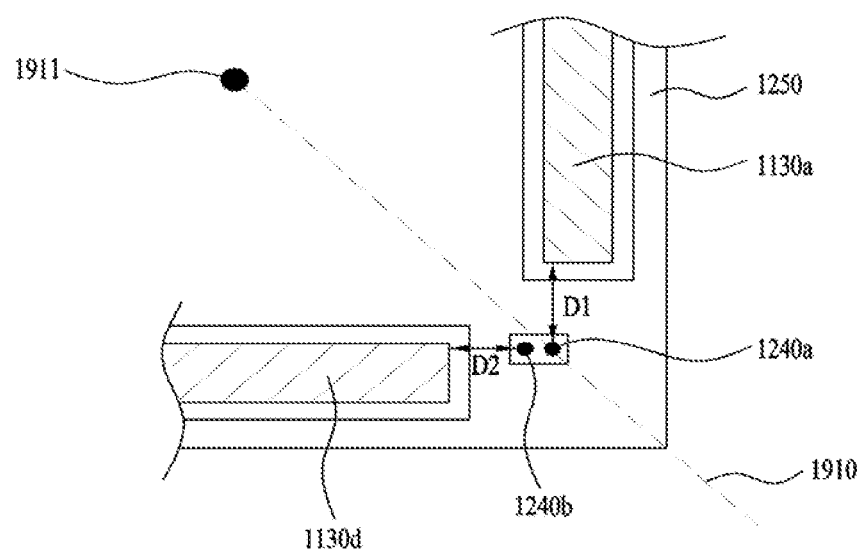
FIG. 30 is a view illustrating the arrangement of the second position sensor of FIG. 18 according to a third embodiment.

FIG. 30 is a view illustrating the arrangement of the second position sensor 1240 of FIG. 18 according to a third embodiment.

Referring to FIG. 30, a first distance D1 between the second magnet 1130a and the first sensor 1240a may differ from a second distance D2 between the second magnet 1130d and the second sensor 1240b.

In addition, the first and second sensors 1240a and 1240b may be left-and-right asymmetrical on the basis of the virtual reference line 1910.

For example, the first distance D1 may be greater than the second distance D2.

A ratio D1:D2 of the first distance D1 to the second distance D2 may be greater than 1 and equal to or less than 2.5. Alternatively, a ratio D2:D1 of the second distance D2 to the first distance D1 may be greater than 1 and equal to or less than 2.5.

In the case where the ratio (D1/D2 or D2/D1) of the first distance D1 to the second distance D2 exceeds 2.5, a displacement compensation amount increases, and therefore displacement compensation may not be easy.

In addition, the second position sensor 1240 may be located such that a difference between the output values of the first and second sensors 1240a and 1240b does not exceed a first reference value (e.g. 5 [mV]) in the state in which the housing 1140 is stationary.

Here, the state in which the housing 1140 is stationary may mean a state in which the housing 1140 is not moved because no drive current is applied to the second coils 1230a to 1230d.

When drive power (e.g. an operation voltage or operation current) is applied to the first and second sensors 1240a and 1240b in the state in which the housing 1140 is stationary, output values may be acquired from the first and second sensors 1240a and 1240b.

For example, in the embodiment illustrated in FIGS. 27 and 28, the output values of the first and second sensors 1240a and 1240b may be the same in the state in which the housing 1140 is stationary.

In addition, in the embodiment illustrated in FIG. 30, since the first distance D1 and the second distance D2 differ from each other, the output values of the first and second sensors 1240a and 1240b may differ from each other in the state in which the housing 1140 is stationary.

For example, a difference between the output values of the first and second sensors 1240a and 1240b may be, for example, 5 [mV] or less.

Here, the first reference value may be a difference between the output values of the first and second sensors 1240a and 1240b, which is calculated in response to the ratio (D1/D2 or D2/D1) of the first distance D1 to the second distance D2.

For example, when the ratio of the first distance D1 to the second distance D2 has the highest value, a difference between the output values of the first and second sensors 1240a and 1240b may become the first reference value.

Based on the ratio of the first distance D1 to the second distance D2 or a difference between the output values of the first and second sensors 1240a and 1240b in the state in which the housing 1140 is stationary, the output values of the first and second sensors 1240a and 1240b may be compensated depending on the result of sensing the position displacement of the housing 1140. The compensation of the output values of the first and second sensors 1240a and 1240b may be performed by a controller provided in the camera module.

Figure 31:
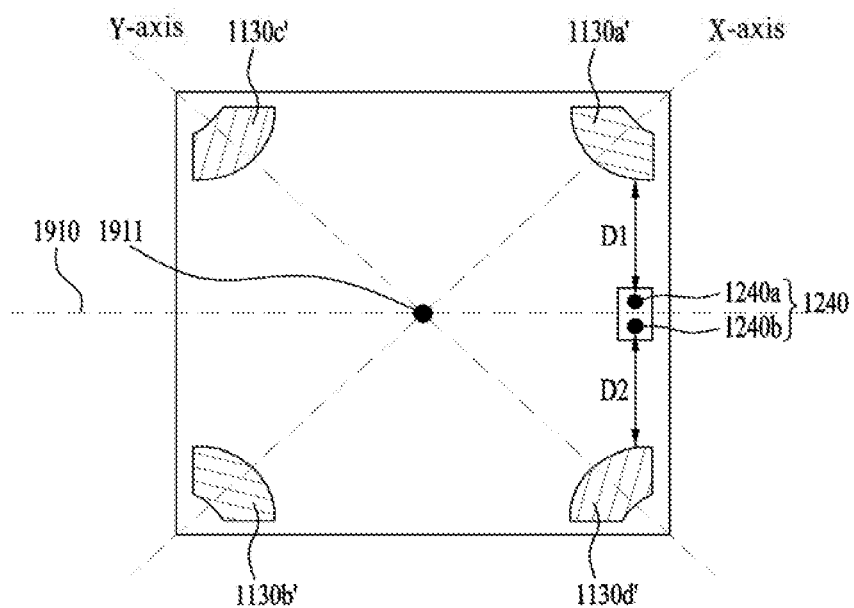
FIG. 31 is a view illustrating the arrangement of second magnets, and a second position sensor of a lens moving apparatus according to another embodiment.

FIG. 31 is a view illustrating the arrangement of second magnets 1130a' to 1130d', and the second position sensor 1240 of a lens moving apparatus according to another embodiment.

Each of the second magnets 1130a' to 1130d' may be located in the vicinity of a corresponding one of corners of the base 1210, and the second position sensor 1240 may be located between the neighboring two second magnets 1130a' and 1130d' or be aligned with a position between the neighboring two second magnets 1130a' and 1130d'.

In FIG. 31, second coils may be disposed so as to correspond to the second magnets 1130a' to 1130d'. All of the relationships between the second magnets 1130a to 1130d, the virtual reference line 1910, the first and second distances D1 and D2, the first and second distances d1 and d2, the virtual reference line 1910, and the second position sensor 1240 as described in FIGS. 27 to 30 may be applied to the embodiment illustrated in FIG. 30.

As described above, in the embodiment, two Hall sensors are provided in a single chip, which may reduce the size of the Hall sensors and the number of Hall sensor terminals.

Figure 32:
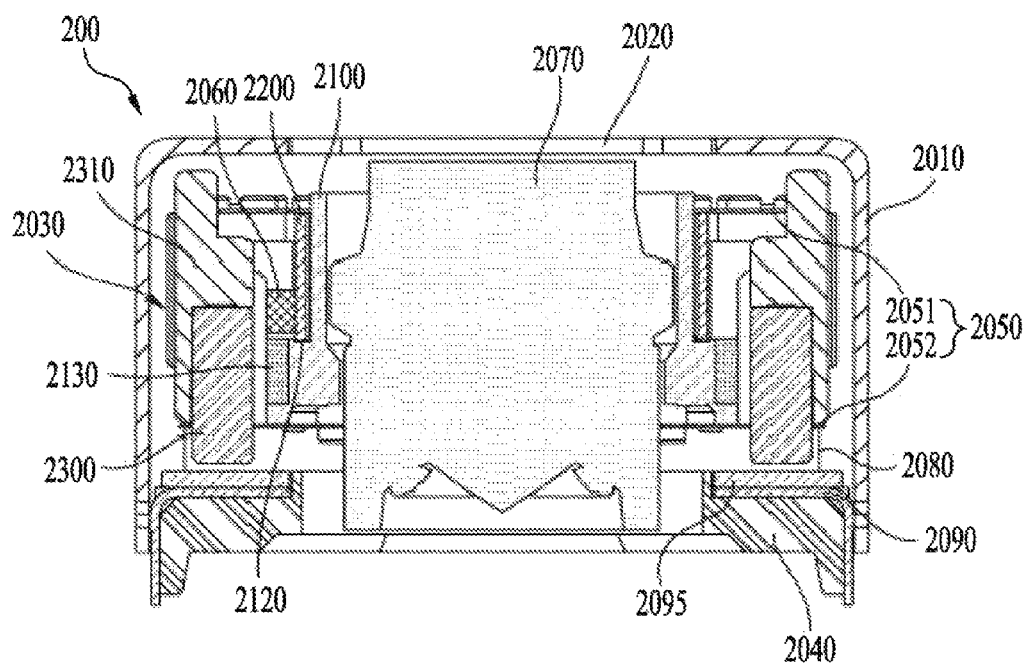
FIG. 32 is a sectional view illustrating a camera module according to an embodiment.

FIG. 32 is a sectional view illustrating a camera module 200 according to an embodiment.

Referring to FIG. 32, the camera module 200 may include a lens moving apparatus to move a lens, and the lens moving apparatus may include a cover member 2010, a first movable unit 2020, a second movable unit 2030, a base 2040, an elastic member 2050, a sensor 2060, a lens module 2070, a support member 2080, a circuit board 2090, and a second coil 2095.

Although not illustrated, the camera module 200 may further include, for example, a printed circuit board, an Infrared Ray (IR) filter, and an image sensor.

The cover member 2010 may accommodate the first movable unit 2020, the second movable unit 2030, and the elastic member 2050, and may be mounted on the base 2040 so as to define the external appearance of the camera module. More specifically, an inner side surface of the cover member 2010 may be mounted on the base 2040 so as to come into close contact with a portion of the side surface or the entire side surface of the base 2040, and may function to protect internal constituent elements from external shock and to prevent invasion of external contaminants.

In addition, the cover member 2010 may be formed of a metal. In this case, the cover member 2010 may also function to protect the internal constituent elements from external radio wave interference generated by, for example, a cellular phone.

The description related to the cover member 300 of FIG. 2 may be applied to the cover member 2010 of the present exemplary embodiment.

The first movable unit 2020 is located at the lateral side of the lens module 2070 in order to move the lens module 2070. Meanwhile, the first movable unit 2020 may include a bobbin 2100 which fixes the lens module 2070, and a first coil 2130 provided at an outer circumferential surface of the bobbin 2100.

The lens module 2070 may be coupled to an inner circumferential surface of the bobbin 2100. Meanwhile, in order to allow the bobbin 2100 to be movably elastically supported relative to the upper side and the lower side of a housing 2310, an upper spring 2051 may be fastened to an upper surface of the bobbin 2100, and a lower spring 2052 may be fastened to a lower surface of the bobbin 2100.

The description related to the bobbin 110 of FIG. 2 may be applied to the bobbin 2100 of the present exemplary embodiment.

The first coil 2130 may be wound so as to surround the outer circumferential surface of the bobbin 2100, without being limited thereto. In another embodiment, four individual first coils 2130 may be disposed on outer side surfaces of the bobbin 2100, and an angle between the neighboring first coils 2100 may be maintained at 90 degrees. The first coil 2130 may create an electromagnetic field upon receiving power applied from a printed circuit board (not illustrated).

Thereby, the bobbin 2100 may be moved via interaction with a magnet 2300 which will be described below, so as to perform the Auto-Focusing (AF) function. The description related to the first coil 120 of FIG. 12 may be equally applied to the first coil 2130 of the present exemplary embodiment.

The second movable unit 2030 may be located at the lateral side of the first movable unit 2020 so as to be opposite to the first movable unit 2020. Meanwhile, the second movable unit 2030 may include a magnet 2300 disposed to be opposite to the first coil 2130, and a housing 2310 to which the magnet 2300 is fixed. The second movable unit 2030 may correspond to the fixed unit described in FIG. 1.

The housing 2310 may have a shape corresponding to the inner side surface of the cover member 2010 which defines the external appearance of the camera module.

In addition, the housing 2310 may be formed of an insulation material and may be manufactured into an injection molded article in consideration of productivity. Meanwhile, the housing 2310 is an element that moves for Optical Image Stabilization (OIS) driving, and therefore may be spaced apart from the cover member 2010 by a prescribed distance. In addition, for example, the housing 2310 may have a hexahedral shape corresponding to the shape of the cover member 2010, may have open upper and lower sides, and may accommodate the first movable unit 2020 to allow the first movable unit 2020 to be movable in the vertical direction. The description related to the housing 140 of FIG. 1 may be applied to the housing 2310 of the present exemplary embodiment.

The base 2040 may support the second movable unit 2030 and may be coupled to the cover member 2010. In addition, the base 2040 may function as a sensor holder which protects an image sensor (not illustrated). Meanwhile, the base 2040 may have a bore (not illustrated) corresponding to the position of the lens module 2070, and an IR filter (not illustrated) may be mounted in the bore.

The elastic member 2050 may elastically support the bobbin 2100 so as to allow the bobbin 2100 to be moved relative to the housing 2310. The elastic member 2050 may include an upper spring 2051 and a lower spring 2052 as exemplarily illustrated in FIG. 32. The upper spring 2051 may be coupled to the upper side of the bobbin 2100 and the upper side of the housing 2310, and the lower spring 2052 may be coupled to the lower side of the bobbin 2100 and the lower side of the housing 2310.

The sensor 2060 may perform Auto-focusing feedback by sensing the movement of the bobbin 2100. The sensor 2060 will be described below in detail with reference to FIG. 33.

The lens module 2070 may be a lens barrel having one or more lenses, without being limited thereto, and may have any other structure including one or more lenses.

The support member 2080 may support the housing 2310 and the bobbin 2100 relative to the base 2040. Meanwhile, the support member 2080 may be coupled to the upper spring 2051.

For example, the support member 2080 may be coupled to an FPCB 2090, which comes into contact with and is supported by the base 2040, and the upper spring 2051, and the housing 2030 and the bobbin 2100 may be coupled to the upper spring 2310. With this configuration, the support member 80 may support the housing 2310 and the bobbin 2100 relative to the base 2040.

For example, the support member 2080 may be connected to four portions, which are spaced apart from the upper spring 2051 by a constant distance, without being limited thereto. For example, the support member 2080 may be a wire or a leaf spring.

However, the support member 2080 is not limited to the above description, and may be implemented into any configuration so long as it can support the upper spring 2051 relative to the base 2040. For example, the support member 2080 may remain fixed when the lens module 2070 is moved in the vertical direction, and may be moved along with the lens module 2070 when the lens module 2070 is moved in the horizontal direction.

The upper spring 2051 may be provided with a damping portion (not illustrated) in contact with a junction between the upper spring 2051 and the support member 2080. The damping portion may alleviate shock that may be generated in the support member 2080 when the lens module 2070 is moved in the vertical direction.

Meanwhile, the support member 2080 may receive power from the FPCB 2090 disposed on the base 2040 and supply the power to the upper spring 2051. The description related to the support member 220 of FIG. 2 may be applied to the support member 2080 of the present exemplary embodiment.

The FPCB 2090 may supply power to the second coil 2095 and the support member 2080. The FPCB 2090 may include a terminal portion (not illustrated), one end or both ends of which are bent to protrude downward from the base 2040.

The FPCB 2090 may receive external power from the terminal portion. The description related to the circuit board 250 of FIG. 2 may be applied to the FPCB 2090 of the exemplary embodiment.

The second coil 2095 may be provided on the FPCB 2090. The second coil 2095 may receive power from the FPCB 2090. When power is applied to the second coil 2095, the housing 2310, the bobbin 2100, and the lens module 2070 may be integrally moved in the horizontal direction via interaction with the magnet 2300 coupled to the housing 2310. In this way, the camera module 200 may perform the OIS function.

The second coil 2095 may be, for example, an FP coil that is a patterned coil, without being limited thereto. The description related to the second coil 230 of FIG. 2 may be applied to the second coil 2095 of the exemplary embodiment.

Meanwhile, the camera module 200 may further include the sensor 2060, which senses movement of the bobbin 2100 so as to perform auto-focusing feedback. In addition, the camera module 200 may further include a sensor coupling member 2200 configured to fix the sensor 2060 to the outer circumferential surface of the bobbin 2100. Hereinafter, related configurations of the sensor 2060 and the sensor coupling member 2200 will be described in detail.

Figure 33:
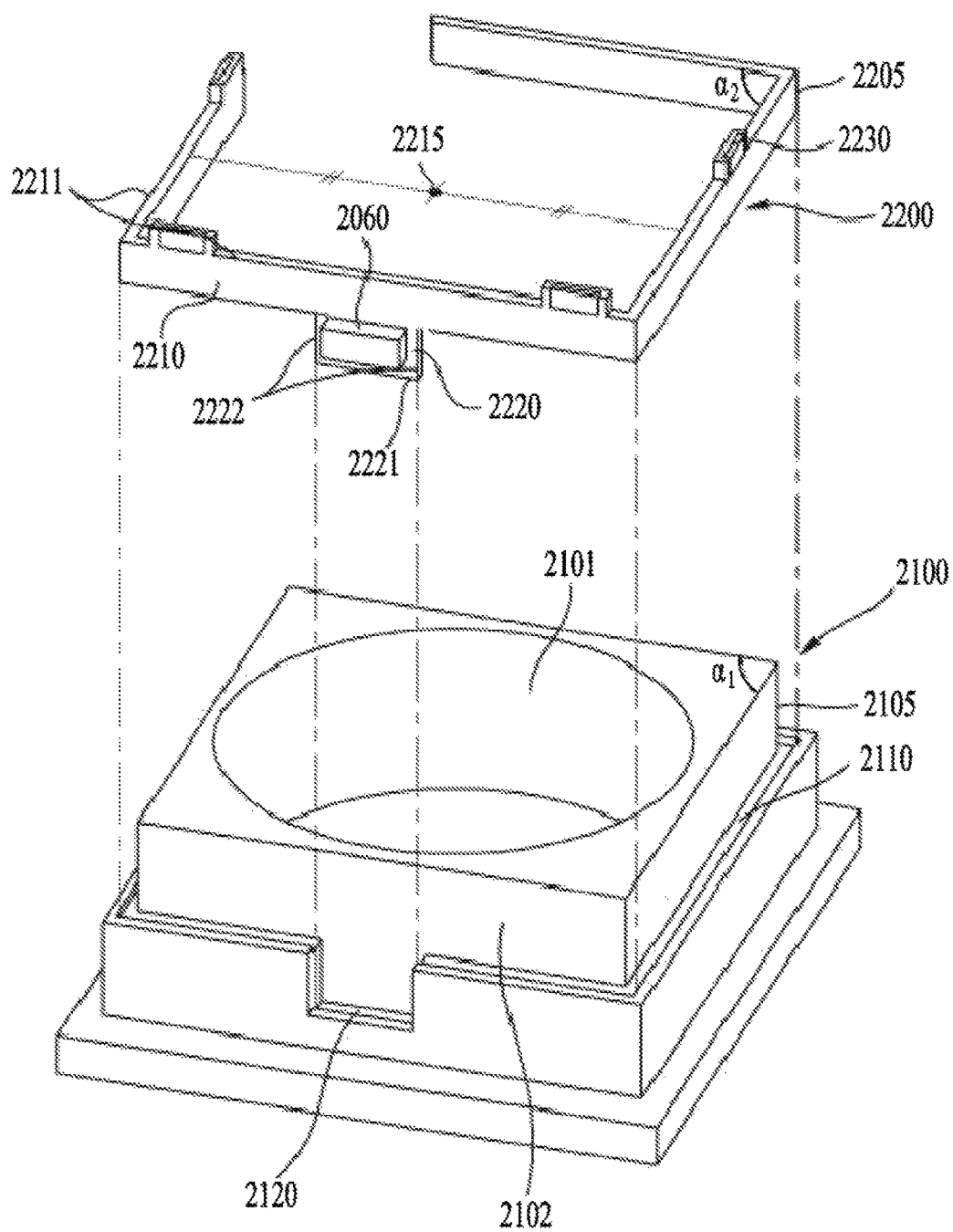
FIG. 33 is a perspective view illustrating a bobbin and a sensor coupling member illustrated in FIG. 32.

FIG. 33 is a perspective view illustrating the bobbin 2100 and the sensor coupling member 2200 illustrated in FIG. 32.

Referring to FIG. 33, the camera module 200 may include a movable bobbin 2100 which has one or more lenses provided at an inner side surface 2101 thereof, and the sensor coupling member 2200 which is located to surround at least a portion of an outer circumferential surface 2102 of the bobbin 2100, the sensor 2060 being coupled to the sensor coupling member 2200.

The sensor coupling member 2200 may include one or more angled corners 2205. Since the angled corners 2205 of the sensor coupling member 2200 may be firmly supported by the outer circumferential surface 2102 of the bobbin 2100, the sensor 2060 coupled to the sensor coupling member 2200 is advantageously restricted so as not to be moved relative to the bobbin 2100. The sensor 2060 may be a Hall sensor that senses the strength of a magnetic field of the magnet 2300, without being limited thereto, and may be implemented into any configuration so long as it can perform auto-focusing feedback by sensing movement of the bobbin 2100.

The sensor 2060 may correspond to the first position sensor 170 of FIG. 2, and thus may also be called the first position sensor 170. The description related to the first position sensor 170 of FIG. 2 may be applied to the present exemplary embodiment.

At least a portion of the outer circumferential surface 2102 of the bobbin 2100 may have a shape corresponding to the shape of the sensor coupling member 2200. Corners 2105, which have a shape corresponding to the corners 2205 of the sensor coupling member 2200, may be provided at the outer circumferential surface 2102 of the bobbin 2100.

At this time, in order to distinguish the corners 2105 of the bobbin 2100 from the corners 2205 of the sensor coupling member 2200, the corners 2105 of the bobbin 2100 may be referred to as first corners 2105, and the corners 2205 of the sensor coupling member 2200 may be referred to as second corners 2205.

Meanwhile, an inner angle α1 of the first corner 2105 and an inner angle α2 of the second corner 2205 may correspond or equal to each other. In this case, as an inner circumferential surface of the second corner 2205 comes into close contact with an outer circumferential surface of the first corner 2105 of the bobbin 2100, the second corner 2205 may be firmly secured to the first corner 2105.

The bobbin 2100 may include a seating groove 2110 and a sensor seating portion 2120 as exemplarily illustrated in FIG. 33.

The seating groove 2110 of the bobbin 2100 may have a shape and thickness corresponding to those of the sensor coupling member 2200. The sensor coupling member 2200 may be firmly secured in the seating groove 2110 of the bobbin 2100 via insertion.

The seating groove 2110 of the bobbin 2100 may be supported by coming into contact with a lower surface 2221 and both side surfaces 2222 of a sensor grip portion 2220 of the sensor coupling member 2200. The sensor seating groove 2120 of the bobbin 2100 may have a shape corresponding to a shape of the sensor grip portion 2220 of the sensor coupling member 2200. In this case, the sensor seating groove 2120 of the bobbin 2100 may firmly secure the sensor grip portion 2220, on which the sensor 2060 is disposed, thereby advantageously preventing movement or shaking of the sensor 2060.

The seating groove 2110 corresponds to the support groove 114 of FIG. 4, and thus may also be called a "support groove". The description related to the support groove 114 of FIG. 4 may be applied to the present exemplary embodiment.

The sensor seating portion 2120 corresponds to the receiving recess 116 of FIG. 4, and may also be called a "receiving recess". The description related to the receiving recess 116 of FIG. 4 may be applied to the present exemplary embodiment.

The sensor coupling member 2200 may be located to surround at least a portion of the outer circumferential surface 2102 of the bobbin 2100. In addition, the sensor 2060 may be disposed or mounted on the sensor coupling portion 2200.

The inner angle α2 of the second corner 2205 may be 90 degrees or more and may be below 180 degrees. When the inner angle α2 of the second corner 2205 is below 90 degrees, the first corner 2105 of the bobbin 2100, which has a shape corresponding to a shape of the second corner 2205, has the inner angle α1 smaller than 90 degrees. In this case, the X-axis and Y-axis symmetry in the shape of the bobbin 2100 is broken, causing deterioration in focusing reliability.

The sensor coupling member 2200 may be implemented to include an FPCB. In addition, the sensor coupling member 2200 may be bent to have a shape corresponding to the shape of at least a portion of the outer circumferential surface of the bobbin 2100.

For example, as exemplarily illustrated in FIG. 33, the sensor coupling member 2200 may include a main coupling portion 2210 and the sensor grip portion 2220.

The main coupling portion 2210 may surround at least a portion of the outer circumferential surface of the bobbin 2100 in the direction in which the main coupling portion 2210 is rotated about the optical axis, or in the horizontal direction. Thus, the main coupling portion 2210 may have a shape corresponding to the shape of at least a portion of the outer circumferential surface of the bobbin 2100.

In addition, the main coupling portion 2210 may be secured by being inserted into the seating groove 2110 of the bobbin 2100. For example, the main coupling portion 2210 may be formed by bending a linear strip one or more times (e.g. 3 times).

At this time, the inner angle α2 of the second corner 2205 of the main coupling portion 2210 may be 90 degrees or more. However, the shape of the main coupling portion 2210 is not limited thereto, and the main coupling portion 2210 may be implemented into various shapes so long as it includes the second corner 2205 having a shape corresponding to the first corner 2105 of the bobbin 2100.

A conductor 2230 may be provided at an upper end of the main coupling portion 2210. For example, the conductor 2230 may protrude from the upper end of the main coupling portion 2210 in the direction parallel to the optical axis. The conductor 2230 may be directly coupled to the upper spring 2051 via, for example, welding, and may receive power from the upper spring 2051. The power supplied to the conductor 2230 may be supplied to the FPCB included in the main coupling portion 2210, and the power may be supplied to the sensor 2060 via the main coupling portion 2210. The conductor 2230 may include a recessed portion for the coupling of the upper spring 2051, without being limited thereto.

The sensor grip portion 2220 may extend or expand downward from the main coupling portion 2210, and the sensor 2060 may be located at the sensor grip portion 2220.

For example, the sensor grip portion 2220 may protrude so as to extend downward from a lower end of any one center position 2215 of a plurality of edges 2411 or bent portions.

For example, when viewed from the top, the main coupling portion 2210 may have the same shape as at least a portion of a polygon having the edges 2411 or bent portions. The sensor grip portion 2220 may be located to extend downward from any one center 2215 of the edges 2411 or bent portions. For example, the center of the sensor grip portion 2220 may be aligned with any one center 2215 of the edges 2411 or bent portions.

The sensor coupling portion 2200 corresponds to the body 182 of the sensor board 180 of FIG. 5B, and may also be called "the body of the sensor board". The main coupling portion 2210 corresponds to the second segment 182*a* of FIG. 5B, and may also be called "the second segment". The sensor grip portion 2220 corresponds to the first segment 182*a* of FIG. 5B, and may also be called "the first segment".

The conductor 2230 corresponds to the elastic member contact portions 184-1 to 184-4 of FIG. 5B, and may also be called "the elastic member contact portions". The description related to the sensor board 180 of FIG. 5B may be applied to the sensor coupling member 2200 of the exemplary embodiment.

Figure 34:
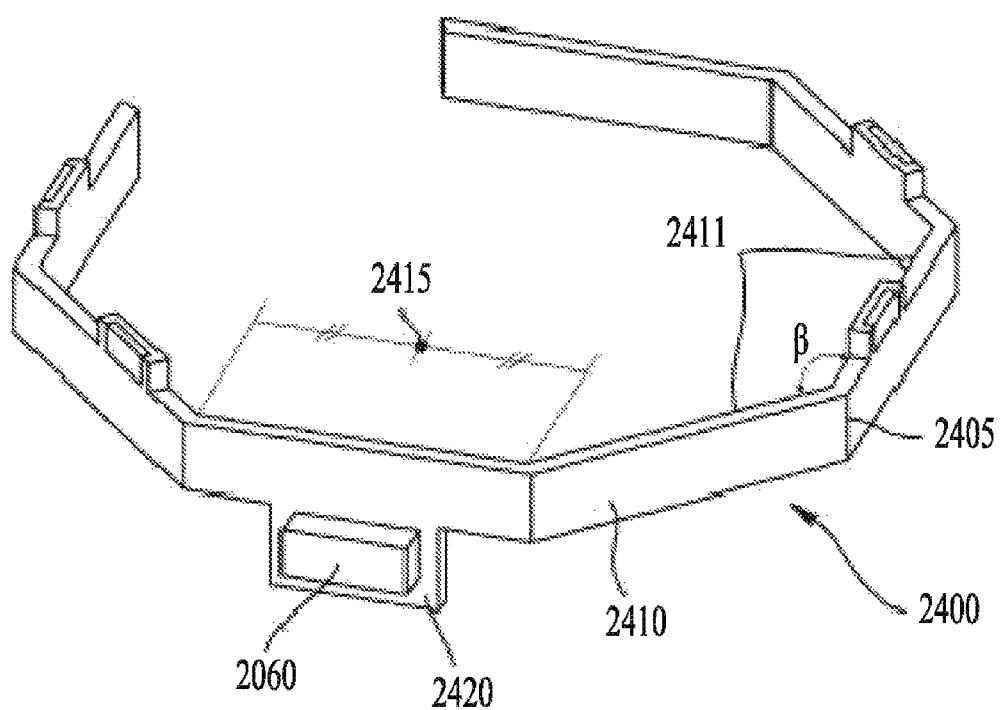
FIG. 34 is a perspective view illustrating a sensor coupling member according to another embodiment.

FIG. 34 is a perspective view illustrating a sensor coupling member 2400 according to another embodiment. The same reference numerals as those in FIG. 33 designate the same components, and a description related to the same components will be provided in brief or omitted.

Referring to FIG. 34, the description related to the sensor coupling member 2200 may be analogously applied to the sensor coupling member 2400, and the following description focuses on differences therebetween.

The sensor coupling member 2400 may include a main coupling portion 2410 and a sensor grip portion 2420. The main coupling portion may be formed by bending a linear strip six times.

An inner angle β of a corner 2405 of the main coupling portion 2410 may be 135 degrees.

The sensor grip portion 2420 extends downward from the main coupling portion 2410, and the sensor 2060 may be located at the sensor grip portion 2420. The sensor grip portion 2420 may protrude so as to extend downward from a lower end of any one center position 2415 of a plurality of edges 2411 or bent portions.

The edges 2411 or bent portions of the main coupling portion 2410 may define at least a portion of the regular octagon when viewed from the top, and the sensor grip portion 2420 may be located at any one center position 2415 of the edges 2411 or bent portions.

The sensor coupling portion 2400 may include an FPCB, and may be formed by bending.

The outer circumferential surface of the bobbin of the camera module illustrated in FIG. 34 may have a shape corresponding to the shape of at least a portion of the sensor coupling portion 2400.

Although FIGS. 33 and 34 illustrate the case where the sensor coupling member 2200 or 2400 is provided with one sensor 2060, the embodiments are not limited thereto, and a plurality of sensors 2060 may be provided at the sensor coupling member 2200 or 2400. In addition, in order to sense displacement in the X-axis and the Y-axis of the bobbin 2100, two or more sensors 2060 may be provided.

Meanwhile, the camera module according to the exemplary embodiments includes the sensor coupling member 2200 or 2400 having the second corners 2205 and 2405, which correspond to the first corners 2105 of the bobbin 2100. As compared to the case where the sensor coupling member has a circular shape or a rounded shape, in these embodiments, the sensor coupling member 2200 or 2400 is not unintentionally separated from the bobbin 2100, which may improve assembly-ability. In addition, since the first corners 2105 of the bobbin 2100 and the second corners 2205 or 2405 of the sensor coupling member 2200 or 2400 are firmly secured to each other, the embodiments may advantageously restrict the movement of the sensor 2060 relative to the bobbin 2100.

As is apparent from the above description, the embodiments have the effects of preventing malfunction or errors of a position sensor caused by the magnetic field of a first coil, of realizing miniaturization and low cost, and of ensuring ease assembly and improved fixing ability of a bobbin and a sensor board.

In the entire specification, even if all constituent elements of the embodiments are described as being coupled into one, or being operated in a coupled state, the present disclosure is not necessary to be limited to these embodiments. That is, all of the constituent elements may be operated in a state in which one or more constituent elements are selectively coupled to one another so long as this falls within an object range of the present disclosure. In addition, when an element is referred to as "including", "constituting", or "having" another element, the element should not be understood as excluding other elements so long as there is no special conflicting description, and the element may include at least one other element. Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

It is to be understood that the detailed description is intended to describe technical ideas of the present disclosure invention by way of example and that various equivalents and modifications are possible by those skilled in the art without departing from the scope and spirit of the invention. Accordingly, the embodiments described herein have no intent to limit the technical spirit of the present disclosure, but are given for description, and the technical scope of the present disclosure is not limited by the embodiment. The scope of the present disclosure should be construed by the following claims, and also should be construed to cover all modifications, equivalents, and alternatives falling within the spirit and scope of the invention as defined by the claims

What is claimed is:

1. A lens moving apparatus comprising:
  a housing comprising first side portions and second side portions located between the first side portions;
  a bobbin disposed inside the housing, wherein an outer surface of the bobbin comprises first side surfaces corresponding to the first side portions and second side surfaces located between the first side surfaces, and wherein the bobbin is configured to move in a first direction along an optical axis;
  a first coil disposed on the bobbin;
  a first position sensor disposed on one side surface of the second side surfaces of the bobbin;
  a first magnet disposed on one of the second side portions of the housing corresponding to one side surface of the second side surfaces of the bobbin so as to be opposite to the first position sensor in a second direction perpendicular to the first direction;
  a second magnet comprising a first driving magnet disposed on one of the first side portions of the housing, wherein the first driving magnet is disposed opposite to the first coil in a third direction perpendicular to the first direction and wherein the second magnet is configured to move the bobbin in the first direction via an electromagnetic interaction with the first coil;
  and
  an upper elastic member coupled to an upper surface of the bobbin and an upper surface of the housing, wherein the upper elastic member comprises an inner frame coupled to the upper surface of the bobbin, an outer frame coupled to the upper surface of the housing, and a frame connection portion connecting the inner frame to the outer frame;
  wherein the first position sensor is mounted on the outer surface of the bobbin and spaced apart from the first coil, wherein the housing comprises a first seating recess provided in an inner side surface of the one of the second side portions of the housing, and the first magnet is disposed in the first seating recess, and wherein the first magnet is not protruded from the upper surface of the housing in the first direction, and the first position sensor is not protruded from the upper surface of the bobbin in the first direction.

2. The lens moving apparatus according to claim 1, further comprising:

a lower elastic member coupled to a lower surface of the bobbin and a lower surface of the housing;

a circuit member including a second coil disposed below the housing, wherein the second coil is opposite to the second magnet;

a circuit board disposed below the circuit member and comprising a plurality of terminals, wherein the second coil is electrically connected to the circuit board;

a second position sensor disposed below the circuit board;

a base disposed below the circuit board and comprising an opening; and a support member configured to support the housing such that the housing is movable relative to the base, wherein the support member connects at least any one of the upper elastic member and the lower elastic member to the circuit board, and wherein the second magnet further comprises a second driving magnet disposed opposite to the first driving magnet, a third driving magnet, and a fourth driving magnet disposed opposite to the third driving magnet.

3. The lens moving apparatus according to claim 2, wherein the first position sensor is electrically connected to at least one of the upper elastic member or the lower elastic member, and wherein the first side portions of the housing include four side portions of the housing, and the first driving magnet, the second driving magnet, the third driving magnet, and the fourth driving magnet are disposed on the four side portions of the housing, respectively.

4. The lens moving apparatus according to claim 3, wherein the first coil is located at a lower portion of the outer surface of the bobbin, and the first position sensor is located at an upper portion of the outer surface of the bobbin;

wherein the inner frame of the upper elastic member is disposed on the upper surface of the bobbin and fixed to the upper surface of the bobbin by an adhesive member, and wherein the second side portions of the housing include four side portions respectively disposed on four corners of the housing.

5. The lens moving apparatus according to claim 4, wherein the first position sensor is overlapped with at least a portion of the first magnet in the second direction at an initial position of the bobbin, and wherein the first position sensor is disposed at a position same as or lower than the upper surface of the bobbin.

6. The lens moving apparatus according to claim 2, wherein the second position sensor comprises two Hall sensors, and wherein the base comprises two second seating recesses formed on an upper surface of the base and support bosses formed on the upper surface of the base;

wherein the two Hall sensors are disposed in the two second seating recesses, respectively, and wherein the circuit board comprises through-holes corresponding to the support bosses of the base;

wherein the support bosses of the base and the through-holes of the circuit board are coupled or fixed to each other by thermal bonding or an adhesive member, and wherein the support bosses of the base comprises a first support boss disposed at a corner of the base and a second support boss disposed opposite to the first support boss at the base.

7. The lens moving apparatus according to claim 6, wherein the two Hall sensors are disposed perpendicular to each other in order to sense the displacement of the housing relative to the base in a direction of X-axis or in a direction of Y-axis perpendicular to the optical axis, wherein the plurality of terminals is configured to receive power from an external source and to supply the power to the first and second coils and the first and second position sensors and is configured to externally output signals from the first and second position sensors.

8. The lens moving apparatus according to claim 2, wherein the first coil has an octagonal shape including eight outer side surfaces, and wherein four outer side surfaces of the eight outer side surfaces of the first coil facing the second magnet are disposed on the first side surfaces, and the remaining four outer side surfaces of the eight outer side surfaces of the first coil not facing the second magnet are disposed on the second side surfaces.

9. The lens moving apparatus according to claim 2, wherein the base comprises a support portion formed at an outer side surface of the base, wherein the circuit board comprises a flexible printed circuit board having at least one terminal surface, wherein the at least one terminal surface is bent from an upper surface of the flexible printed circuit board and disposed on the support portion of the base, and the plurality of terminals are disposed on the terminal surface, and wherein the first position sensor includes a driver or the first position sensor is a sensor alone, and the first position sensor includes a Hall sensor.

10. The lens moving apparatus according to claim 9, wherein the circuit member is an FP coil that is a patterned coil, wherein the base comprises a recess formed at a corner of the base, and the support member is disposed at the recess of the base, and wherein the flexible printed circuit board comprises two terminal surfaces.

11. The lens moving apparatus according to claim 2, wherein the housing comprises a stopper protruded from the upper surface of the housing and at least one upper support boss formed on the upper surface of the housing, wherein the at least one upper support boss is coupled to the upper elastic member, and an upper end of the stopper is higher than an upper end of the at least one upper support boss, wherein the upper elastic member comprises a plurality of upper elastic members electrically separated from each other, wherein the circuit board comprises an opening corresponding to the opening of the base, and the circuit member comprises an opening corresponding to the opening of the circuit board, and wherein the base comprises a protrusion protrusively formed from the upper surface of the base along the opening of the base, and the protrusion of the base is inserted through the opening of the circuit board.

12. The lens moving apparatus according to claim 11, wherein the support member comprises a plurality of support members,
wherein the plurality of support members are located at the second side portions of the housing, respectively,
wherein one end of each of the plurality of support members is connected to the outer frame of one corresponding member of the upper elastic members, and
wherein the other end of each of the plurality of support members is connected to a lower surface of the circuit board via soldering.

13. The lens moving apparatus according to claim 2, further comprising a sensor board disposed on the outer surface of the bobbin and spaced apart from the first coil,
wherein the sensor board includes a body disposed on the outer surface of the bobbin and elastic member contact portions configured to protrude from the body and electrically connected to the elastic member, and
wherein the body includes a main coupling portion surrounding the outer surface of the bobbin in a direction in which the main coupling portion is rotated about the optical axis and a sensor grip portion extending downward from the main coupling portion, the first position sensor being disposed on the sensor grip portion.

14. The lens moving apparatus according to claim 1, wherein the first magnet is disposed below the upper surface of the housing, and the first position sensor is disposed below the upper surface of the bobbin,
wherein the first position sensor is not overlapped with the first driving magnet in the second direction, and
wherein the first magnet is not overlapped with the first driving magnet in the third direction and not overlapped with the first driving magnet in the first direction.

15. The lens moving apparatus according to claim 1, wherein each of the first magnet and the second magnet is a unipolar magnet,
wherein a first boundary between an S-pole and an N-pole of the second magnet is in parallel to the optical axis, and
wherein a second boundary between an S-pole and an N-pole of the first magnet is perpendicular to the first boundary.

16. The lens moving apparatus according to claim 1, wherein the first magnet is a bipolar magnet comprising a first sensing magnet portion, a second sensing magnet portion, and a non-magnetic partition between the first sensing magnet portion and the second sensing magnet portion, and wherein at an initial position of the bobbin, a center of the first position sensor is aligned to face the non-magnetic partition.

17. A camera module comprising:
an image sensor;
a printed circuit board on which the image sensor is mounted; and
the lens moving apparatus according to claim 1.

18. A lens moving apparatus comprising:
a housing comprising first side portions and second side portions located between the first side portions;
a bobbin disposed inside the housing, wherein an outer surface of the bobbin comprises first side surfaces corresponding to the first side portions and second side surfaces located between the first side surfaces, and wherein the bobbin is configured to move in a first direction along an optical axis;
an upper elastic member coupled to an upper surface of the bobbin and an upper surface of the housing, wherein the upper elastic member comprises an inner frame coupled to the upper surface of the bobbin, an outer frame coupled to the upper surface of the housing, and a frame connection portion connecting the inner frame to the outer frame;
a lower elastic member coupled to a lower surface of the bobbin and a lower surface of the housing;
a first coil disposed on the bobbin;
a first position sensor disposed on one side surface of the second side surfaces of the bobbin;
a first magnet disposed on one of the second side portions of the housing corresponding to one side surface of the second side surfaces of the bobbin so as to be opposite to the first position sensor in a second direction perpendicular to the first direction;
a second magnet comprising a first driving magnet disposed on one of the first side portions of the housing, wherein the first driving magnet is disposed opposite to the first coil in a third direction perpendicular to the first direction and wherein the second magnet is configured to move the bobbin in the first direction via an electromagnetic interaction with the first coil;
a circuit member including a second coil and disposed below the housing, wherein the second coil is opposite to the second magnet;
a circuit board disposed below the circuit member and comprising a plurality of terminals, wherein the second coil is electrically connected to the circuit board;
a second position sensor disposed below the circuit board;
a base disposed below the circuit board and comprising an opening; and
a support member configured to support the housing such that the housing is movable relative to the base, wherein the support member connects at least any one of the upper elastic member and the lower elastic member to the circuit board;
wherein the first position sensor is mounted on the outer surface of the bobbin and spaced apart from the first coil,
wherein the first position sensor is electrically connected to at least one of the upper elastic member and the lower elastic member,
wherein a first seating recess is provided in an inner side surface of the one of the second side portions, and the first magnet is disposed in the first seating recess,
wherein the first coil is located at a lower portion of the outer surface of the bobbin, and the first position sensor is located at an upper portion of the outer surface of the bobbin,
wherein the inner frame of the upper elastic member is disposed on the upper surface of the bobbin and fixed to the upper surface of the bobbin by an adhesive member, and
wherein the first magnet is not protruded from the upper surface of the housing in the first direction, and the first position sensor is not protruded from the upper surface of the bobbin in the first direction.

19. The lens moving apparatus according to claim 18, wherein the second magnet further comprises a second driving magnet disposed opposite to the first driving magnet, a third driving magnet, and a fourth driving magnet disposed opposite to the third driving magnet, and
wherein the first side portions of the housing include four side portions, and each of the first driving magnet, the second driving magnet, the third driving magnet, and the fourth driving magnet is disposed on one of the four side portions of the housing.

20. The lens moving apparatus according to claim 19, wherein the second side portions of the housing include four side portions that are respectively disposed on four corners of the housing.

* * * * *